(12) United States Patent
Northrup

(10) Patent No.: US 11,769,062 B2
(45) Date of Patent: Sep. 26, 2023

(54) THING MACHINE SYSTEMS AND METHODS

(71) Applicant: Charles Northrup, Bedford, NH (US)

(72) Inventor: Charles Northrup, Bedford, NH (US)

( * ) Notice: Subject to any disclaimer, the term of this patent is extended or adjusted under 35 U.S.C. 154(b) by 893 days.

(21) Appl. No.: 15/834,311

(22) Filed: Dec. 7, 2017

(65) Prior Publication Data

US 2018/0157993 A1  Jun. 7, 2018

Related U.S. Application Data

(60) Provisional application No. 62/431,143, filed on Dec. 7, 2016.

(51) Int. Cl.
  *G06N 5/02* (2023.01)
  *G06N 5/022* (2023.01)
  *G06N 20/00* (2019.01)
  *G06N 5/04* (2023.01)

(52) U.S. Cl.
  CPC ............. *G06N 5/02* (2013.01); *G06N 5/022* (2013.01); *G06N 5/04* (2013.01); *G06N 20/00* (2019.01)

(58) Field of Classification Search
  CPC .......... G06N 5/02; G06N 5/022; G06N 20/00; G06N 5/04
  See application file for complete search history.

(56) References Cited

U.S. PATENT DOCUMENTS

| | | |
|---|---|---|
| 2005/0273218 A1 | 12/2005 | Breed et al. |
| 2008/0033897 A1 | 2/2008 | Lloyd |
| 2008/0201476 A1 | 8/2008 | Ramaswamy et al. |
| 2010/0063982 A1* | 3/2010 | Lawrence ............... G06F 16/36 707/794 |
| 2010/0191369 A1 | 7/2010 | Kim |

(Continued)

FOREIGN PATENT DOCUMENTS

| | | |
|---|---|---|
| TW | 201633173 | 9/2016 |
| WO | 2007147166 | 12/2007 |

OTHER PUBLICATIONS

Lee, Sang Wan, Oliver Prenzel, and Zeungnam Bien. "Applying human learning principles to user-centered IoT systems." Computer 46.2 (2012): 46-52. (Year: 2012).*

(Continued)

*Primary Examiner* — Eric Nilsson
(74) *Attorney, Agent, or Firm* — Sheehan Phinney Bass & Green PA

(57) ABSTRACT

A computer-implemented method is disclosed for a first (P(TM)) to gain knowledge. The method includes: performing a first P(TM(i)) to interact with a P(TM(thing)) to set a first Thing that is representative of content, performing a second P(TM(i)) to interact with the P(TM(thing)) to parse the content of the first Thing as a second Thing that is representative of a statement, performing a third P(TM(i)) to interact with the P(TM(thing)) to evaluate the statement of the second Thing to compute a third Thing that is representative of a performable statement, and performing a fourth P(TM(i)) to interact with the P(TM(thing)) to perform the performable statement of the third Thing, The fourth P(TM (i)), in performing the performable statement, interacts with P(TM(thing)) to set one or more Things that are representative of posterior knowledge.

16 Claims, 40 Drawing Sheets

(56) References Cited

U.S. PATENT DOCUMENTS

| | | |
|---|---|---|
| 2013/0080307 A1 | 3/2013 | Hoffberg |
| 2014/0081892 A1* | 3/2014 | Sellers-Blais ............ G06N 5/04 706/11 |
| 2015/0019553 A1 | 1/2015 | Shaashua et al. |
| 2016/0006815 A1 | 1/2016 | Dong et al. |
| 2016/0140267 A1 | 5/2016 | Chen et al. |
| 2016/0180240 A1* | 6/2016 | Majumdar ............ G06Q 30/08 706/46 |
| 2016/0285840 A1 | 9/2016 | Smith et al. |
| 2016/0323863 A1 | 11/2016 | Park et al. |
| 2016/0342906 A1 | 11/2016 | Shaashua et al. |

OTHER PUBLICATIONS

Hong, John H., et al. "Volume holographic memory systems: techniques and architectures." Optical Engineering 34.8 (1995): 2193-2203. (Year: 1995).*

Kobayashi, Shotaro, et al. "Intelligent humanoid robot with Japanese Wikipedia ontology and robot action ontology." 2011 6th ACM/IEEE International Conference on Human-Robot Interaction (HRI). IEEE, 2011. (Year: 2011).*

International Search Report and Written Opinion for PCT/US17/52232 dated Dec. 1, 2017.

Roquet; Synthetic recombinase-based state machines in living cells; Science vol. 353, No. 6297; Publication [online]. Jul. 22, 2016 [retrieved Oct. 30, 2017. Retrieved from the Internet: <URL: http://science.sciencemag.org/contenV353/6297/aad8559>i abstract; figures S3, 3B; pp. 363-377.

S. G. Sterrett, "Bringing up Turing's 'Child-Machine'"; 2012.

International Search Report and Written Opinion for PCT/US17/65013 dated Mar. 1, 2018.

Supplementary European Search Report for EP 17879200 dated Jun. 23, 2020.

Stenmark, Maj, "Natural Language Programming of industrial robots", IEEE ISR 2013 IEEE, Oct. 24, 2013.

* cited by examiner

```
IF ever there is a Thing such that
(
        there is a Thing where
        (
                Name        is equal to     "name"              and
                Value       thing:is-a      thing:text
        ) and,
        there is a Thing where
        (
                Name        is equal to     "broadcastDisplayName" and
                Value       thing:is-a      thing:text
        ) and,
        there is a Thing where
        (
                Name        is equal to     "BroadcastFrequencySpecification"
        ) such that,
                (
                        there is a Thing where
                        (
                                Name  is equal to    "broadcastFrequencyValue" and
                                Value thing:is-a     thing:number
                        ) and,
                        there is a Thing where
                        (
                                Name is equal to     "broadcastSignalModulation" and
                                Value thing:is-a     thing:text
                        )
                )
) then, Thing   this:is-a      "http://pending.schema.org/BroadcastService".
```

FIG. 54

```
GET /index.html HTTP/1.0
Host: iotthing.com
User-Agent: HTTPget/1.0
Cookie: Test=Test-Value; Path=/;
[blank line here]
```

```
HTTP/1.0 200 OK
Date: Mon, 08 Aug 2016 12:12:12 GMT
Content-Type: text/html
Content-Length: 66

<html>
<head>
</head>
<body>
<p>Hello, World!</p>
</body>
</html>
```

```
<div itemscope itemtype=http://schema.org/Organization>
<span itemprop="name">USPTO</span>
<div itemprop="address" itemscope itemtype=http://schema.org/PostalAddress>
<span itemprop="streetAddress">P.O. Box 1450</span>
<span itemprop="addressLocality">Alexandria, VA</span>
<span itemprop="postalCode">22313-1450</span>
</div>
```

```
thing:machine=(
    hardware=(
        processor=(
            listing="TM:raspberryPi3"
        )
        component=(
            part[1].listing="TM:TI.TMP007"
            part[2].listing="TM:piborg.ultraborg"
            part[3].listing="TM:Element14.CLAC"
            part[4].listing="TM:Ublox.neo-6m"
            part[5].listing="TM:HC-SR501"
            part[6].listing="TM:Cirrus.logic.audio.card"
        )
    )
    operatingSystem=(
        version="May 2016"
        release.date="2016-05-07"
        kernel.version="4.4"
        release.notes=" http://downloads.raspberrypi.org/raspbian/release_notes.txt"
    )
    boot=(
        vocabulary=(
            urr="stdlib:load///usr/local/iotmachine/boot/libboot.so?entry=init"
            license="www.thinglanguage.com/boot/1.0/license.txt"
            content="www.thinglanguage.com/boot/1.0/description.txt"
            listing="boot:"
        )
    )
    core=(
        vocabulary=(
            urr="stdlib:load//usr/local/iotmachine/core/libcore.so?entry=init"
            content="www.thinglanguage.com/core/1.0/description.txt"
            listing="core:"
            notes=" http://www.thinglanguage.com/core/1.0/runtime/notes.txt"
        )
    )
    application=(
        vocabulary=(
            urr="stdfile:parse///usr/local/iotmachine/aplication/task.txt"
            content="www.thinglanguage.com/application/1.0/description.txt"
            listing="application:"
            notes=" http://www.thinglanguage.com/application/1.0/runtime/notes.txt"
        )
    )
)
```

FIG. 66

Things the Smart Thing Machine can do as actions, and Things the actions.

THING MACHINE SYSTEMS AND METHODS

CROSS-REFERENCE TO RELATED APPLICATIONS

This application claims the benefit of U.S. Provisional Patent Application Ser. No. 62/431,143, filed Dec. 7, 2016, entitled "THING MACHINE SYSTEM AND METHOD," which is incorporated by reference herein in its entirety.

FIELD OF THE INVENTION

The present invention relates to computer architecture and design, and more particularly, is related to a Thing Machine that represents actions the Thing Machine can perform, and the Things that the actions act upon, as instances of Things administered in non-transitory memory using a multi-dimensional graph model.

BACKGROUND OF THE INVENTION

For a quarter of a century we have been using a web browser to render web pages. The browser has significantly evolved over 25 years, but at the end of the day, it still renders a web page using a client server model. The cookie information, in the latest browsers, can now be synchronized in the cloud so that our state information is shared between the different devices that we use.

During those 25 years, the primary access to the Web was through the use of desktop and laptop computers. Mobile devices offering web browsers started in the 1996 time frame. Nine years later, Google announced that more than half of Google searches were now originating from mobile devices (at least in the United States).

It is important to note that a significant number of the more than 5 billion web pages are not mobile friendly. For example, in 2016, it was estimated that 54% of small businesses have a web site, and of that, only 64% of those web sites are mobile friendly. Thus, only 37% of small businesses have a mobile friendly web site. It is interesting to note that small business accounts for more than half of the sales in the United States every year.

Many users, frustrated by the lack of mobile friendly web pages, have downloaded retailer mobile apps to make their experience more productive. Each app is dedicated to a particular business, and the app icon consumes real estate on the screen display eventually leading to clutter, as more and more apps are downloaded. As the end user, I must spend time organizing the apps on the cell phone so that I can productively navigate the myriad of icons to find the correct app I am in search of. The constant updates to the cell phone operating system Application Programming Interface (API) require a dedicated development team to ensure the cell phone app is up to date. This adds an expense that many small businesses simply cannot afford.

The emergence of Web enabled voice activated devices is becoming more common. A generation of children is growing up knowing they can ask their cell phone for directions to their friend's house. Smart phones, alarm clocks, smart watches, smart TVs, Amazon Echo, home automation systems, and even Motorcycle Helmets are just a few examples of voice activated devices.

Devices that are network enabled include thermostats, locks, cameras, generators, coffee machines, washers and dryers, light switches, security systems, toys, irrigation systems, and numerous other devices and sensors. This interconnected world is sometimes referred to as the Internet of THINGS.

Hypothetically, if you could stand in the centroid of the Internet and look out to the edges, you would see all the THINGS that are connected to the Internet. We call this the Internet of Things that are Devices and Sensors. If you went to the edge, picked up a device, and looked back in toward the center, you would see the Services that are offered, and that is known as the Internet of Services.

The world became complicated when somebody realized that a service is a THING that is offered, and suddenly there was a gray area between the Internet of THINGS as devices and sensors, and, the Internet of THINGS that are Services. The physical Things and the virtual Things add a level of ambiguity to the meaning of the Internet of Things, and this creates confusion in the market place.

To further complicate things, many physical devices often can communicate using multiple protocols such as: GSM, CDMA, LTE, SS7, Zigbee, Z-Wave, WeMo, Near Field Communication (NFC), Bluetooth, Thread, BLE, and others. Using our cell phone, for example, we can use NFC to make payments by simply extending our cell phone toward the cash register. Similarly, we can use Bluetooth to pair and connect our cell phone with the car audio system. In neither case is the device using an Internet Protocol, yet we would still consider the cell phone to be an Internet of Things Thing.

Over 35 Million interoperable Z-Wave devices have been sold since 2005 (Z-Wave Alliance). A Z-Wave Network Controller is used to administer your Z-Wave network of devices. Technically, an Internet Ready Z-Wave Network Controller is used to communicate over the Internet, but the controller still uses Z-Wave to communicate to the Z-Wave devices. This adds another layer of confusion on the definition of the Internet of Things, as the Z-Wave devices are things, but, they communicate with a controller that may, or may not be an Internet of Things Thing.

With all this confusion on the definition of the Internet of Things, It is no wonder that the International Telecommunication Union does not even use the keyword Internet in their description of the Internet of Things. Instead, they define it as:

A global infrastructure for the information society, enabling advanced services by interconnecting (physical and virtual) things based on existing and evolving interoperable information and communication technologies (ITU-T).

The one thing we can all agree on is: There are Things.

We classify things to describe them and categorize them. Some things are concepts, like the value of money, legal tender, documents such as a birth certificate, a copyright, title, a bill of sale, or property. A thing can represent an event, an alert, or a unit of measure, a geolocation, or even time. Other things are objects, such as devices and sensors, a cell phone, an Ipad, or a web page. Even an action is a thing, as in: don't just stand there, do something.

FIG. 1 is a schematic diagram illustrating a primitive flowchart of how a person might react to an imperative command. First, one or more of our senses are enabled with a verb action, such as listening to a trainer telling you what to do next. You would be using a listening vocabulary for the particular language, to parse the spoken words and create a thought representative of the imperative command. Next, you evaluate the command to determine what to do next. Did I understand that correctly? Can I do that? Do I want to do that? Maybe I am tired and I need to rest instead.

Sometimes we generate a response, such as an acknowledgement that we understood what is being asked of us, and other times the response is performing the action itself. We might give thumbs up, make a facial expression to indicate agreement or displeasure, or, use our speaking vocabulary for a given language to communicate OK. Alternatively, in response to a jog in place directive, we simply start jogging in place.

The word "verb" is itself a noun that means: a word that is usually one of the main parts of a sentence and that expresses an action, an occurrence, or a state of being (see Merriman Webster Dictionary). An action is the fact or process of doing something.

We can say that some Things express an action, and other Things are the Things an action can act upon. This leads us to the Singularity of Things: All things are Things.

In the current state of the art, the phrase "the internet of things" has a multiplicity of definitions primarily focused on the devices and sensors connected to the Internet, instead of things such as the services that are offered to subscribers identified by their subscriber identifier and their password, each of which are things. This provides a limitation to the way that the implementation of algorithmic procedures to be embodied as machine code can be modeled, thus adding inefficiencies and cost.

SUMMARY OF THE INVENTION

Embodiments of the present invention provide a Thing Machine that represents actions the Thing Machine can perform, and the Things that the actions act upon, as instances of Things administered in non-transitory memory using a multi-dimensional graph model.

According to one aspect, a computer-implemented method for a first (P(TM)) to gain knowledge includes: performing a first P(TM(i)) to interact with a P(TM(thing)) to set a first Thing that is representative of content, performing a second P(TM(i)) to interact with the P(TM(thing)) to parse the content of the first Thing as a second Thing that is representative of a statement, performing a third P(TM(i)) to interact with the P(TM(thing)) to evaluate the statement of the second Thing to compute a third Thing that is representative of a performable statement, and performing a fourth P(TM(i)) to interact with the P(TM(thing)) to perform the performable statement of the third Thing, The fourth P(TM(i)), in performing the performable statement, interacts with P(TM(thing)) to set one or more Things that are representative of posterior knowledge.

According to another aspect, a computer-based system includes: one or more computer-based processors, and computer-based memory coupled to the one or computer-based processors. The computer-based memory stores computer-readable instructions that, when executed by the one or more computer-based processors, cause the one or more computer-based processors to perform a method. The method includes performing a first P(TM(i)), by executing a first section of the computer-readable instructions that corresponds to the first P(TM(i)), to interact with another section of the computer-readable instructions that corresponds to a P(TM(thing)), to set a first Thing that is representative of content, performing a second P(TM(i)), by executing a second section of the computer-readable instructions that corresponds to the first P(TM(i)), to interact with the other section of computer-readable instructions that corresponds to the P(TM(thing)) to parse the content of the first Thing as a second Thing that is representative of a statement; performing a third P(TM(i)), by executing a third section of the computer-readable instructions that corresponds to the first P(TM(i)), to interact with the other section of computer-readable instructions that corresponds to the P(TM(thing)) to evaluate the statement of the second Thing to compute a third Thing that is representative of a performable statement, and performing a fourth P(TM(i)), by executing a fourth section of the computer-readable instructions that corresponds to the first P(TM(i)), to interact with the other section of computer-readable instructions that corresponds to the P(TM(thing)), to interact with the P(TM(thing)) to perform the performable statement of the third Thing.

In some implementations, the P(TM), when performing the performable statement, may interact with the other section of the computer-readable memory that corresponds to the P(TM(thing)) to set one or more Things that are representative of posterior knowledge. Moreover, in a typical implementation, the P(TM(thing)) corresponds to yet another section of the computer-readable memory that, when executed, causes the one or more computer-based processors to organize or administer the Things and/or any mutable relationships between the Things.

In an exemplary implementation, the Thing Machine contains a processor, non-transitory memory, and/or non-transitory computer readable media, and performable machine code P(TM). The P(TM) is comprised of a first set of performable machine code actions, having one or more performable machine code P(TM(i)) action, wherein each performable machine code P(TM(i)) action is configured as an implementation of an algorithmic procedure of a model, wherein a first P(TM(i)) provides an action of self-configuring a first vocabulary of Things in said non-transitory memory of the Thing Machine, said Things representative of Things that said processor can perform as actions, and the set of Things an action can act upon, and wherein at least one P(TM(i)) machine code action is performed to configure a second vocabulary of Things in the non-transitory memory of the Thing Machine representative of a core vocabulary through which an application can be provided.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

FIG. 54 is an assertion describing what it means for a Thing to be classified as a BroadcastService.

FIG. 66 illustrates P(TM) parsing content expressed in the Thing Language, that describes a desired configuration for P(TM).

FIG. 73 is a flowchart showing an exemplary P(TM(i)) generating a performable statement that P(TM(perform)) can cause the performance of.

DETAILED DESCRIPTION

Figure 1:
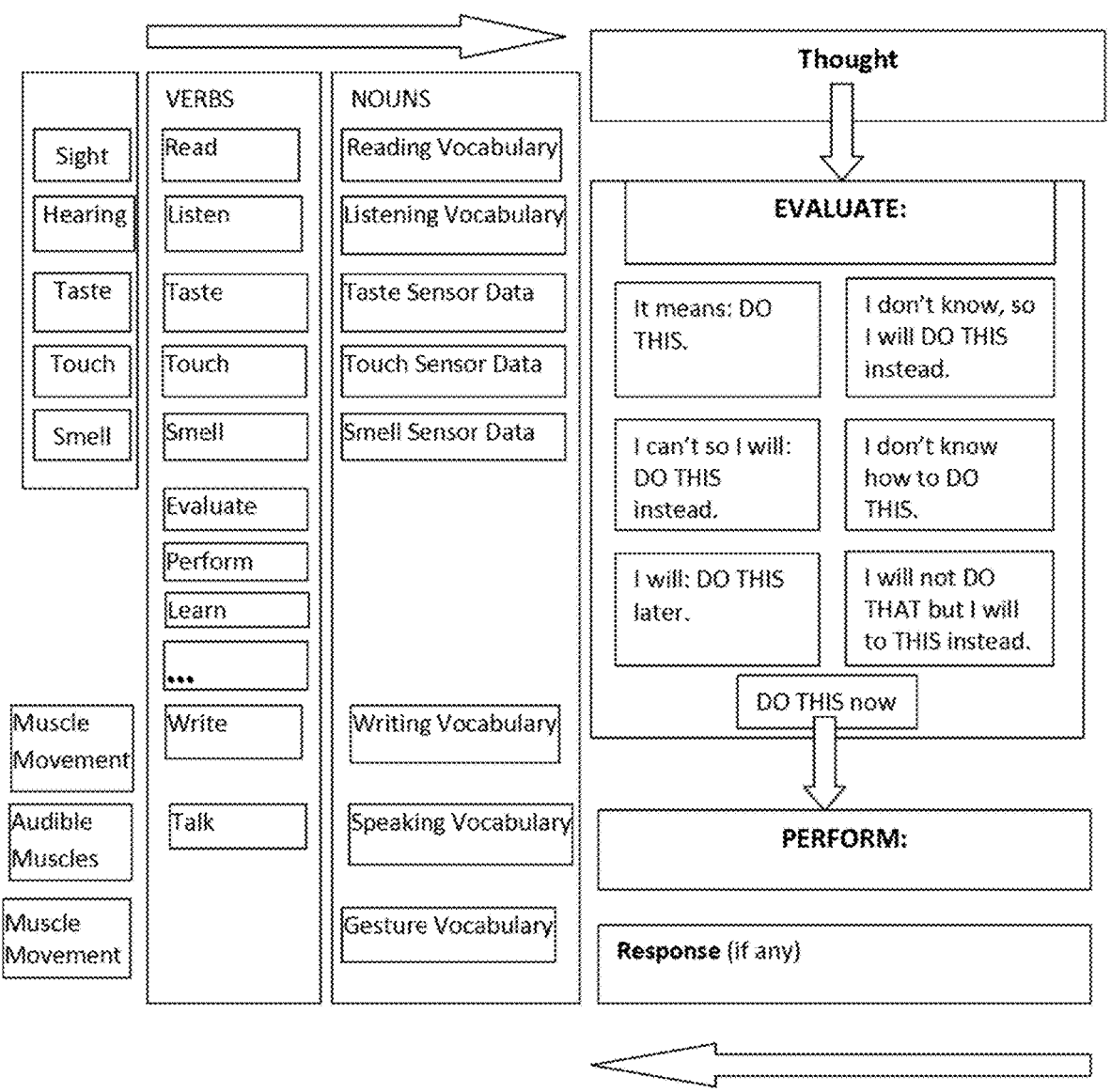
FIG. 1 is a schematic diagram illustrating a primitive flowchart of how a person might react to an imperative command.

The present system and method provides a novel improvement to computer functionality and capabilities, and even the definition of a computer, referred to herein as a Thing Machine.

A Thing that describes a performable action can be expressed in terms of a Turing Machine. A Turing machine is a mathematical model of a hypothetical computing machine that can perform a procedure to determine a result set from a set of input variables.

For i=(1,n) TM(i) is a computational machine that can take an input set, perform a procedural action P(TM(i)), and generate an output set.

Any number of these machines can exist with each P(TM(i)) performing a procedural action and potentially generating an output. The output of a first P(TM(i)) can be the input of a second P(TM(i)), and, a set of P(TM(i)) can often perform in parallel.

We can assign meaningful names to these actions, similar to the way we name verbs such as talk, listen, evaluate, respond, and so on. By adding a perform verb action we can ask the machine to perform a particular named action. Some machines, such as the Amazon Echo, or Apple Siri, can respond to voice commands in this manner. Alexa, reorder paper towels. Siri, What time is it? In each example, we are asking a machine to perform some action, such as ordering an item, or answering a question.

To satisfy a request, a machine first needs to evaluate what is being requested. In some respects, this is similar to asking a $2^{nd}$ grader to subtract 7 from 21. The sequence includes using an English listening vocabulary to parse the lexicons into a thought, to evaluate what the thought means, to select an action, to perform the action, and, use an English speaking vocabulary to communicate a response. Alternatively, the $2^{nd}$ grader may shrug their shoulders and reply: I don't know.

It is also noted that requesting a machine to perform some action does not imply performing the same action for each person making the request. Consider, for example, a URL that is entered into a web browser, such as www.thinglanguage.com/v1/index. By entering the URL, you are essentially requesting the browser to get and display the thing identified by the URL. The identifier and the corresponding resource are both Things.

Two people requesting their browsers to get and display the same URL can have two different results, even though they both entered the same URL. In one case, content may be specific to the individual. In another case, the HTTP request header may include state information that is used by the Web Server to construct the resource content. It is important to recognize that a URL may identify something, but what is displayed is a different thing.

The Thing Machine provides a unique manner of managing and interpreting a received request based on a booting Thing Machine vocabulary that adapts with interaction of the Thing Machine, resulting in modification to vocabulary of the Thing Machine, where the vocabulary provides a foundation through which the Thing Machine can perform an action. As a result, and as is demonstrated herein, the Thing Machine is able to interpret, act, and adapt to received requests, while increasing interpretation and action capability. Received requests, interactions, and responses to requests of the Thing Machine are performed based on the categorization of things as either an Action Thing, which is a verb that is an action, or a Thing that can be acted upon by the Thing that is an Action Thing (also referred to herein as a Non-action Thing).

As mentioned above, in the singularity of Things, a Thing can represent a performable action, or, a Thing a performable action can act upon. As is explained and illustrated herein, the Thing machine organizes Things as a thing:graph wherein nodes of the graph represent the Things, and arcs within the thing:graph represent mutable relationships between Things.

Things that represent performable actions are referred to herein as verb things (thing:verbs), and a collection of thing:verbs is a verb vocabulary Thing. The verb vocabulary and the Things the verb actions can act upon, are a vocabulary Thing. In short, with a minimal vocabulary, the present system and method can use universal quantification to assert that: if ever there is a Thing that is a request received by the Thing Machine, the Thing Machine parses the request, then evaluates the request in the context of the available vocabulary of the Thing Machine to select an appropriate verb, and performs the verb's corresponding action. The performed action results in a set of Things representative of the response. This generalization enables the response to be an empty set of Things for certain actions that do not generate a grammatical response. Sometimes, the observance of the action being performed is a sufficient response, such as is the case for a shutdown verb.

General Overview

The following provides an overview of the Thing Machine and associated vocabulary, and includes three main parts:
1. A Thing Graph Data Model description that describes a Thing as having non-mutable components including a relationship set comprising mutable relationships between Things.
2. An architecture overview providing a high level overview of the Thing Machine architecture.
3. A Thing Language section providing an introduction to writing documents in the Thing Language.

Thing Machine Structure

Figure 2:
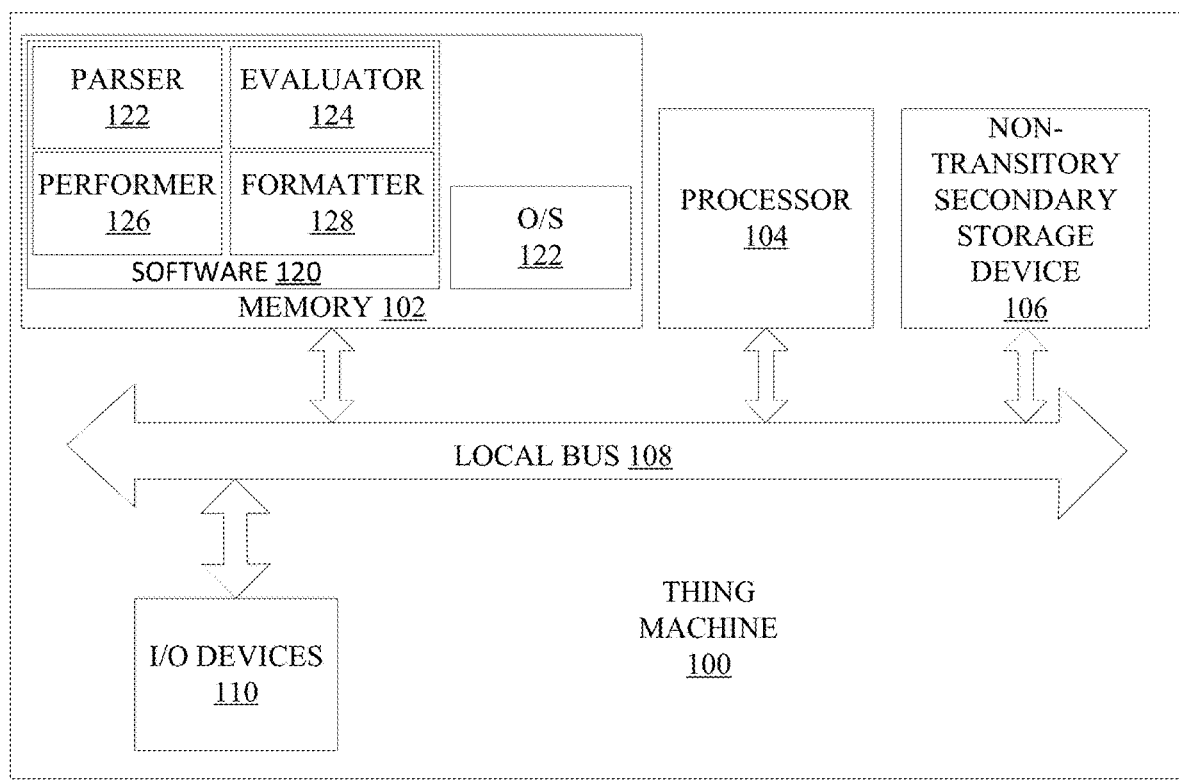
FIG. 2 is a schematic diagram illustrating parts of a Thing Machine, in accordance with one embodiment of the invention.

FIG. 2 is a schematic diagram illustrating parts of a Thing Machine 100, in accordance with one embodiment of the invention. As shown by FIG. 2, the Thing Machine 100 contains a memory 102, a processor 104, and a non-transitory secondary storage device 106, each communicatively coupled via a local bus, or local interface 108 allowing for communication within the Thing Machine 100.

The memory 102 has software 120 stored therein that defines the functionality described herein. The Thing Machine 100 also contains input and output (I/O) devices 110 (or peripherals). The local interface 108 can be, for example but not limited to, one or more buses or other wired or wireless connections, as is known in the art. The local interface 108 may have additional elements, which are omitted for simplicity, such as controllers, buffers (caches), drivers, repeaters, and receivers, to enable communications. Further, the local interface 108 may include address, control, and/or data connections to enable appropriate communications among the aforementioned components.

The processor 104 is a hardware device for executing software, particularly software that is stored in the memory 102. The processor 104 can be any custom made or commercially available single core or multi-core processor, a central processing unit (CPU), an auxiliary processor among several processors associated with the Thing Machine 100, a semiconductor based microprocessor (in the form of a microchip or chip set), a macroprocessor, or generally any device for executing software instructions.

The memory 102 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 102 may incorporate electronic, magnetic, optical, and/or other types of storage media. Note that the memory 102 can have a distributed architecture, where various components are situated remotely from one another, but can be accessed by the processor 104.

The software 120 defines functionality performed by the Thing Machine, in accordance with the present invention. The software 120 in the memory 102 may include one or more separate programs, each of which contains an ordered listing of executable instructions for implementing logical functions of the Thing Machine 100, as described below. As an example, the software 120 may define a parser 122, an evaluator 124, a performer 126, and a formatter 128, the functions of which are described herein.

The memory 102 may contain an operating system (O/S) 122. The operating system essentially controls the execution of programs within the Thing Machine 100 and provides scheduling, input-output control, file and data management, memory management, and communication control and related services.

The I/O devices 110 may include input devices, for example but not limited to, a keyboard, mouse, scanner, microphone, etc. Furthermore, the I/O devices 110 may also include output devices, for example but not limited to, a printer, display, etc. Finally, the I/O devices 110 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system Thing Machine 100 is in operation, the processor 104 is configured to execute the software 120 stored within the memory 102, to communicate data to and from the memory 102, and to generally control operations of the Thing Machine 100 pursuant to the software 120, as explained above.

When the functionality of the Thing Machine 100 is in operation, the processor 104 is configured to execute the software 120 stored within the memory 102, to communicate data to and from the memory 102, and to generally control operations of the Thing Machine 100 pursuant to the software 120. The operating system 122 is read by the processor 104, perhaps buffered within the processor 104, and then executed.

When the Thing Machine 100 is implemented in software 120, it should be noted that instructions for implementing the Thing Machine 100 can be stored on any computer-readable medium for use by or in connection with any computer-related device, system, or method. Such a computer-readable medium may, in some embodiments, correspond to either or both the memory 102 or the storage device 106. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 104 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the Thing Machine 100 is implemented in hardware, the Thing Machine 100 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In accordance with the first exemplary embodiment of the invention, initially, the memory 102 contains a Thing Machine procedure P(TM) (which is an executable procedure) comprised of a set of Thing Machine procedures P(TM(i)). One skilled in the art would understand that a multiplicity of P(TM(i)) could be embodied in a single computational machine such as, but not limited to, a Dell Latitude 15 3000 series laptop running Windows 10; embodied using a system on a chip such as a Raspberry Pi 3; embodied using a multiplicity of computational components in a single machine, or, embodied using a multiplicity of distinct and separate machines that can communicate directly or indirectly. The Thing Machine can be embodied using plug and play architecture, such as, but not limited to, defined in Plug and Play I2C slave U.S. Pat. No. 6,363,437, which is incorporated herein by reference in its entirety.

A first P(TM) comprised of a multiplicity of P(TM(i)), can be configured as a P(TM(i)) of a second P(TM).

A Thing Machine (TM) has a procedure P(TM) that can act upon a set of Things (for example, an input, such as a request), perform an action, and generate a set of Things (for example, an output, such as a generated response). Following Turing's model of computability, and that a Universal Turing machine can simulate a Turing machine, we can conclude that hypothetically: $P(TM)=\Sigma_{i=1}^{\infty} P(TM(i))$. The model indicates that we can construct a P(TM) by arranging some number n of these as $P(TM)=\Sigma_{i=1}^{n} P(TM(i))$. Specifically, as is described in further detail herein, if a first procedure of a Thing Machine requests a second procedure of a Thing Machine to perform an action, where the Thing Machine of the second procedure may or may not be the same Thing Machine as the first procedure; and in response thereto, the second procedure performs an action and provides a response to the Thing Machine of the first procedure, and in response to receiving the response, the procedure of the Thing Machine of the first procedure may reconfigure the P(TM), if necessary. Although repetitious, it is worth noting again, that the first and second procedures used in this example, would be first and second P(TM(i))s.

Each P(TM(i)) is an algorithmic implementation of a model, or component thereof, expressed in performable machine code to perform a distinct sequence of steps, wherein each P(TM(i)) is performable by P(TM(perform)). In place of numbers, in accordance with the present invention, the Thing Machine uses words to describe the type of action taking place in a given P(TM(i)). P(TM(perform)) is defined in further detail herein.

A model can be a representation of a selected part of the world such as models of phenomena, or models of data, models of theory, or models of a problem statement in the domain of discourse (such as an application modeled to solve a business problem), wherein said models are not exclusive, as scientific models can be representations of these at the same time, and wherein the model can be expressed in terms of the Thing model disclosed herein. (See https://plato.stanford.edu/entries/models-science/ regarding "models")

A given TM(i) with procedure P expressed as P(TM(i)) need not be primarily a digital processor action, but may use a digital processor to cause mechanical, electrical, electromagnetic wave form, biological, chemical, generation or reception of pressure wave, generation or reception of electromagnetic radiation.

By way of example, a processor action causes a voltage to be applied to an electrical interface enabling a motor action to propel the Thing Machine in a forward or reverse direction. Said action may continue until a second P(TM(i)) processor action resets said voltage. Thus, the Thing Machine continues performing the mechanical action while enabling P(TM) to be responsive to other thing:statements.

By way of further example, a P(TM(i)) can perform an action to interact with recombinase-based state machines (RSMs) that use input-driven recombinases to manipulate DNA registers made up of overlapping and orthogonal pairs of recombinase recognition sites. Thus, the state information encoded in an RSM can be interrogated or sequenced.

The P(TM) memory contains a minimal set of P(TM(i))s required to initialize, as is described in detail within the section of the present description entitled Booting. In short, in accordance with a first exemplary embodiment of the invention, the P(TM) contains the following P(TM(i))s: P(TM(boot)); P(TM(thing)); P(TM(parse)); P(TM(eval)); P(TM(perform)); and, P(TM(configure)). The main logic of the P(TM) is to perform the P(TM(boot)), and then stop. It should be noted that additional or fewer P(TM(i))s may be initially provided in the P(TM) memory.

The Thing Machine is booted with a limited self-configurable boot vocabulary of Things. The P(TM(thing)) action organizes Things, and the mutable relationships between them, as a thing:graph. Some Things represent performable actions. The performance of a performable action can act upon a Thing. A P(TM(i)) action can request P(TM(thing)) to perform an action related to administering Things, such as, but not limited to, set, get, and unset a Thing, and/or a mutable relationship between Things. A Thing can be changed by getting and setting the Thing. In addition, a Thing can be unset and set. In that respect, the Thing graph can be viewed as the vocabulary of the Thing machine, and, the vocabulary represents its knowledge base (the actions that the Thing Machine knows how to perform, and the Things that actions can act upon).

It should be noted that, in the scope of the present disclosure, the term "interact with" refers to a P(TM(i)) causing the performance of machine code related to. For example, if A "interacts with" B, then A causes the performance of machine code related to B.

The P(TM(input)) and P(TM(output)) actions interact with an electromagnetic waveform device to provide communication to and from P(TM). The actions interact with P(TM(thing)) so that inbound content is a request Thing, and, outbound content is a response Thing.

The P(TM(parse)) action parses a content Thing and interacts with P(TM(thing)) to create a thing:graph representative of a statement. In a first exemplary embodiment of a machine that acts as an interpreter, the thing:graph would be a performable thing:graph. In a second exemplary embodiment of a Thing Machine, the P(TM(eval)) action interacts with P(TM(thing)) to evaluate the thing:graph in the context of the accessible vocabulary, to generate a performable thing:graph. Note that the algorithmic steps of P(TM(input)) and P(TM(parse)) can be combined as a single procedure given by an appropriate P(TM(i)) such as P(TM(parse.input)).

The P(TM(perform)) action interacts with P(TM(thing)) to perform a Thing's performable action within the context of the Things that the action can be performed on.

The P(TM(format)) action interacts with P(TM(thing)) to format the response namespace Thing as the outbound content response Thing the P(TM(output)) action outputs. Note that algorithmic steps of P(TM(format)) and P(TM(output)) can be combined as a single procedure given by an appropriate P(TM(i)), such as P(TM(format.output)).

The P(TM(configure)) action interacts with P(TM(thing)) to configure a P(TM(i)) as a performable Thing, also referred to as an active Thing, or a verb. This enables the vocabulary of performable actions to be updated. Things the machine can now perform can be added, removed, or, changed in scope of complexity. Note that P(TM(i)) provides an algorithmic action, and i denotes a name representative of that action. The action may be a neural net classifier action, an electronic transaction action, or any other such algorithmic action that can be reduced to practice.

Booting

Prior to use of the Thing Machine 100, the Thing Machine 100 performs a boot process so as to allow for acclimation and future adapting to the environment of the Thing Machine and sources of requests received.

Each time the Thing Machine is powered on, a P(TM (boot)) action interacts with P(TM(thing)) to self-configure a thing:graph representative of a vocabulary comprised of a set of thing:verbs, each thing:verb being representative of an action that the P(TM(perform)) action can cause the performance of, and, Things the actions can act upon, to bootstrap the machine with Things that represent the a priori knowledge of the P(TM), such as, the last known state prior to when it was shut down. If we define experience as the act of the Thing Machine doing something and having Things happen (P(TM(thing)) administering the thing:graph), then we could say that the Thing Machine gains experience (Things representative of actions it can perform, or knowledge represented as Things) as a result of performing Things.

Using said vocabulary, the Thing machine configures a core vocabulary, which provides a foundation through which it can perform an application. The performance of a P(TM (i)), can therefore interact with P(TM(thing)) to change the thing:graph and said change can be thought of as the posterior knowledge (the Things that it learns from experience).

An action can traverse the thing:graph, format the content, and interact with a secondary storage device to retain thing:graph information, which can then be retrieved and used by an action to reconstruct the thing:graph.

In one embodiment the core vocabulary can be configured to include a pre-determined set of Things, and the vocabulary is a finite predetermined size and scope. In a second embodiment, the set of Things in the vocabulary is dynamically administered by the Thing Machine, wherein Things are set (learned and added to the thing:graph) and other Things are unset (forgotten and removed from the thing:graph).

The Thing Machine organizes Things as graphs. One graph, named the context graph, includes Things that represent namespaces. Namespaces are named graphs that are used to represent conceptual groupings of Things, such as a request, a response, a set of tasks, services, a verb vocabulary, or even an application dictionary. A namespace vocabulary can be viewed as a form of ontology. Several namespaces, using discrete vocabularies, however, may share in an ontological commitment for a portion of their vocabularies.

In self-configuring the graph, the P(TM(boot)) requests P(TM(thing)) to configure a Thing representative of a verb action, wherein said Thing has a representation of a reference to a performable action that P(TM(perform)) can cause the performance thereof. Exemplary verb actions include, but are not limited to, parse, evaluate, perform, and config. Collectively, said things are referred to as a vocabulary, and the graph of said Things is a boot vocabulary. The boot process of the Thing Machine self-configures a limited vocabulary of the Thing Machine to represent the machine's a priori knowledge (the initial Things in its vocabulary). The limited vocabulary includes verbs and things that the verbs can act upon. In accordance with a first exemplary embodiment of the invention, the Thing Machine's basic verb vocabulary at least includes the verbs "input", "output", "parse", "evaluate", "perform", and "configure". The Thing Machine procedure associated with each verb, respectfully, is referred to as P(TM(parse)), P(TM(eval)), P(TM(perform)), and P(TM(configure)). As is described in detail hereinbelow, this enables the Thing Machine to evaluate a request in the context of the self-configured thing:verbs, and, to perform a configure action that adds additional verbs to the verb vocabulary. Using this model, the Thing Machine's verb vocabulary becomes dynamically configurable and can increase, or decrease in size and scope as needed.

The process of self-configuring includes not only receiving of the limited vocabulary, but also creating of at least one thing:graph for each verb. Specifically, a verb in a thing:graph is a node, as are non-verbs (both of which are Things), and the arcs within the thing:graph represent the mutable relationships between the Things. The thing:graph therefore, defines relationships between Things that are followed.

The P(TM(thing)) action organizes Things, and the mutable relationships between them, as a thing:graph. Some Things represent actions, occurrences, or a state of being, and, other Things are the Things an action can act upon. The Thing Machine is booted with a limited self-configured boot vocabulary of Things. Using the boot vocabulary, the Thing Machine configures the a priori knowledge including a core vocabulary comprised of Things.

The P(TM(input)) action interacts with an electromagnetic waveform device to provide communication to P(TM).

An embodiment of the present invention may combine P(TM(input)) with P(TM(parse)). The action interacts with P(TM(thing)) so that inbound content is a request Thing that can be parsed by a parse action.

The P(TM(output)) action is an optional Thing. Its action interacts with an electromagnetic waveform device to provide communication from P(TM).

The P(TM(parse)) action parses a content Thing and interacts with P(TM(thing)) to create a thing:graph representative of a statement. In a simple machine that acts as an interpreter, the thing:graph would be a performable thing:graph. In an adaptive Thing Machine, P(TM(eval)) interacts with P(TM(thing)) to evaluate the thing:graph in the context of the accessible vocabulary, to generate a performable thing:graph. Note that P(TM(input)) and P(TM(parse)) can be combined as a single action given by an appropriate P(TM(i)) such as P(TM(parse.input)).

The P(TM(perform)) action interacts with P(TM(thing)) to perform a Thing action within the context of the Things that the action can be performed on.

The P(TM(configure)) action interacts with P(TM(thing)) to configure a P(TM(i)) as a performable Thing. This enables the vocabulary of performable actions to be updated. Things the machine can now perform can be added, removed, or, changed in scope of complexity. Note that P(TM(i)) provides an algorithmic action, and i denotes a name representative of that action. The action may be a neural net classifier action, an electronic transaction action, or any other such algorithmic action that can be reduced to practice.

Figure 3:
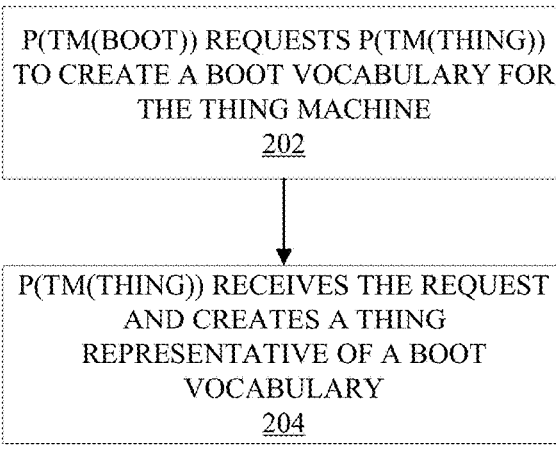
FIG. 3 is a schematic diagram illustrating a boot process of the Thing Machine.

Referring to the boot process and the schematic diagram of FIG. 3, when the Thing Machine 100 boots, P(TM(boot)) requests P(TM(thing)) to create a boot vocabulary for the Thing Machine (block 202). P(TM(thing)) receives the request and creates a Thing representative of a boot vocabulary (referred to, for exemplary purposes, as "boot:") (block 204). The creating of a Thing is performed by P(TM(thing)) initializing a unit of memory the size of a Thing where the Thing (i.e., boot:) qualifies Things in the boot vocabulary.

Thing Graph Data Model

Figure 4:
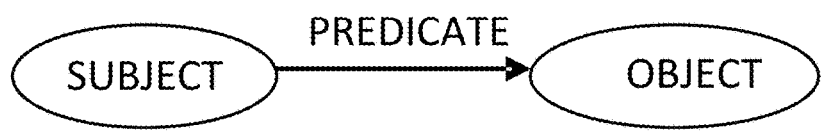
FIG. 4 is a graph provided for purposes of demonstrating the creation of graphs in accordance with the boot process, as performed by the Thing Machine.

FIG. 4 is a graph provided for purposes of demonstrating the creation of graphs in accordance with the boot process, as performed by the Thing Machine 100. This section defines the abstract syntax which serves to link all Thing based languages, specification, and reference implementations based on RDF. RDF is a framework for representing information in the Web (W3C, 2014). An RDF graph is a set of triples, each consisting of a subject, predicate, and an object, as illustrated by FIG. 4. RDF provides for three types of nodes. A node can be an IRI (see RFC 3987), a literal, or blank node. An IRI or a literal denote something in the world, and are called resources.

An RDF Thing graph is an RDF graph about Things. It describes the non-mutable components of a Thing. Although the components are non-mutable, their values are mutable. Some Things are Active Things that have a performable action, and are frequently referred to as verbs. Other Things are the Things that verb actions can act upon. A Thing can represent an RDF resource, a concept, a fact, an idea, an entity, an object, an instance, an event, an occurrence, a device, a sensor, a service, a task, a service, a user, a web resource, and so on.

A Thing is comprised of non-mutable components. Things are administered by a P(TM(thing)) that has knowledge of the non-mutable components. A first exemplary non-mutable component of a Thing. A name that is an identifier used to distinguish one Thing from another Thing in the domain of discourse, though duplicate named Things can exist, such as duplicate named Things that are members of a Thing representative of a list.

A second exemplary non-mutable component of a Thing is a value. In one embodiment, the value is an RDF literal as defined in the RDF 1.1 specification. One having ordinary skill in the art would be familiar with the RDF 1.1 specification and this specification is incorporated herein by reference in its entirety. In addition, one having ordinary skill in the art may use an alternative value representation as defined by an alternative specification. It should be noted that the value of the non-mutable component value of a Thing may be empty.

Figure 5:
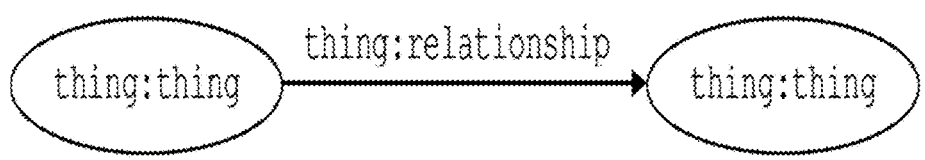
FIG. 5 is a graph illustrating a relationship in which Thing B exists separate from Thing A.

A third exemplary non-mutable component of a Thing is a relationship set. When a Thing has an empty relationship set, then the Thing is representative of a null graph. A relationship set is a set of relationships that hold between a first Thing and a second Thing. The primary relationship is one of association. Association can be in the form of composition or aggregation. If Thing A is composed of Thing B, then the relationship is immutable. If Thing A is an aggregate that includes Thing B, then the relationship is mutable. Wherein, by way of example, Thing B can exist independently of Thing A, as shown by FIG. 5. As mentioned, Things are administered by P(TM(Thing)) that has knowledge of the non-mutable components.

Figure 6:
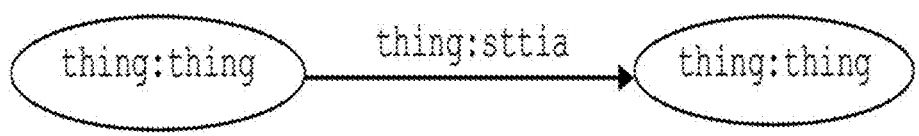
FIG. 6 is a graph illustrating a thing:sttia relationship.

A first exemplary relationship is the thing:sttia relationship, which uses existential quantification to denote that: there is this subject Thing such that there is an object Thing. The relationship is mutable. This is illustrated by FIG. 6.

An object THING can be representative of a collection of THINGS, such as a list of Things, or, a set of Things. The relationship can be expressed using the instance modifier so that: there is this subject THING such that there is an instance of an object THING. An instance of a THING can have different meaning depending on the THING'S classification. In one case, an instance could be a member. In another, it could be an occurrence of something.

The thing:is-a relationship expresses that a first THING is a type of a second THING. This is further described herein in a section referred to as Attributes as Metadata. In a general sense, the thing:is-a relationship enables the classification of THINGS.

The thing:depends-on relationship denotes that the subject thing has a dependency on the object thing. Additional relationships, such as those from UML, can be added to the RDF Thing Graph Data Model. These would include association, aggregation, directed association, composition, reflexive association, inheritance, multiplicity, and realization.

Identifiers and Listings

A listing is a representation of a reference to a Thing. A listing may be an unbound name, such as an identifier, or, expressed to convey the relationship between two or more Things. The listing "this" is a simple identifier that denotes that we are referring to the Thing where the name is equal to "this". The listing "this.that" can indicate that there is a Thing where the name is equal to "this", such that, there is a Thing where name is equal to "that". The exact interpretation of a listing is dependent on the namespace that the listing is bound to, and this is covered in more detail in the section on URIs (see RFC 3986), as described below.

Attributes as Metadata

An attribute describes an inherent characteristic, or a quality of a THING. Attributes are expressed as metadata. The thing:metadata is a THING that identifies a type of attribute, and the THING'S value describes the attribute value.

An attribute can be identified as a thing:metadata and subsequently used in a triple. As an example, a thing:class attribute is used to denote the classification of a THING. A class is a set of THINGS that satisfy the membership criterion that specifies what is required for a THING to be a member of the class at a given moment in time. The intention is the time dependent criterion. The extension at a given moment in time is the listing of all members at that time.

An attribute may describe a state. For example, a THING can be declared without denoting its classification, and, a binding action can act upon the "unbound" THING to bind it to something that the binding action can recognize, even if bound as an "unknown" THING. The binding action transitions the THING from the unbound to the bound state. A bound THING can be found, or unfound. A bound THING that is found indicates the binding action was able to bind the THING to something it understands. A bound THING that is unfound indicates the binding action was applied to the THING, but, the THING is not something that the binding action was able to understand.

Active Things

A THING that has a representation of a reference to a performable action is classified as an Active Thing. In this context, a performable action is an action that a machine can cause to be performed to achieve some result, and may be predominantly computational, electrical, chemical, optical, biological, mechanical, electromagnetic wave form, or a combination thereof, in nature.

An Active Thing herein is often referred to as thing:verb in that a verb is a noun that describes an action, and an Active Thing describes an action. Thus, the name of the Active Thing is a verb whose identifier describes an action that can be performed.

Figure 7:
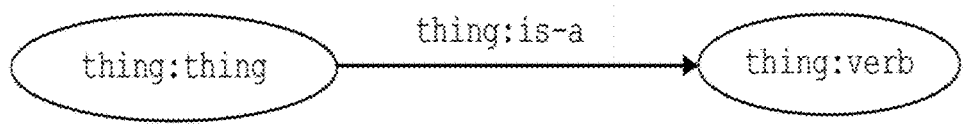
FIG. 7 is a graph illustrating that a THING with a relationship to a performable action is classified as a thing:verb using the thing:is-a relationship.

In an implementation supporting classifications, a THING with a relationship to a performable action is classified as a thing:verb using the thing:is-a relationship, as shown by FIG. 7.

A verb can act upon a set of THINGS. The THINGS that can be acted upon, can be explicitly specified in an RDF THING graph, or implicitly specified by classification. Quantifiers can be used to limit the scope of THINGS in the domain of discourse, to THINGS that the verb action can act upon.

Namespaces

Figure 8:
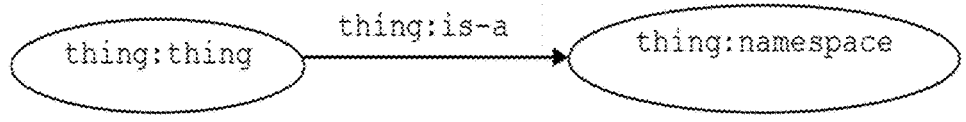
FIG. 8 is a graph supporting classifications, where the Namespace THING is classified as a thing:namespace, and the thing:namespace is a thing:class.

A namespace is a THING that represents a named graph of somehow logically related THINGS, even if related solely by being members of the same namespace. The graph includes the THINGS, and their relationships. As illustrated by FIG. 8, in a graph supporting classifications, the Namespace THING is classified as a thing:namespace, and the thing:namespace is a thing:class.

Context

Figure 9:
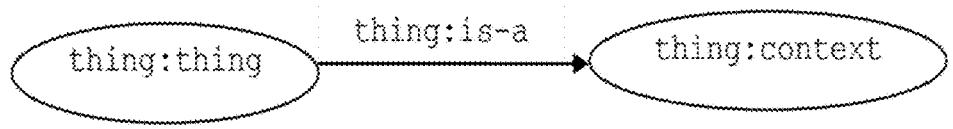
FIG. 9 is a graph illustrating supporting classifications, where the THING is classified as a thing:context.

A context is a THING that quantifies the set of namespaces that have current scope. As shown by FIG. 9, in a graph supporting classifications, the THING is classified as a thing: context.

The context enables a set of namespaces to have current scope, for use in dereferencing an IRI representative of a THING. For example, request:statement is an IRI that can be resolved relative to a context. In English, this would be expressed as: There is a namespace where the name is equal to request, such that, there is a Thing where the name is equal to statement.

URIs

A URI identifies a resource, and a THING is a representation of that resource in the THING Machine. THINGS either have a performable action, or, are THINGS that a performable action can act upon. The generalized form of a URI is given as:

scheme: scheme specific part

In the THING MACHINE, the scheme is interpreted as a reference to a namespace THING whose name follows the naming convention for a URI scheme, as shown below. This has the advantage that existing scheme names can be represented using RDF THING graphs.

A Namespace Name consists of a sequence of characters beginning with a letter and followed by any combination of letters, digits, plus ("+"), period ("."), or hyphen ("-")-RFC 3986.

All permanent URI Schemes, as published by the Internet Assigned Numbers Authority, are reserved namespace names. Modeling of THINGS in a reserved namespace should conform to the meaning of the published RFC for that namespace. For example, to model THINGS in the news: and the nntp: namespaces, one should consult RFC5538. The list of published URI Schemes is maintained by the IANA and is available online at: www.iana.org/assignments/uri-schemes.

The "URN" namespace is a reserved namespace, and its namespace-specific part is interpreted as defined by the corresponding published RFC document for that URN namespace. The list of published URNs is maintained by the IANA and is available online at: www.iana.org/assignments/urn-namespaces/urn-namespaces.

The namespace specific portion of the listing is interpreted according to the specification of the namespace (scheme).

A parser of the generic URI syntax can parse any URI reference into its major components. Once the scheme is determined, further scheme-specific parsing can be performed on the components. In other words, the URI generic syntax is a superset of the syntax of all URI schemes.—RFC 3986.

The http:, the https:, and the file: namespaces, however, use the "/" character delimiter so that the reference: http://www.THINGlanguage.com/request is interpreted as:

There is a THING:NAMESPACE where Name is equal to "http", such that, there is a THING where Name is equal to "www.THINGlanguage.com", such that, there is a THING where Name is equal to "request".

The mail to namespace interprets the references according to RFC6068. For example, the reference: mailto: info@thinglanguage.com is interpreted as:

There is a THING:NAMESPACE where Name is equal to "mailto", such that, there is a THING where Name is equal to info@THINGlanguage.com.

The THINGS: scheme, supported in OSX and IOS, can also be modeled. The THINGS: URI is given as: THINGS: command?parameter1=value1¶meter2 . . . . This would be interpreted as:

There is a THING:NAMESPACE where Name is equal to "THINGS", such that, there is a THING where Name is equal to "command", such that there is an instance of a THING where Name is equal to "parameter1" and Value is equal to "value1", and, there is an instance of a THING where Name is equal to "parameter2".

Figure 10:
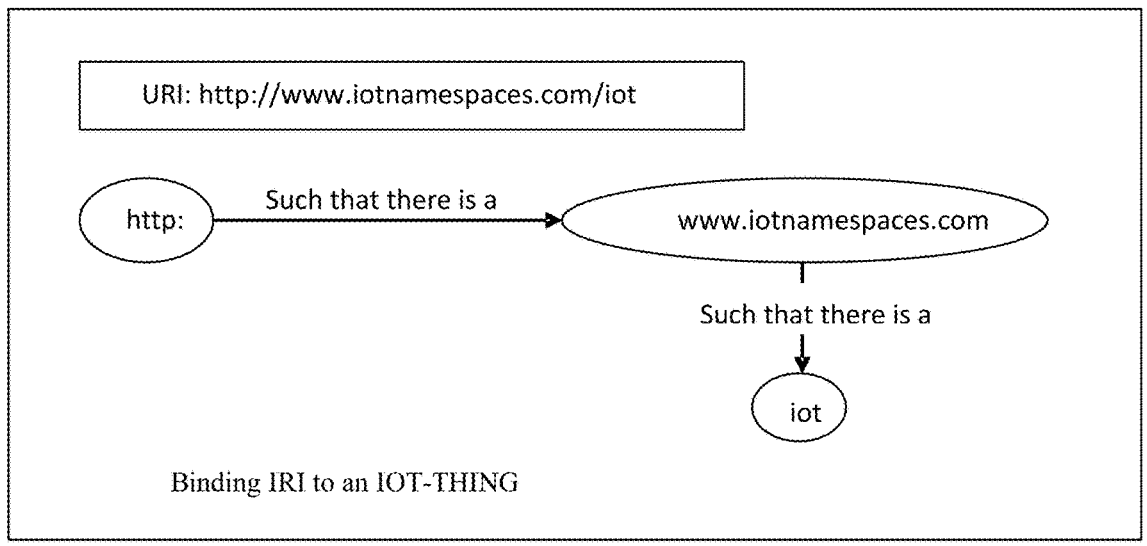
FIG. 10 is a schematic diagram illustrating an exemplary binding of an http URI to a Thing.

The name of a Namespace THING follows the naming requirements of an IRI scheme (see RFC 3987). This serves as a way to bind a URI (a form of an IRI, and described in RFC 3986) to a THING. The URI scheme name is bound to a Namespace THING. All http: URIs, for example, are bound within the http: Namespace THING. An exemplary binding of an http URI to a THING is illustrated in FIG. 10.

Satisfaction Claims

Figure 11:
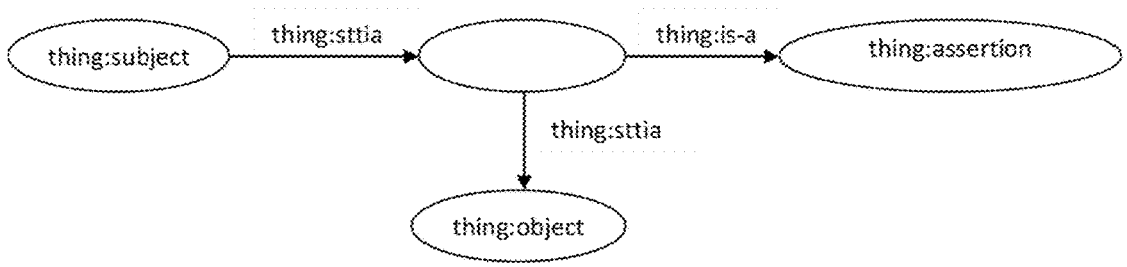
FIG. 11 is a graph illustrating a thing:graph where a blank node represents a satisfaction claim, and the claim may have a reference to a thing:object.

The basic assertion is a thing:assertion representative of a satisfaction claim, and it asserts that a given claim is true. In the Thing Graph Model, an assertion is a Thing instead of being a directed edge label. Referring to FIG. 11, in thing:graph, the blank node represents a satisfaction claim, and the claim may have a reference to a thing:object.

Figure 12:
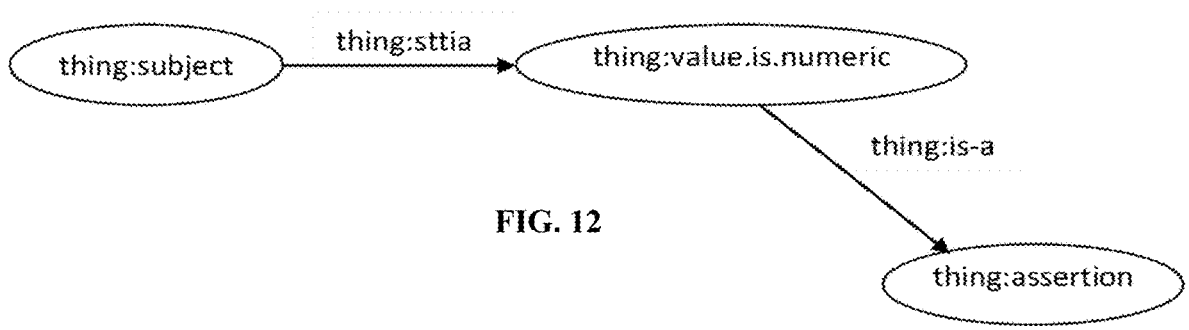
FIG. 12 is a graph illustrating that the thing:assertion asserts that the thing:subject has a value that is numeric, and thus a thing:object is not required.

As illustrated by FIG. 12, the thing:assertion asserts that the thing:subject has a value that is numeric, and thus a thing:object is not required.

Figure 13:
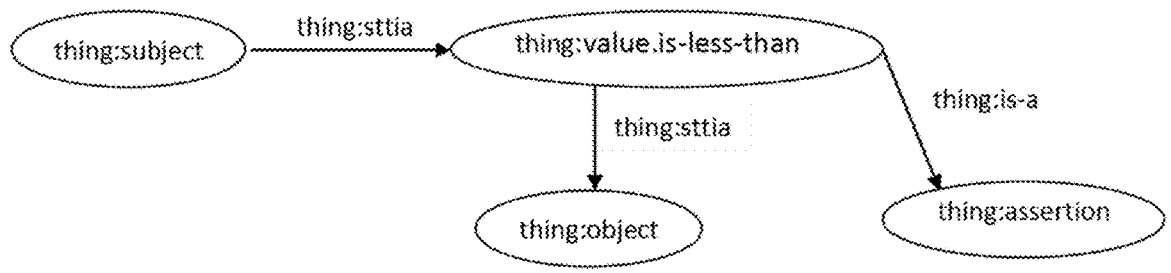
FIG. 13 is a graph illustrating when the thing:assertion claims that the value of thing:subject is less than the value of thing:object.

As illustrated by FIG. 13, the thing:assertion claims that the value of thing:subject is less than the value of thing:object.

The truthfulness of a satisfaction claim is determined by the computational procedure corresponding to the claim. In that regard, a satisfaction claim is an Active Thing having a corresponding thing:graph describing the Things that the action can act upon.

Exemplary satisfaction claims include, but are not limited to those illustrated by the following table 1:

TABLE 1

| | |
|---|---|
| thing:is-less-than | The value of THING:subject is less than the value of THING:object. |
| thing:is-less-than-or-equal-to | The value of THING:subject is less than or equal to the value of THING:object. |
| thing:is-equal-to | The value of THING:subject is equal to the value of THING:object. |
| thing:is-greater-than-or-equal-to | The value of THING:subject is greater than or equal to the value of THING:object. |
| thing:is-greater-than | The value of THING:subject is greater than the value of THING:object. |
| thing:matches | The value of THING:subject matches the value of THING:object. |
| thing:is | The THING is in a state, or has a state, as specified by THING:object. |
| thing:is-a | The THING is a class of a THING specified by THING:object. |

The "is" portion of the simple predicates can be followed by "not" to indicate the negation of the predicate. For example, thing:is-not-equal-to. The negation of thing:matches would be specified as thing:does-not-match.

Connectors

Figure 14:
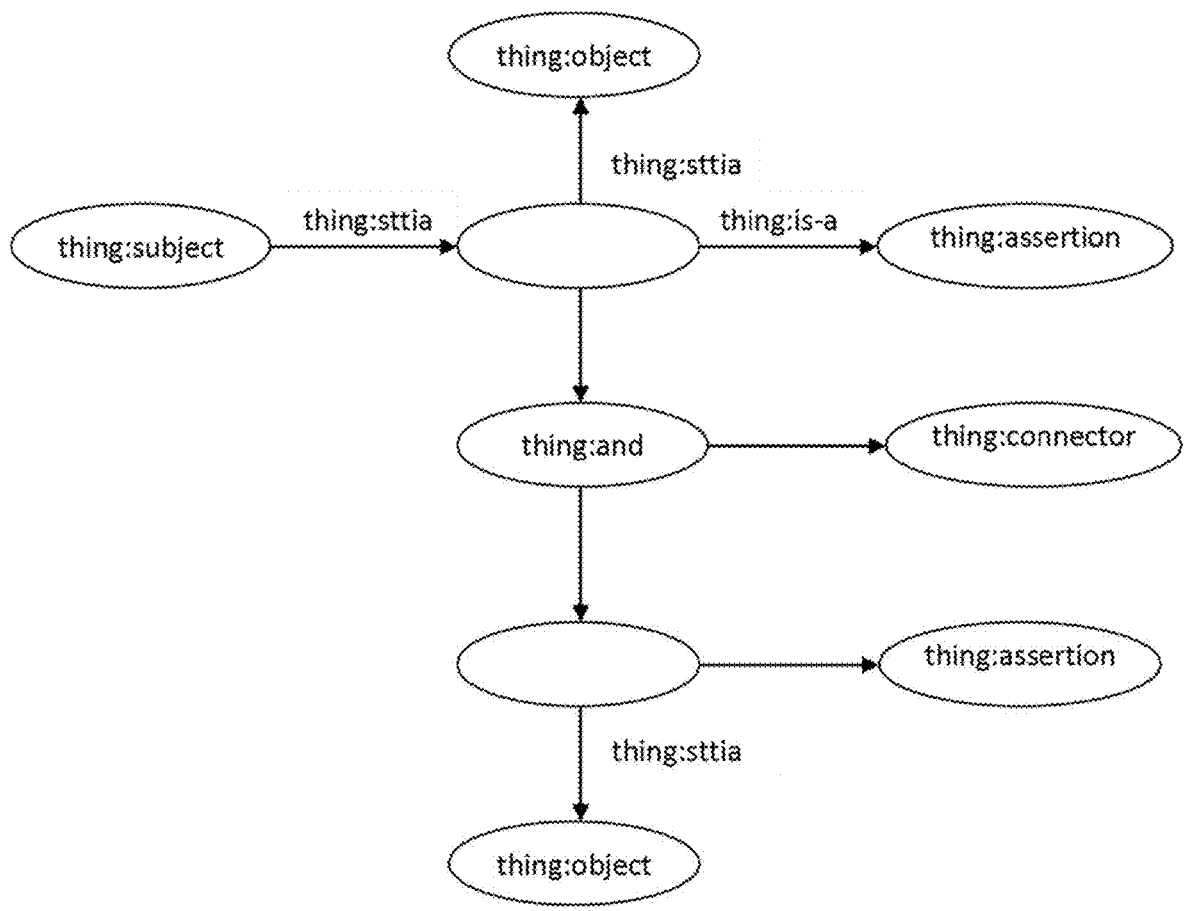
FIG. 14 is an example of a graph having a connector.

Logical connectors are used to connect two satisfaction claims. Exemplary connectors include, but are not limited to, and, or, not, implies, and iff. Similar to satisfaction claims, the logical connectors are expressed as Things, not as directed edge labels. Logical connector Things are Active Things. An example of a graph having a connector is provided by FIG. 14.

Examples of simple connectors include, but are not limited to the following illustrated by table 2.

TABLE 2

| | |
|---|---|
| thing:and | A conjunction formed by joining the two statements thing:subject and the thing:object with the connector thing:and. The conjunction is true if both thing:subject and thing:object are satisfied. |
| thing:or | The disjunction is true when either or both of thing:subject and the thing:object are satisfied. |
| thing:xor | An exclusive disjunction is satisfied if either thing:subject, or thing:object are satisfied, but not both of them. |
| thing:not | The thing:subject is satisfied, and thing:object is not satisfied. |
| thing:implies | The thing:subject, if satisfied, implies the thing:object is satisfied. |
| thing:iff | If thing:subject and thing:object are satisfied, or, if thing:subject and thing:object are not satisfied, then thing:iff is satisfied. |

While it is true that in a Procedural graph a satisfaction claim evaluates to True (satisfied) or False (not satisfied), a satisfaction claim in a Declarative graph can expand to include the set of Things that the claim ranges over.

Graph Types

A THING graph is procedural in nature when it describes how to do something. For example, a graph to set a THING'S value is a procedural statement, as is a sequence of statements describing the actions necessary to perform a task.

A THING graph is declarative when it is a statement representative of a declaration. HTML is an example of declarative statements. The HTML source code describes the desired layout of a document, and an HTML rendering engine will process it to perform the actual layout.

A THING graph is object oriented when it describes objects and their methods. As an example, a graph denoting an object and the methods to set, get, and unset the object would be object oriented.

A THING graph is an event driven graph when events such as messages or states drive the evaluation of the graph. A THING graph is a Finite State graph when it expresses the states and the transitions between states, for use in a Finite State Machine.

A THING graph may be a combination of one or more of the above types of graphs, such as a Harel statechart, an XML statechart, or a UML statechart.

"Modeling Reactive System with Statecharts: The STATEMATE Approach" by D. Harel and M. Politi. McGraw-Hill, 1998.

(See http://www.wisdom.weizmann.ac.il/~dharel/reactive_systems.html.)

A Thing machine procedure P(TM(thing)) expressed in performable machine code provides the action of administering Things, and the relationships between them, in non-transitory memory. A Thing having a representation of a reference to a performable action is a verb. A Thing machine procedure P(TM(perform)) expressed in performable machine code provides the action of interacting with P(TM(thing)) to get a reference to a verb Thing, and, to cause the performance of the verb's performable action (the P(TM(i)). The performance of the action can interact with P(TM(thing)) action to act upon a Thing in non-transitory memory. A Thing machine procedure P(TM(configure)) expressed in performable machine code provides the action of interacting with P(TM(thing)) to set a verb Thing. Thus we can describe a problem statement and architect a solution in terms of Things that the Thing machine can perform as actions and the Things the actions can act upon.

Figure 15:
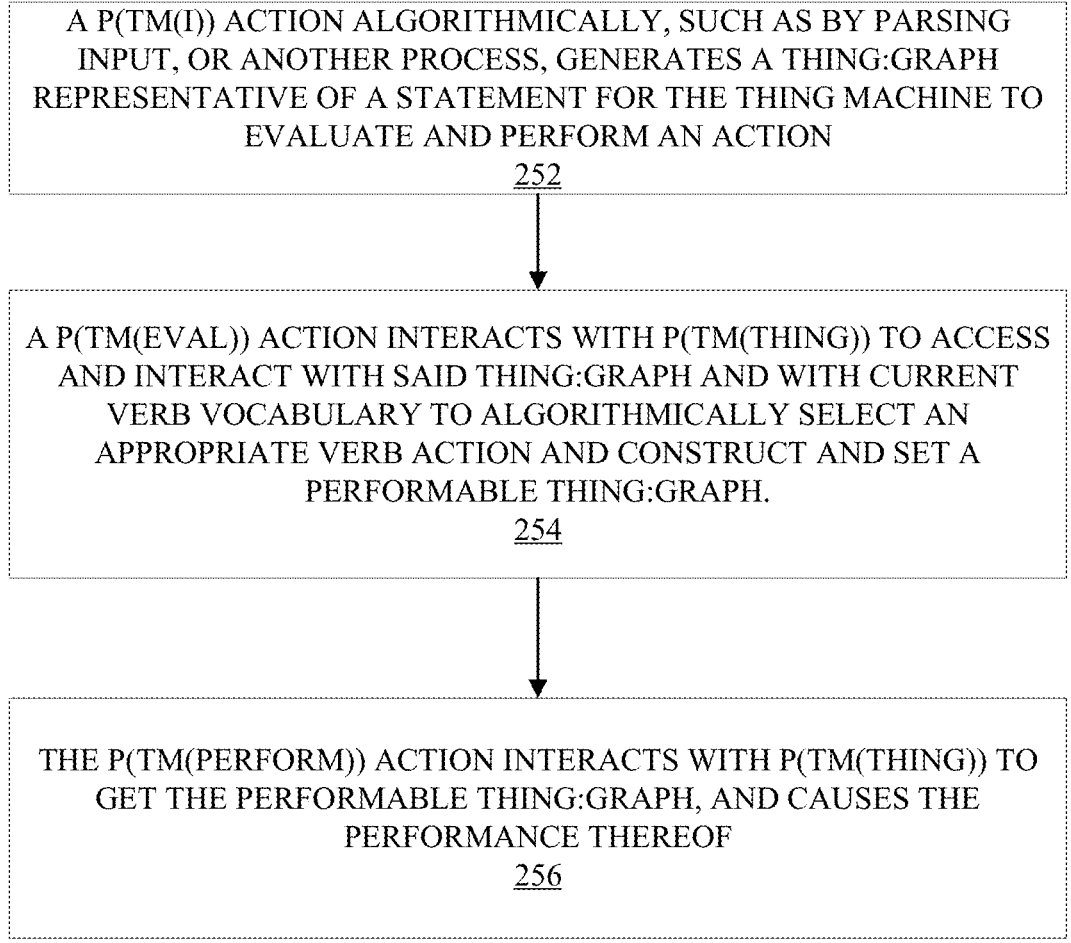
FIG. 15 is a flowchart exemplifying minimal runtime steps performed by a Thing machine.

FIG. 15 is a flowchart 250 exemplifying minimal runtime steps performed by a Thing machine. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

Specifically, it should be noted that at least the following steps are performed by a Thing Machine. As shown by block 252, a P(TM(i)) action algorithmically, such as by parsing input, or interacting with the sensor, or by requesting the Thing Machine to perform an action, generates a thing:graph representative of a statement for the Thing Machine to evaluate and perform an action.

This is useful for a P(TM(i)) that obtains sensor generated data, such a temperature, acceleration, altitude, longitude, and/or latitude, motion sensor, heat sensors, smoke sensors, or other such sensor, to incrementally construct a thing:statement to be evaluated and a corresponding performable thing:statement to be performed. Similarly, a P(TM(i)) that is notified of a signal, such as an event, a timer, an interrupt, or an alarm, can interact with P(TM(request)) to construct a thing:statement to be evaluated and a corresponding performable thing:statement to be performed to enable P(TM) to be responsive to receipt thereof.

A first exemplary embodiment of such a P(TM(i)) is P(TM(parse)) action, parsing an XML document resulting in a thing:graph so that the following assertion is true:

There is a Thing where Name is equal to core:print, such that, there is a Thing where Name is equal to "message" and value is equal to "Hello, World".

Figure 16:
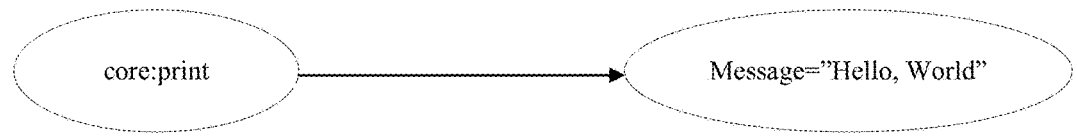
FIG. 16 is a thing:graph, such that a P(TM(i)) is P(TM (parse)) action, parsing an XML document resulting in the thing:graph so that the following assertion is true: There is a Thing where Name is equal to core:print, such that, there is a Thing where Name is equal to "message" and value is equal to "Hello, World".

The corresponding thing:graph is illustrated in FIG. 16.

As shown by block 254, a P(TM(eval)) action interacts with P(TM(thing)) to access and interact with said thing:graph and with current verb vocabulary to algorithmically select an appropriate verb action and construct and set a performable thing:graph. It should be noted that the current verb vocabulary may be the initial verb vocabulary or may be a dynamically changed verb vocabulary.

As shown by block 256, the P(TM(perform)) action interacts with P(TM(thing)) to get the performable thing:graph, and causes the performance thereof.

In accordance with an alternative embodiment of the invention, the Thing Machine may not contain the P(TM(eval)) action. In such an embodiment, the P(TM(parse)) interprets imperative statements.

Changing the THING:GRAPH/Core Vocabulary

As previously mentioned, a P(TM(i)) can interact with a P(TM(thing)) to set a thing:graph. The Thing architecture enables the specifics of the input and the output to be abstracted away and come into existence through the use of verb actions. The choice of language, grammar, syntax, and the communication actions themselves, are simply Things.

Any number of languages and syntax can be received in the P(TM(i)) input stream and can be parsed as long as the P(TM(parser)) action can algorithmically parse the elements of the grammar syntax into a thing:graph.

A language is a THING, more precisely described as a system of communication that includes a lexicon and a grammar. The lexicon is the vocabulary, such as the set of words or phrases in the language. The grammar imposes the rules such as the morphology, the semantics, and, the syntax.

An action is a Thing that must be performed to communicate. Visual communication skills such as reading and observing can be used. Physical actions such as writing or signing can be used. Oratory and audio communication skills can be used. Alternatively, a Braille writing system could be used. All of these are Things, and because they are Things, their actions can be modelled and configured as actions the Thing Machine (i.e., P(TM)) can perform.

Gesturing, as a form of communication action, transcends societies. The meaning of a finger pointed in a direction; the stamping of feet; or, the smile on your face are generally understood. Gesturing is distinct from sign languages in that the latter uses established expressions and motions with well-defined meaning. Gesturing is a Thing.

Similar to people, the Thing machine can have a reading vocabulary, a writing vocabulary, a listening vocabulary, and a speaking vocabulary for a given language. Each of these vocabularies can be at different levels. The Thing Machine may know by way of configured Things, what a word means when the Thing Machine hears it, but not be able to pronounce it, or, spell it correctly. Similarly, the Thing Machine may read something, and see a word that it does not recognize. The word ossify, for example, is a verb word in the English language, meaning to harden like a bone, but may be one of the least commonly used verbs in the language, and therefore, a modelled embodiment may not be configured in the Thing Machine's verb vocabulary.

When the Thing Machine identifies an unfamiliar word, it may try to interpret meaning of the word by interacting with its syllables. If it can detect a root, it may be able to infer meaning. As the Thing Machine learns new words and how to use them, it can add them to its various vocabularies.

A multi-lingual Thing Machine can have a different vocabulary capability for each language it knows. A Thing Machine could be modelled on the linguistic educational system of Arubian students, who learn Papiamento, Dutch, Spanish, and English languages in school. Each Thing Machine could develop its reading vocabulary, writing vocabulary, listening vocabulary, and speaking vocabulary, at different rates and potentially to different capabilities, for each language.

The Thing Machine can parse a statement according to the grammar and syntax into token Things; and, bind the token Things to a Thing in their corresponding vocabulary. Certain Things can be immediately classified, whilst others require looking at the surrounding words to infer meaning.

The meaning of a statement can still be ambiguous. Consider the statement: "Let's eat honey". It could mean to eat honey, or, it could mean you're inviting your loved one to start eating. As is explained in detail herein, to help manage the interpretation and meaning of a statement, we introduce the idea of a Thing verb graph wherein the starting node is the verb name, and the connected nodes are the Things that the verb action can act upon.

It is important to note that other verb (P(TM(i))) actions, besides P(TM(parse)), can subsequently be configured such that when performed the action interacts with P(TM(thing)) to create a thing:graph, wherein said thing:graph can subsequently be evaluated to create a performable graph. The performance of a performable thing:graph can cause an action to interact with P(TM(thing)), to change the thing:graph of the Things that P(TM(thing)) administers. An exemplary embodiment of such a P(TM(i)) is P(TM(config)), providing the action of interacting with P(TM(Thing)) to configure a set of Active Things (where a set is one or more).

The action of a P(TM(i)) can interact with the environment to generate a thing:graph representation of a request to change the thing:graph administered by P(TM(thing)). In response thereto, P(TM(config)) interacts with P(TM(thing)) to change the thing:graph administered by P(TM(thing)). Thus, the action of P(TM(config)) changes the current vocabulary, which is also referred to herein as a core vocabulary.

Figure 17:
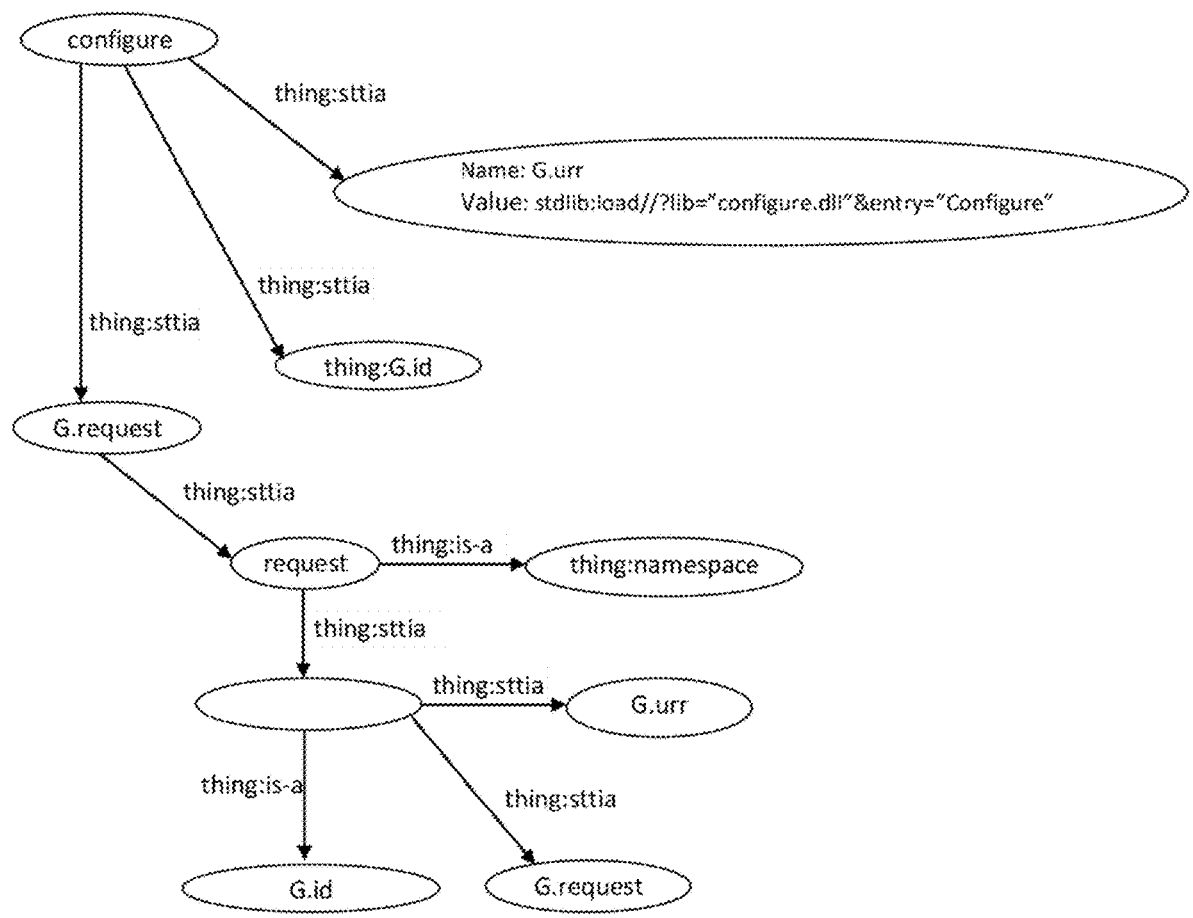
FIG. 17 is a graph such that P(TM(config)) acts upon a Thing qualified by the request namespace Thing, that is a G.id (illustrated as a blank node), such that, there is a G.request and there is a G.urr.

Referring to FIG. 17, the P(TM(config)) acts upon a Thing qualified by the request namespace Thing, that is a G.id (illustrated as a blank node), such that, there is a G.request and there is a G.urr.

The name of the G.id Thing is an identifier of a verb Thing that P(TM(config)) is to configure. The G.request is a graph describing the Things that the performance of the verb Thing can act upon. The value of the G.urr Thing is a URI that is interpreted as a Uniform Resource Request for requesting performance of the verb Thing.

Figure 18:
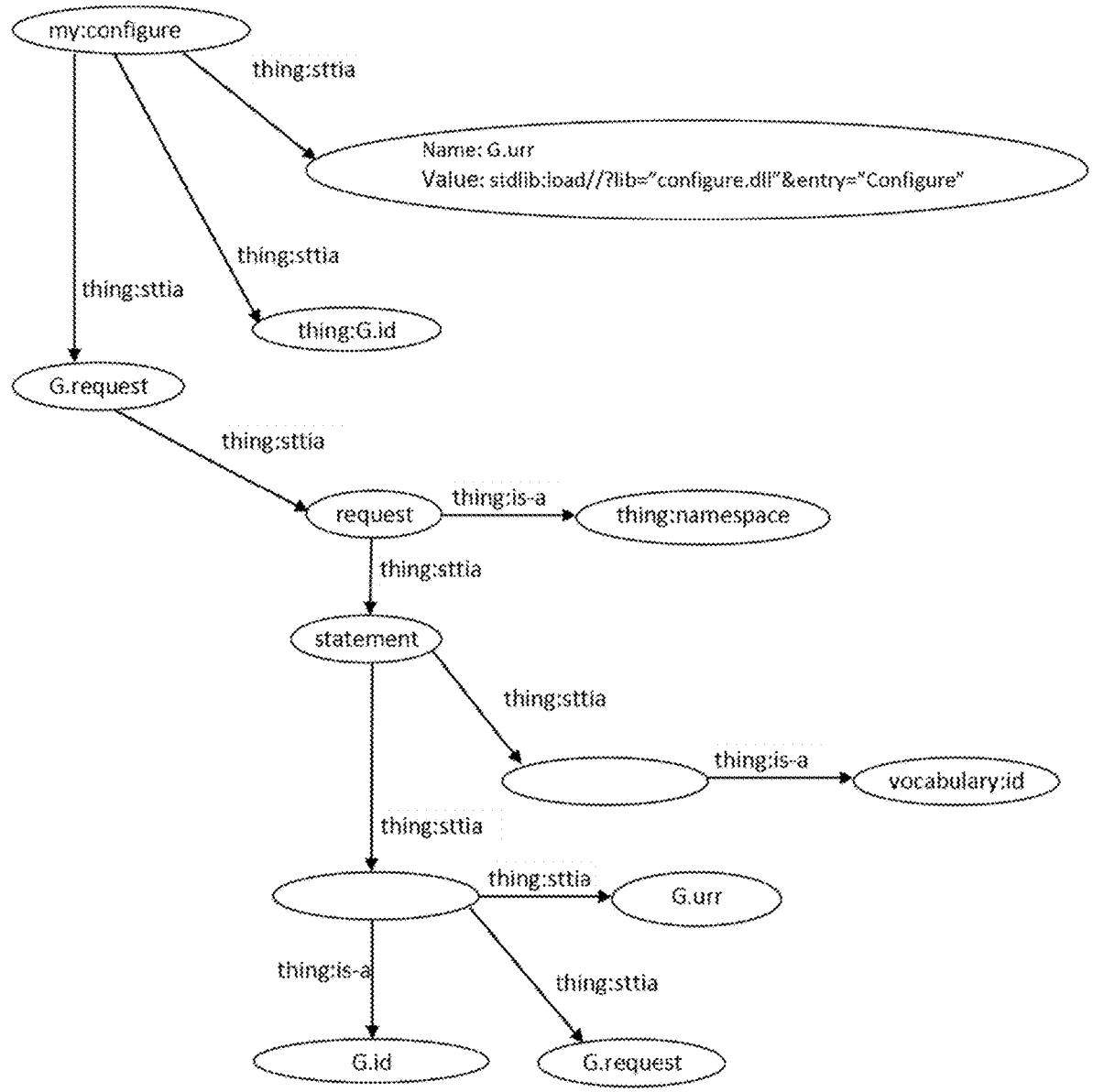
FIG. 18 is a graph illustrating a my:configure version of the P(TM(config)) that acts upon a Thing identified by the URI request:statement.

Referring to FIG. 18, the my:configure version of the P(TM(config)) acts upon a Thing identified by the URI request:statement, such that there is a Thing that is a vocabulary identifier (vocabulary.id) and such that there is a Thing that is a graph ID such that, there is a G.request and a G.urr. A vocabulary identifier can be used by a classifier in algorithmically selecting the set of verb Things in the domain of discourse for the P(TM(eval)) to use in evaluating a thing:statement.

In an embodiment, P(TM(config)) can interact with a Thing representative of a shared library such as a Dynamic Link Library, such that said shared library is dynamically loaded into the process memory, and, a reference to a function is resolved and executed to provide a set of Procedures and corresponding graphs, thereby enabling a multiplicity of verb Things to be configured.

In an embodiment, P(TM(config)) can algorithmically interact with P(TM(eval)) and P(TM(perform)) to evaluate and perform a thing:statement that must be satisfied as a prerequisite to configuring a set of verb Things. Said thing:statement can be representative of a request to check for accessibility, versioning information, revision information, dependencies, conflicts with existing verb Things, identification, authorization, authentication, security, a hardware capability, an operating system capability, or other such activities.

In an embodiment supporting identity, authentication, and authorization, the P(TM(config)) action can interact with a P(TM(i)) to identify and authenticate a thing: statement, and to enforce authorization requirements required to be satisfied to configure verb Things. By way of example, a thing: statement may require a digital signature with an identity that can be authenticated, to determine if the identity is authorized to request the P(TM(config)) to perform its action. Various security models can be algorithmically enabled and said model may require the use of specific hardware and P(TM(i)) configured verb Things, such as that disclosed in the U.S. Patent Application Ser. No. 62/288,545, entitled Optical Identity System and Methods, filed on Jan. 29, 2016, which is incorporated by reference herein in its entirety (the optical identifier patent application). An embodiment may use P(TM(openssl)) to provide identity, authentication, and authorization actions enabled by OpenSSL Toolkit (see the openssl.org web site).

Examples of Types of Things

An action block is a thing:graph representative of a sequence of statements. A named action block is referred to as a task. In this manner, the language grammar can express a request for the Thing Machine to configure a named task that it can subsequently perform. The task is performed by performing the action block. The action block is performed by evaluating each statement to generate a performable thing:graph. The performable thing:graph is performed by performing the action corresponding to the thing:verb in the performable thing:graph.

A Thing Machine can be configured to be bilingual in that a multiplicity of language grammar parsers can be configured as performable actions. Alternatively, a translator action can be used to translate from a first language to a second language that can be parsed by the configured parser action.

Thus when we say a Thing Machine can read a book, we mean that a Thing Machine can perform an action to interact with content obtained from an input device, to represent the content as a thing:graph. By retaining the thing:graph as a subgraph of the overall Thing Machine, a Thing Machine action can subsequently access and interact with that content.

A Thing Machine can read a book describing how to perform a task, and retain that knowledge in the event the machine is ever asked to perform such a task in the future. A task can be classified by topic. A task may be a member of a set of classifications, such as a Task related to using the http protocol; a task related to an activity such as accounting: accounts.receivable, accounting:accounts.payable, banking: debits, banking:credits, and, banking:balance.

A first Thing Machine can send a communication intended for a second Thing Machine, requesting knowledge about a topic or classification. In response to receiving content representative of said knowledge, the first Thing Machine can interact with the content to configure its own knowledge accordingly. In this manner, a first Thing Machine can learn from a second Thing Machine.

The THING Machine can provide services. A service is a THING that is provided in response to receiving a request. The subtle distinction between a service and a task is that tasks are performed; whilst services are provided. The separation of tasks versus services is facilitated through the context, which can prevent the unauthorized performance of a task, such as a task to remove files or change the meaning of a verb.

As mentioned, a context Thing quantifies the set of available namespace Things in the domain of discourse. A namespace Thing qualifies a set of related Things, even if related simply by being members of the same namespace. The name of the namespace Thing is used in resolving references to Things.

Identity is a THING, and as such we can model the concepts of identifiers, authentication, authorization, and auditing to embody an identity model. Examples of identity models include the use of a Public Key Infrastructure, Open PGP's web of trust, biometrics, $3^{rd}$ party authorization, and others. With identity, we can introduce a marketplace as a Thing and enable transactions. A transaction becomes a THING between a buyer and a seller; a payer and a payee. The transaction may involve a service offering THING, a physical THING, a conceptual Thing, or a logical THING.

The identity model enables authentication of a graph or subgraph. Consider, for example, a graph representative of a request including a requesting party identifier (i.e., request originator), content, and, a digital signature, of the content. The corresponding certificate of the identifier can be validated, and the digital signature of the content validated. This enables an evaluate action to algorithmically validate a request and select an appropriate action in response thereto. With an identity model in place, we can also provide a secure communication model.

Securing the request content can be modeled using cipher actions to encrypt and subsequently decrypt content. The request graph can include a subgraph describing a cipher action, and, a cipher key. The evaluate verb action can apply, as a prerequisite, that the specified cipher must first be performed with the specified key, to decrypt the content. By organizing the various components of the request in appropriate subgraphs, two or more Thing Machines can algorithmically communicate using an identity model, and secure communications.

When integrated with an Optical Identifier SIM card, or similar device, the THING Machine can be modeled as a THING with unique identity in an overlay network, even on an ad-hoc basis. THINGS can disengage from the network, and re-engage elsewhere in the network, yet retain their optical identity.

Optical identity can be discrete from user identity. This enables a Thing Machine to verify itself on the overlay network, and, use the network available content to reconfigure itself based on the identity of the user.

A THING Machine can dynamically configure and reconfigure its vocabularies, even on an ad-hoc basis. A set of Thing Machines that share an ontological commitment to at least a subset of their lexicon, can interact with Things using that subset (or at least a part thereof). Given that the vocabulary is represented as Things, and that the Thing Machine has a verb action to configure as well as reconfigure the vocabulary, the Thing Machine can learn, examples of which are provided herein.

Referring to an exemplary RDF Thing, described herein for illustrative purposes, the following exemplary definitions apply.

Graph—a collection of points and lines connecting some (possibly empty) subset of them. The points of a graph are most commonly known as graph vertices, but may also be called "nodes" or simply "points." Similarly, the lines connecting the vertices of a graph are most commonly known as graph edges, but may also be called "arcs" or "lines."

A graph node is referred to as a graph:node. A graph edge is referred to as a graph:edge. An edge can have a label, referred to as a graph:edge-label(label).

Directed Graph—A directed graph is graph, i.e., a set of objects (called vertices or nodes) that are connected together, where all the edges (directed graph edges) are directed from one vertex to another. A directed graph is sometimes called a digraph or a directed network.

A directed graph is referred to as a graph:directed.

A directed graph edge is referred to as a graph:directed-edge.

Undirected Graph—An undirected graph is graph, i.e., a set of objects (called vertices or nodes) that are connected together, where all the edges (undirected graph edges) are bidirectional. An undirected graph is sometimes called an undirected network. An undirected graph is referred to as a graph:undirected. An undirected graph edge is referred to as a graph:undirected-edge.

Subgraph—A subgraph is a graph whose vertices and edges are subsets of another graph.

Rooted Graph—A rooted graph is a directed graph wherein one node is distinguished as the starting (root) node.

In accordance with the present system and method, ABNF is used to describe a representation of a non-mutable component of a Thing as administered by P(TM(thing)). In addition, RDF is used to further illustrate the meaning of a non-mutable and mutable components of a Thing as administered by P(TM(thing)).

ABNF

In the exemplary illustration provided herein, the augmented backus-naur form (ABNF) specification, as illustrated hereinafter, is used to describe a Thing as administered by P(TM(thing)). Specifically, the following describes a Thing and its non-mutable components, as administered by a P(TM(thing)).
scheme:scheme-name=ALPHA*(ALPHA/DIGIT/ "+"/"-"/"."")
scheme:scheme-specific-part=this is scheme specific. See the RFC corresponding to the scheme name for details on the scheme specific part. If no such RFC exists, then the scheme-specific-part is parsed into Thing identifiers as defined by the Thing Language. Otherwise, the scheme-specific-part is tokenized according to the scheme.
The following ABNF rules apply.
thing:identifier=1*1 (scheme:scheme-name/scheme:scheme-specific-part)
thing:char-literal=char-val
thing:num-literal=num-val
thing:bin-literal=bin-val
thing:dec-literal=dec-val
thing:hex-literal=hex-val
thing:value=1*(thing:char/thing:num/thing:bin/thing:dec/thing:hex)
A class id identifies a class of things. The default class id is a URI and the Thing identified by the URI is the classification. The default is thing:thing.
thing:class.id=URI
A thing:set(i) is a set of things that are i. The generic set is thing:set.of(thing:thing) which is a set of things. A set has no duplicate named things.
thing:set.of(i)=0,*(i)
A thing:list(i) is a list of things that are members of class i. The generic set is thing:list.of(thing:thing) which is a list of things. A list may have duplicate (i).
thing:list.of(i)=0,*(i)
NOTE: in an embodiment, a parameter can be referenced as thing:value.of(i), thing:name.of(i), thing:thing(thing:name.of((thing:value.of(i))), and so on.

Thing RDF

The Resource Description Framework (RDF) is a framework for representing information in the Web. An RDF triple consists of three components: a) the subject, which is an IRI or a blank node; b) the predicate, which is an IRI; and, the object, which is an IRI, a literal or a blank node. An RDF triple is conventionally written in the order subject, predicate, object. An RDF graph is a set of RDF Triples.

RDF triples are used in the following section to describe a Thing, and in a Thing graph, the predicate denotes a relationship type between the subject and the object. The thing:is-a relationship type denotes that the subject is a member of the class of things identified by the object. The thing:has-a relationship type denotes that the subject has a non-mutable component given by the object. Note the value of a component can change, but the component cannot. See relationship types for detail.

A reference P(TM(i)) is a reference to the algorithmic Procedure of a Thing Machine sub-i where i is an identifier that qualifies a first Procedure of a Thing Machine from a second Procedure of a Thing Machine.

A Thing is a node in a graph as administered by P(TM(thing)).

| thing:thing | thing:is-a | graph:node |
| --- | --- | --- |

A Thing has a name, a value, class, and relationship-set. In a preferred embodiment providing backward compatibility for the world wide web, a namespace thing name is a scheme:name. The P(TM(thing)) can set, get, or unset Things.

| thing:thing | thing:has-a | thing:name |
| --- | --- | --- |
| thing:thing | thing:has-a | thing:value |
| thing:thing | thing:has-a | thing:class.id |
| thing:thing | thing:has-a | thing:relationship-set |
| thing:name | thing:is-a | thing:identifier |

The following rule denotes that a relationship-set is comprised of zero or more relationships. A relationship-set with zero relationships is an empty set. A rooted thing:graph of a thing:thing with a relationship-set that is an empty set, is an empty graph (a thing:graph.empty) of the thing:thing.
thing:relationship-set=thing:set.of(thing:relationship(s,r,o))

In the following rule s, r, and o are parameters that denote that: There exists a relationship-type(r) between thing:subject(s) and thing:object(o). The P(TM(thing)) can set, get, or unset a relationship.
thing:relationship(s,r,o)=thing:subject(s) thing:relationship-type(r) thing:object(o)

The following rule is to be interpreted as: There is a thing where name is equal s.
thing:thing(s) thing:thing where is:equal.to=(thing:name.of (thing:thing), (s))

The following rule is to be interpreted as: There is a thing where name is equal s and value is equal to v.
thing:thing(s,v)=thing:thing where (is:equal.to=(thing: name.of(thing:thing), (s)) and is:equal.to=(thing:value.of (thing:thing), (v)))

In an embodiment, components of the thing can be referenced. The following rule for example is interpreted as there is a Thing [where [name=a] and [value=b].
thing:thing(0,1[name=a] 0,1[value=b])=thing:thing where is:equal.to=(thing:value.of(thing:name), (s)) and is:equal.to=(thing:value.of(thing:value), (v))

| thing:subject | thing:is-a | thing:thing |
| thing:subject(s) | thing:is-a | thing:thing(s) |
| thing:object | thing:is-a | thing:thing |
| thing:object(o) | thing:is-a | thing:thing(o) |

In the following rule(s,c,o) are parameters that denote that the claim given by c, is satisfied by (s) and the optional thing:object(o). As Things, the rule is interpreted as There is a subject Thing (s) such that, there is a satisfaction claim c, such that, there is an optional object(o).
thing:assert(s,c,o)=*(thing:subject(s) thing:predicate(c) thing:object(o))

The following rule equates to the value of the name component of the thing given by parameter (i)
thing:name.of(i)=thing:value.of((i):name)

The following rule equates to the value of the value component of the thing given by parameter (i)
thing:value.of(i)=thing:value.of((i):value)

The following are exemplary relationship types (thing:relationship-type).

thing:is-a Subject thing is a member of the class denoted by the object.
thing:has-a Subject thing has a non-mutable component identified by the object.
thing:sttia There is a subject thing, such that, there is an object thing.
thing:sttiai There is a subject thing, such that, there is an instance of object thing.
thing:sttmb There is a subject thing, such that, there may be the object thing.
thing:sttina There is a subject thing, such that, there is not an object thing.
thing:parent The object thing is the parent of the subject thing.
thing:child The object thing is the child of the subject thing.
thing:next The object thing is the next sibling of the subject thing.
thing:prior The object thing is the prior sibling of the subject thing.

The thing:is and thing:is.not assertions are thing:predicate satisfaction claims. A satisfaction claim may be in the form of an expression given by:
thing:expression=thing:subject thing:satisfaction-claim 0,1 (thing:object)

A satisfaction claim is asserted by a thing:verb that acts upon the claim. This enables the set of accessible satisfaction claims to be self-configured for the particular embodiment. A subset of satisfaction claims include:
thing:is.lt The value of the subject thing is less than the value of the object thing.
thing:is.lteq The value of the subject thing is less than or equal to the value of the object thing.
thing:is.eq The value of the subject thing is equal to the value of the object thing.
thing:is.gteq The value of the subject thing is equal to or greater than the value of the object thing.
thing:is.gt The value of the subject thing is greater than the value of the object thing.
thing:is.not.empty The value of the subject thing is not empty.

A thing:graph(s) is a graph of thing:subject(s). The thing:graph(monad) is a supergraph of related Things.

| thing:directed-edge | thing:is-a | graph:directed-edge |
| thing:directed-edge(s,r,o) | thing:is-a | graph:directed-edge with graph:edge-label(r) of thing:relationship(s,r,o) |
| thing:blank.node | thing:is-a | thing:thing |
| thing:rgraph(s,r,o) | | = thing:subject(s ) thing:directed-edge(s,r,o) thing:object(o) |
| thing:graph.empty(s) | | = thing:subject(s) |
| thing:graph(s,r,o) | | = thing:rgraph(s,r,o) / thing:graph.empty(s) |

The thing:class(class.id) is a thing:thing given by the thing:name class.id. It has a relationship to a discipline that exists within the context of that class.

| thing:class(class.id) | thing:is-a | thing:subject(class.id) |
| thing:class(class.id) | thing:has-a | thing:relationship(thing:class(class.id), thing:sttia, thing:discipline(class.id,d)) |
| thing:class(class.id) | thing:has-a | thing:relationship(thing:class(class.id), thing:sttia, thing:binding.urr) |
| thing:discipline(class.id,d) | thing:is-a | thing:context(thing:class(class.id), thing:verb(d)) |
| thing:class(c) | thing:may-have-a | thing:relationship(thing:class(c), thing:sttia,G.criteria(c)) |
| G.criteria(c) | thing:is-a | thing:graph denoting the set of criteria for being a member of the thing:class |

Exemplary thing:class include
  a) thing:class(thing:char)
  b) thing:class(thing:num)
  c) thing:class(thing:bin)
  d) thing:class(thing:dec)
  e) thing:class(thing:hex)

Exemplary disciplines include
  a) thing:discipline(c, thing:set)
  b) thing:discipline (c, thing:get)
  c) thing:discipline (c, thing:unset)

An embodiment can add a set of modifiers to modify the P(TM(discipline(c,d)). Exemplary Modifiers include:
  a) thing:before(thing:discipline(c,d),thing:urr(u))
  b) thing:as(thing:discipline(c,d),thing:urr(u))
  c) thing:after(thing:discipline(c,d),thing:urr(u))

A thing:before urr is evaluated before the thing:discipline (c,v), and if satisfied, then the thing:discipline(c,v) is evaluated.

A thing:as urr is evaluated as if it were the G(urr(d)).

A thing:after urr is evaluated after the successful evaluation of the G.urr(d) or the thing:as urr if specified.

A new classification is configured by configuring the class thing:class(class.id) graph with appropriate relationship(s) to discipline(s).

A thing:verb is a thing:thing administered by P(TM (thing)), such that there is a representation of a reference to a performable action that can be resolved to a performable action that P(TM(perform)) can cause performance of P(TM (perform)) is said to perform the thing:verb by causing performance of the performable action.

| thing:verb(i) | thing:is-a | G(P(TM(i))) |
|---|---|---|
| G(P(TM(i))) | thing:is-a | thing:subject(i) |
| G(P(TM(i))) | thing:has-a | thing:relationship(thing:subject(i), thing:sttia,G(request(i))) |
| G(P(TM(i))) | thing:has-a | thing:relationship(thing:subject(i), thing:sttia,G(urr(i))) |
| G(request(i)) | thing:is-a | thing:graph of the things P(TM(i)) can act upon |
| G(urr(i)) | thing:is-a | thing:graph of a thing:urr(i) |

The thing:urr(i) is a Uniform Resource Request for requesting performance of a P(TM(i)). A P(TM(i)) action binds the value of the thing:urr(i) to a performable action that the P(TM(perform)) can perform. In an exemplary embodiment this can include binding to an address of an instruction in non-transitory memory, and the embodiment may further be characterized by the use of one or more operating system calls, such as fork, exec, pthread_create, connect, open, send, write, receive, read, close, wait, and/or disconnect.

In evaluating a request to perform a P(TM(i)), the P(TM (eval)) interacts with P(TM(thing)) to determine the P(TM (i)) algorithmically prepare a graph of P(TM) things that need to be accessible to P(TM(i)). In one embodiment, said graph is generated in the context of a request namespace specifically generated for the duration of P(TM(i)) action, and the response, if any, is set in the context of a response namespace. This enables P(TM(eval)) to push a new context onto the context stack for P(TM(i)) and algorithmically interact with the response namespace to update Things administered by P(TM(thing)) accordingly.

A thing:verb.vocabulary is a thing:thing such that there is a relationship to a set of thing:verbs.

| thing:verb.vocabulary (c) | thing:is-a | thing:subject(c) |
|---|---|---|
| thing:verb.vocabulary (i) | thing:has-a | thing:relationship( thing:subject(i),thing:sttia,thing:set.of(thing:verb) ) |
| thing:verb.vocabulary (i) | thing:has-a | thing:relationship( thing:subject(i),thing:sttia,G(urr(i)) ) |
| G(urr(i)) | thing:is-a | thing:graph of a thing:urr(i) |

The corresponding performable action of thing:urr(i) is performed by a P(TM(i)) to configure the verb Things for the verb vocabulary.

Exemplary Thing:Relationship

Figure 19:
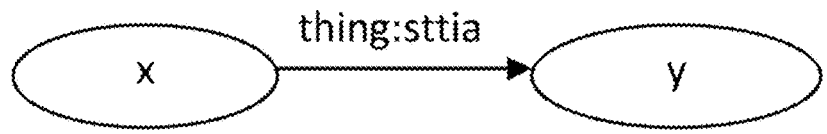
FIG. 19 is a directed graph illustrating that the Thing named x is the predecessor of the Thing named y, y is the successor of the Thing named x, and, the predicate is the thing such that there is a relationship, which is denoted as thing:sttia

The following further illustrates an embodiment of Thing relationships. As shown by the directed graph of FIG. 19, the Thing named x is the predecessor of the Thing named y, y is the successor of the Thing named x, and, the predicate is the thing such that there is a relationship, which is denoted as thing:sttia. The English interpretation is: There is a Thing where name is equal to x, such that, there is a Thing where name is equal to y. The "such that there is a" relationship is denoted by the thing:sttia edge label.

Figure 20:
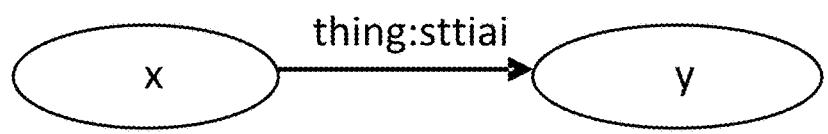
FIG. 20 is a directed graph illustrating that the Thing named x is the predecessor of the Thing named z, and the predicate is "such that there is an instance", which is denoted as thing:sttiai.

As shown by the directed graph of FIG. 20, the Thing named x is the predecessor of the Thing named z, and the predicate is "such that there is an instance", which is denoted as thing:sttiai. The English interpretation is: There is a Thing where name is equal to x, such that, there is an instance of a Thing where name is equal to z.

Figure 21:
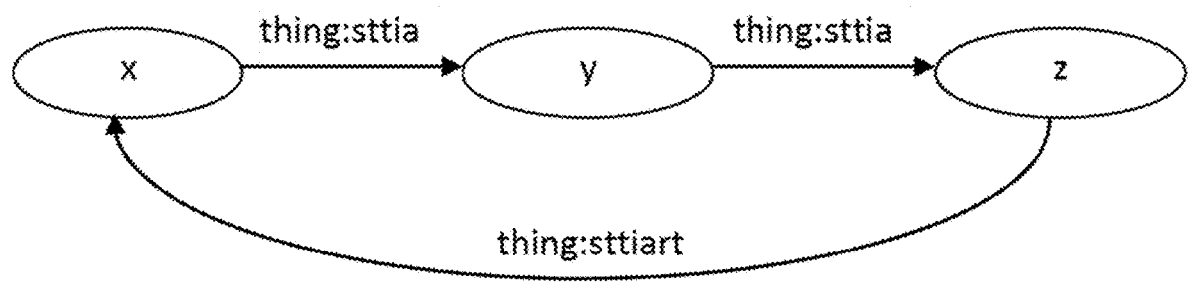
FIG. 21 is an English interpreted directed graph.

As shown by the directed graph of FIG. 21, the English interpretation is given as: There is a Thing where name is equal to x, such that, there is a Thing where name is equal to y, such that, there is a Thing where name is equal to z, such that, there is a reference to a Thing where name is equal to x. The such that there is a reference to relationship is denoted by the thing:sttiart edge label. The reference can be in the form a URI which can be interpreted as a listing.

Figure 22:
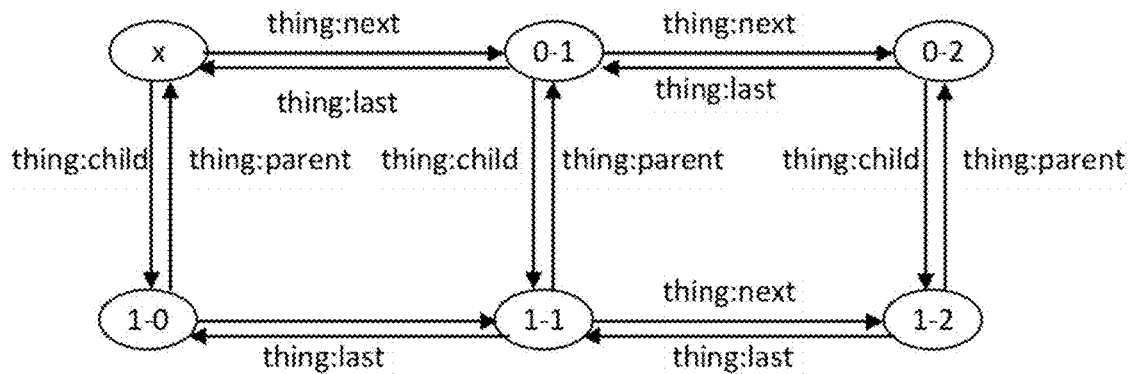
FIG. 22 is a directed graph illustrating that a Thing named x is a thing:table.

As shown by the directed graph of FIG. 22, the Thing named x is a thing:table. Using next and last edge pairs, and parent child edge pairs, the graph can be traversed in either direction.

Figure 23:
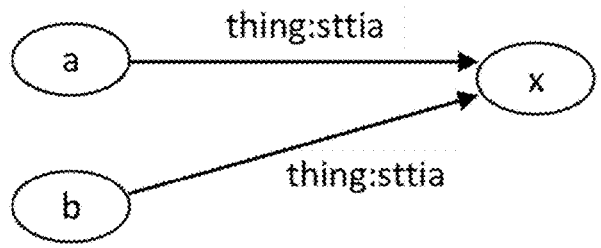
FIG. 23 is a directed graph showing that a multiplicity of Things have a relationship to a single Thing.

As shown by the directed graph of FIG. 23, a multiplicity of Things have a relationship to a single Thing.

Figure 24:
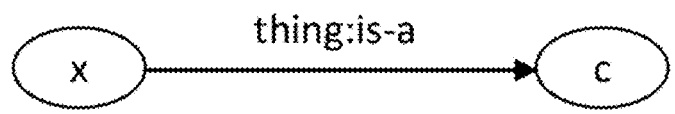
FIG. 24 is a directed graph illustrating a Thing named "x" being a member of the class of Things named "c".

As shown by the directed graph of FIG. 24, the Thing named "x" is a member of the class of Things named "c".

Figure 25:
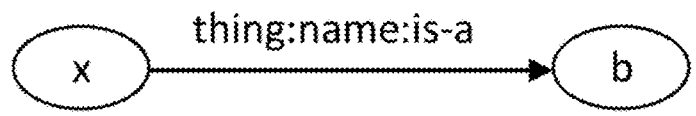
FIG. 25 is a directed graph illustrating a relationship denoting that the name of the Thing named "x" is a member of the class of Things named "b".

A predicate can denote a relationship about a non-mutable component of a Thing. As shown by the directed graph of FIG. 25, the relationship denotes that the name of the Thing named "x" is a member of the class of Things named "b".

Figure 26:
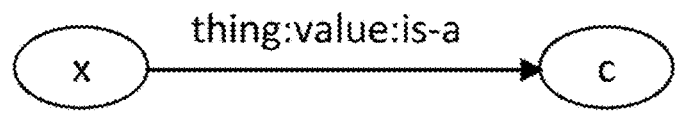
FIG. 26 is a directed graph illustrating a relationship denoting that the value of the Thing named "x" is a member of the class of Things named "c".

As shown by the directed graph of FIG. 26, the relationship denotes that the value of the Thing named "x" is a member of the class of Things named "c".

The following are exemplary Things administered by P(TM(thing)) in the administration of Things in the graph.

thing:monad—the monad is the first Thing from which all other Things administered by the P(TM(thing)) can be identified. The nodes of the directed graph are Things, and a directed edge label is a proposition that holds between the connected Things. The monad directed graph denotes the state of the Thing Machine. The monad is connected with an edge directed to a context Thing with the directed edge label "such that, there is a" which is denoted as "thing:sttia".

thing:context—the context Thing is representative of a set of Things organized as a stack, wherein the top of the stack is the Thing representative of the current context. A new context Thing may be algorithmically pushed onto the stack, or algorithmically popped off of the stack, to change the current context. An instance of a context Thing is a root of a directed graph of a set of Things that are Namespaces within the scope of that context.

thing:namespace—a namespace is a Thing that represents a named graph of somehow logically related Things, even if related simply by being members of the same namespace. The name of the graph conforms to the naming requirements of an International Resource Identifier (IRI) scheme. The rooted directed graph of the namespace starts with the Namespace Thing as the root, and the connected nodes are Things that are qualified by the Namespace Thing. The directed edge labels denote a relationship that holds between the connected Things.

Figure 27:
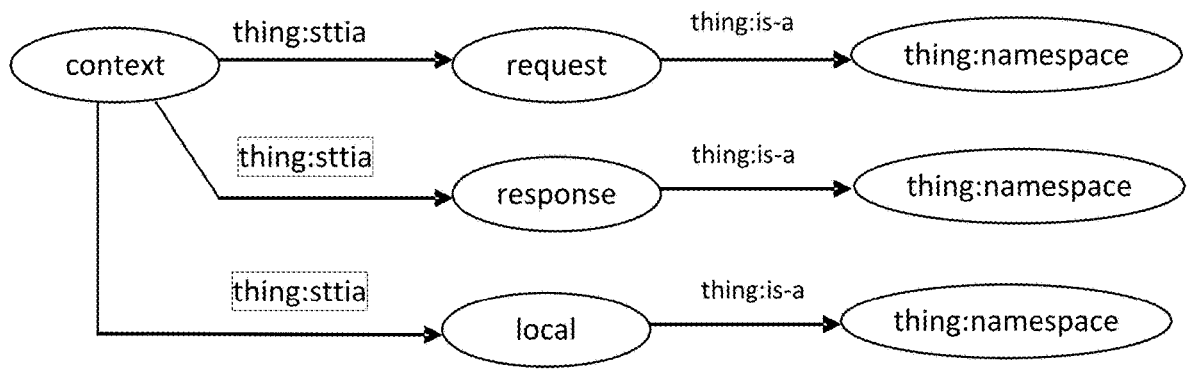
FIG. 27 is a directed graph illustrating that context includes a request, a response, and, a local namespace.

The context Thing quantifies the set of available namespace Things. Exemplary namespaces include the request, response, local, service, core, and boot namespace. Additional namespaces can be configured through the action of the P(TM(thing)). The following graph is true for each namespace of context, where the unnamed node of the graph is bound to a namespace qualified by the context. As shown by the directed graph of FIG. 27, the context includes a request, a response, and, a local namespace. An embodiment can self-configure the set of namespaces.

Exemplary namespaces are provided by table 3 below.

TABLE 3

| Namespace | Use |
|---|---|
| about: | The Things in the about: namespace are internal resources, such as settings, copyright information, licensing, component lists, and other such resources used by the Thing Machine. The namespace and the naming of Things conforms to the "about" URI scheme as described in RFC6694 |
| boot: | The Things in the boot: represent the boot state, including the boot verb vocabulary. |
| core: | The Things in the core: namespace represent the state of the core vocabulary including core verbs. The core verb vocabulary is used construct the application model. |
| local: | The Things in the local: namespace represent temporary state information. The local: namespace has local scope. |
| request: | The Things in the request: namespace represent the current request. |
| response: | The Things in the response: namespace represent the response to the current request. |

Mapping an IRI to a Namespace Thing

The IRI scheme name is mapped to a Namespace THING, and the scheme specific part of the IRI is then mapped according to the rules of the particular namespace. The default behavior is to use the dot (".") character delimiter to denote "such that there is a" relationships, and the bracket delimiters ("[" and "]") to denote "such that there is an instance of" relationships. For example, the reference: request:statement[1].word is interpreted as:

There is a NAMESPACE THING where Name is equal to "request", such that, there is a THING where Name is equal to "statement", such that, there is an instance of a THING where Name is equal to "1", such that, there is a THING where Name is equal to "word".

As mentioned in the THING Graph Data Model section, all permanent URI Schemes, as published by the Internet Assigned Numbers Authority, are reserved namespace names. The complete list of reserved namespaces is published online at iotnamespaces.com/reserved. The mapping of IRIs to reserved namespaces is also available at iotnamespace.com/mappings.

Identifying Things Using XML

Basic XML is parsed and bound in a namespace. This is important for services such as the weather service identified by the URL http://w1.weather.gov/xml/current_obs/index.xml, which use basic XML format. To illustrate the mapping, consider the fragment given as:

```
<station>
  <station_id>PADQ</station_id>
  <state>AK</state>
  <station_name>Kodiak, Kodiak Airport</station_name>
  <latitude>57.75</latitude>
  <longitude>-152.5</longitude>
  <xml_url>http://weather.gov/xml/current_obs/PADQ.xml</xml_url>
</station>
```

Upon parsing the simple XML, the following triples are true as illustrated by table 4.

TABLE 4

| Subject | Predicate | Literal Value |
|---|---|---|
| station | THING:equals | " " |
| station.station_id | THING:equals | PADQ |
| station.state | THING:equals | AK |
| station.station_name | THING:equals | Kodiak, Kodiak Airport |
| station.latitude | THING:equals | 57.75 |
| station.longitude | THING:equals | -152.5 |
| station.xml_url | THING:equals | http://weather.gov/xml/current_obs/PADQ.xml |

In basic XML, mapping, elements are mapped to THINGS, and attributes are mapped as instances of attributes of that THING.

XML Schema Definitions

From our prior example using weather station XML data, the local:station.xml_url THING has a value that identifies a resource representing the station's local data. In retrieving that resource, we find it is an XML version 1.0 document that contains, in part:

```
<current_observation version="1.0" xmlns:xsd="http://www.w3.org/2001/XMLSchema"
xmlns:xsi="http://www.w3.org/2001/XMLSchema-instance"
xsi:noNSL="http://www.weather.gov/view/current_observation.xsd">
```

In parsing the XML, the default action interprets the element as a THING, and the attributes as instances of attributes about that THING. The following triples are true, as illustrated in table 5.

TABLE 5

| Subject | Predicate | Object |
|---|---|---|
| current_observation[version] | THING:equals | 1.0 |
| current_observation[xmlns:xsd] | THING:equals | http://www.w3.org/2001/XMLSchema |
| current_observation[xmlns:xsi] | THING:equals | http://www.w3.org/2001/XMLSchema-instance |
| current_observation[xsi:noNS] | THING:equals | http://www.weather.gov/view/current_observation.xsd |

As a formal assertion, the triples can be expressed as:
There is a THING where Name is equal to "current_observation", such that,
There is an instance of a THING where
   Name is equal to "xmlns:xsd" and
   Value is equal to "http://www.w3.org/2001/XMLSchema",
and,
There is an instance of a THING where
   Name is equal to "xmlns:xsi" and
   Value is equal to "http://www.w3.org/2001/XMLSchema-instance",
   and,
There is an instance of a THING where
   Name is equal to "xsi:noNamespaceSchemaLocation" and
   Value is equal to "http://www.weather.gov/view/current_observation.xsd".

The XSD reference enables retrieving the XSD schema, so that a valid structure of the object element, sub-elements, and attributes can then be represented as THINGS in a Namespace.

XML Namespaces

In XML, a qualified name is a name that is subject to namespace interpretation. Both elements and attributes are qualified names. When parsing an XML document adhering to the XML Namespace specification, the document is parsed into the request Namespace, validated, and retains the structure of the document using the qualified names as THING names. Consider, for example, the XML document given below. The book elements includes two namespace attributes; the first defining the default XML namespace, and the second defining the isbn XML namespace. The XML 1.1 specification does not require the TM to be verified IRIs, but rather specified as a syntactically correct IRI. As such, the parses action does not map the XML IRI references to THING namespaces.

```
<?xml version="1.0"?>
<book xmlns='urn:loc.gov:books'
   xmlns:isbn='urn:ISBN:0-395-36341-6'>
   <title>Cheaper by the Dozen</title>
   <isbn:number>1568491379</isbn:number>
   <notes>
   <!-- make HTML the default namespace for some commentary -->
   <p xmlns='http://www.w3.org/1999/xhtml'>
      This is a <i>funny</i>book!
   </p>
   </notes>
</book>
```

Using the shorthand notation, the following are true, as illustrated by table 6.

TABLE 6

| request:book[xmlns] | THING:equals | urn:loc.gov:books |
| request:book[xmlns:isbn] | THING:equals | urn:ISBN:0-395-36341-6 |

TABLE 6-continued

| request:book.title | THING:equals | Cheaper by the Dozen |
| request:book.isbn:number | THING:equals | 1568491379 |
| request:book.notes[xmlns] | THING:equals | http://www.w3.org/1999/xhtml |

The formal satisfaction claims are
There is a Namespace THING where Name is equal to "request", such that,
  there is a THING where Name is equal to "book", such that,
    there is an Instance where
      Name is equal to "xmlns" and
      Value is equal to "urn:loc.gov:books", and,
    there is an Instance where
      Name is equal to "xmlns:isbn" and
      Value is equal to "urn:ISBN:0-395-36341-6".

Thing Language

In the THING graph model, all things are Things. Some THINGS are namespaces, some are verbs, and other THINGS are the THINGS that the verb actions can act upon. The relationship between the verb and the set of THINGS the verb can act upon is expressed as a THING verb graph.

Classification enables the meaning of the intended action to be inferred. In the following example statements the intended action is to "set" something using a THING and a unit of time; however, the required action per statement is very different.

Set the timer to 6:00 minutes.
  Set the clock to 6:00 AM.
  Set the alarm for 6:00 PM.

A parsing action is performed to parse a statement as a thing:graph THING graph. The evaluate verb evaluates the thing:graph in the context of the verb vocabulary graph, to select a candidate verb. The evaluate verb action binds the THINGS in the request graph to the THINGS in the candidate verb graph to identify the instance of the verb graph that needs to be performed. The perform action is triggered to cause the identified verb action to be performed in the context of the bound THINGS.

Thing Statements

The Thing Language offers both imperative and declarative statement structures. In a general sense, the minimal boot vocabulary lends itself toward the use of imperative statements, whilst the more expressive core vocabulary enables the use of declarative statements. The ABNF definition for a Thing statement is provided below. The ABNF syntax is defined in RFC2234.

thing:statement=statement-1/statement-2
  statement-1=ne-pair
  statement-2=listing expression [";" ]
  nv-pair=listing=DQUOTE value DQUOTE [";" ]
  ne-pair=listing=OP expression CP
  expression=*(ne-pair/nv-pair)

listing=namespace ":" namespace-specific-part
OP="("
CP="}"
DQUOTE=""

As an example, the following imperative statement instructs the Thing Machine to set the Thing identified by the listing request:my.name to the value John.

set=(request:uri="request:my.name" request:value="John")

The P(TM(bind)) action can be used to bind listings to Things that an action can act upon so that the above statement could be specified as:

set=(request:my.name="John")

In general, the same syntax applies to any statement in the THING language. Note that the THINGS that the verb action can act upon are contained with the "(" and ")" delimiters.

```
set=( request:uri="local:counter" request:value="1" )
while=(
    condition=(
        is.less.than=(
            request:uri="local:counter"
            request:value.of="local:max.value"
        )
    )
    action=(
        increment=(
            request:listing="local:counter"
        )
    )
)
```

The simple syntax of the THING language translates easily to other languages. For example, the above statement can be expressed in JSON, as shown below.

```
{
    "set": {
        "request:listing": "local:counter",
        "request:value": "1"
    },
    "while": {
        "condition": {
            "is.less.than": {
                "request:listing": "local:counter",
                "request:value.of": "local:max.value"
            },
        }
        "action": {
            "increment": {
                "request:listing": "local:counter"
            }
        }
    }
}
```

Similarly, the example statements can be expressed using THING/XML.

```
<set>
    <request:listing>local:counter</request:listing>
    <request:value>1</request:value>
</set>
<while>
    <condition>
        <is.less.than>
            <request:listing>local:counter</request:listing>
            <request:value.of>local:max.value</request:value.of>
        </is.less.than>
    </condition>
    <action>
        <increment>
            <request:listing>local:counter</request:listing>
        </increment>
    </action>
</while>
```

Any number of languages and syntax can be used, as long as the parser action can parse the data into a thing:graph.

Multipart data is supported, as shown below. In this example we present a simple statement based on the set verb. Note that request:listing is not specified. The evaluate verb action will interact with the request: graph, and the corresponding verb graph in the verb vocabulary, to bind THINGS in the request: graph to THINGS that the verb can interact with. In this example, the value of request:listing defaults to rcd:Contact, and the value of the request:class defaults to thing:thing.

```
set=(
    rcd:Contact=(
        Name=(
            Last="Amrit"
            First="Vivaan"
        )
        Email="v.amrit@iotnamespace.com"
        Status="pending"
    )
)
```

The above statement is equivalent to:

```
set=(
    request:listing="rcd:Contact.Name.Last"
    request:value="Amrit"
    request:class="thing:thing"
)
set=(
    request:listing="rcd:Contact.Name.First"
    request:value="Vivann"
    request:class="thing:thing"
)
set=(
    request:listing="rcd:Contact.Email"
    request:value="v.amrit@iotnamespace.com"
    request:class="thing:thing"
)
set=(
    request:listing="rcd:Contact.Status"
    request:value="pending"
    request:class="thing:thing"
)
```

A declarative statement follows the same general syntax as an imperative statement. To illustrate the differences, we will start with a simple example using three imperative statements to initialize the listing painting:Gallery as an auto-instanced THING. A THING that is classified as thing:auto-instance, will have a new instance automatically added each time the THING is used in a set verb action.

```
set=(
    request:listing="painting:Gallery"
    request:class="thing:auto-instance"
    Name=" Zhang Daqian
    Title="Peach Blossom Spring"
)
```

```
            set=(
                request:listing="painting:Gallery"
                Name="Van Gogh"
                Title=" Almond Blossom"
            )
            set=(
                request:listing="painting:Gallery"
                Name="Ylli Haruni"
                Title="Cherry Blossom"
            )
```

The following declarative statement is then used to express what we want, without detailing each step required.

```
            evaluate=(
                using=(
                    request:instances.of="painting:Gallery"
                    request:as="gallery:"
                )
                for.each.time=(
                    condition=(
                        is.like=(
                            request:listing="gallery:Title"
                            request:pattern="^.*Blossom$"
                        )
                    )
                )
                perform=(
                    display=(
                        listing[1]="gallery:Name"
                        listing[2]="gallery:Title"
                    )
                )
            )
```

The output of the above is given as:
Van Gogh Almond Blossom
Ylli Haruni Cherry Blossom Namespace Scope A namespace is a THING that represents a named graph of somehow logically related THINGS, even if related solely by being members of the same namespace. Namespaces THINGS are qualified by the context THING, and the name of the graph (the name of the Namespace) conforms to the naming requirements of an IRI scheme. All permanent URI Schemes, as published by the Internet Assigned Numbers Authority, are reserved namespace names.

Classifications

THINGS can be classified as being a member of a class of THINGS. All THINGS are THINGS. Some THINGS are integers, some are floats, and some are sets, and so on. The Namespace system self assembles with a Set of Core Classes, upon which additional classes can exist. Chapter 2 provides detailed information on classes.

The following example is interpreted as: perform the set action so that there is a THING where Name is equal to local, and, this THING is a namespace, such that, there is a THING where Name is equal to scores. In this context, scores is a THING.
    set=(listing="local:scores")
The following example describes a request to set scores as a floating point number.
    set=(class=float listing="local:scores" value="83.25")

Communication Primitives

A communication Primitive is a THING that provides an interface for communicating. Primitives enable common actions such as connect, send, receive, and disconnect. Communication Primitives for various types of communication are provided include web THINGS, sockets, files, RS232, URI schemes, and Uniform Resource Request listing.

Communication Points

A communication point is a THING that a communication primitive interacts with to cause communications to occur.

Regular Local Files
    connect=(listing=file://~/mydocuments/scores.txt
        as=compoint:1)
    send.line=(compoint="compoint:1" value="93")
    send.line=(compoint="compoint:1" value="87")
    send.line=(compoint="compoint:1" value="92")
    close=(compoint="compoint:1")

Using Unencrypted Standard Email
    connect=(listing="email:johnkingburns@gmail.com"
        as=compoint:2)
    send=(compoint="compoint:2" value="Subject: Meeting")
    send=(compoint="compoint:2" value="John, let's meet on Tuesday at 10:00 am to discuss the plan.")
    close=(compoint="compoint:2")

Using Encrypted Active Namespace
    connect=(listing="activeNamespacejohn.king.burns"
        as="compoint:jkb")
    send=(compoint="compoint:jkb" value="Subject: Meeting")
    send=(="compoint:jkb" value="John, let's meet on Tuesday at 10:00 am to discuss the plan.")
    close=(="compoint:jkb")

Statements

In the THING Language a statement includes a verb and zero or more Object name=expression pairs. Each expression is a value expression or a name=expression pair. The binder can bind dot delimited verb modifiers.
    verb[.modifier[.modifier]] name_expression
    name_expression: name="(" name_expression|value_expression ")"
    value_expression: quote literal end_quote
        : literal
        : "(" mathematical_expression ")"

A name expression is quantified by the name containing the name expression. Thus a=(b=1) is interpreted as: There is a THING where name is equal to a, such that, there is a THING where name is equal to b and value is equal to 1. A multipart statement, such as a=(b=1 c=2) is interpreted as: There is a THING where name is equal to a, such that, there is a THING where name is equal to b and value is equal to 1, and, there is a THING where name is equal to c and value is equal to 2.

A value expression is a literal and it may be quoted. A literal value including a space character must be quoted. Thus, a=house, a="house", a='house' are equivalent. Similarly, a="red house" and a='red house' are equivalent.

A mathematical expression is enclosed in double parentheses, and need not be quoted. As an example a=((10+-2*(6/3))). Normal orders of operations apply, and expressions may be enclosed with parenthesis. Functions are not supported, but math verbs are. Thus, a=((2*sqrt(4))) would be evaluated as one would expect as long as sqrt is a verb in the math verb vocabulary.

To explicitly represent a statement, the format is:
    statement=(verb_expression Object_expression)
    modifier_expression: "." modifier modifier_expression
        : modifier
    verb_expression: verb modifier_expression
        : verb
    Object_expression: name_expression Object_expression
        : name_expression

Action Blocks

An Action Block is a sequence of statements to be evaluated as a unit. This enables the Namespace System to perform the block and allow the logic to address true and false type statements. The general syntax of an action block is:

```
action block=(
    statement-1
    statement-2
    action=(
        ...
    )
    statement-n
)
```

In the following example, a simple action block sequence is provided in

```
action=(
    set=( listing="local:counter" value="1" )
    print=( listing="local:counter" )
)
```

Conditionals

The Namespace System provides for conditional evaluations of an action. IF, ELSE-IF, and ELSE conditionals are supported.

```
if=(   condition=( is.less.than=( listing="local:number" value='10' ))
    action=( increment=( listing="local:number" )))
else.if=(   condition=( is.less.than=( listing="local:number" value='20' ))
       action=( increment=( listing="local:number" by.value="2" )))
else=(action=(break))
```

Iteration

Iteration is enabled by the for and while.condition verb actions.

```
for=(
    condition=(
        is.less.than=( lhs="local:number" rhs='5')
    )
    action=(
        increment=(var="local:number)
    )
)
while=(
    condition=( is.less.than=( lhs="local:number" rhs='5')
    action=(
        increment=(var=local:number)
    )
)
set
```

The set verb action will set the THING, given by the value of the request:listing according to the rules of the classification identified as the value of request:class. When the class is not explicitly specified, then the evaluate verb action will determine an appropriate classification based on the Things in the statement.

Figure 28:
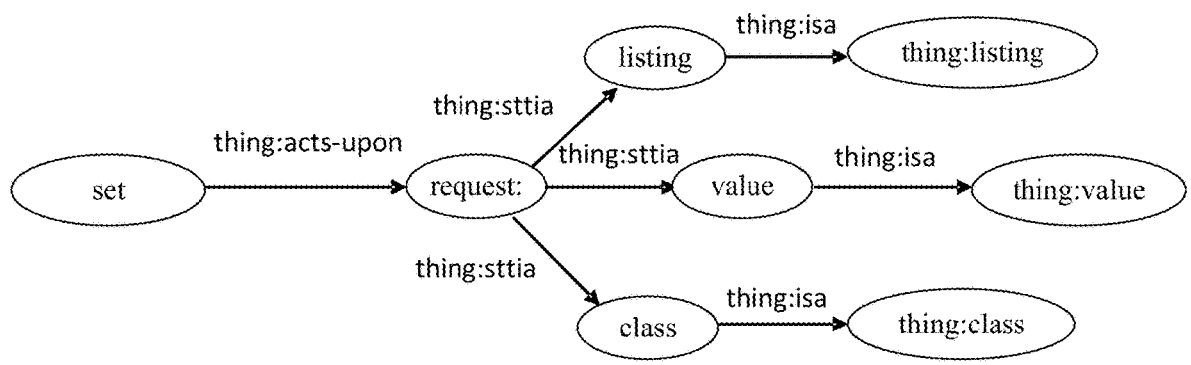
FIG. 28 is a verb graph showing that classification defaults to request:class="thing:thing".

In the following statement, the classification defaults to request:class="thing:thing", and the corresponding verb graph is shown in FIG. 28.

```
set=(
    request:listing=listing
    request:value=expression
)
```

Figure 29:
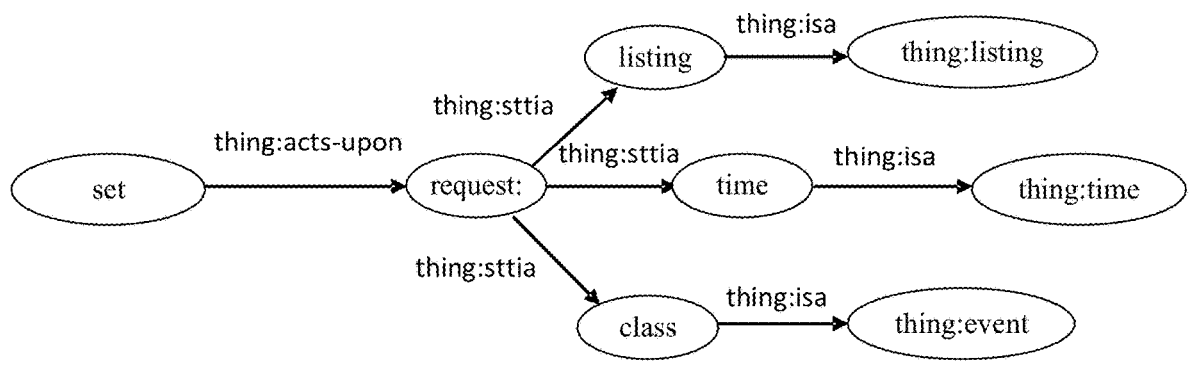
FIG. 29 is verb graph corresponding to a classification defaulting to request:class="thing:alarm".

In the following statement, the classification defaults to request:class="thing:alarm", and the corresponding verb graph is shown in FIG. 29.

```
set=(
    request:listing=listing
    request:time=time
)
```

A verb statement for the set is shown here. As new classifications are added, additional verb actions may be necessary to support the meaning of the classification, and these may be added to the vocabulary using verb modifiers.

```
set=(
    request:listing=listing
    request:value=expression
    request:class=class
)
``` thing:graph—A thing:graph is a directed graph of a Thing and its related Things, and may be expressed as a sub-graph of all possible Things and their relationships from a root directed graph. An unnamed vertex label is interpreted as the thing:identifier. Otherwise, one or more named non-mutable components and representations may be used as the vertex label. In the preferred embodiment, Name: name, and Value: value, are used to denote the thing:identifier, and thing:value, respectively, when such distinction is required.

An unnamed vertex in a thing:graph, is the set of Things in the domain of discourse, qualified by the predecessors of the unnamed vertex if any, that satisfy the unnamed vertex directed graph.

thing:subgraph—A P(TM(i)) may act upon a thing:subgraph of the monad rooted directed graph thing:statement—a thing:graph representative of a statement to evaluate.

thing:statement.declarative—a declarative thing:statement.

thing:statement.imperative—an imperative thing:statement.

thing:statement.interrogative—an interrogative thing:statement.

thing:statement.exclamatory—an exclamatory thing:statement.

thing:listing—a listing is a representation of a reference to a Thing. A qualified listing includes a representation of a reference to a namespace, and has the general format "namespace: namespace-specific-part", the format is comparable to a URI comprised of a "scheme: scheme-specific part". An unqualified listing (also referred to as an unbound listing), can be algorithmically qualified by P(TM(bind)). A thing:listing is resolved by the algorithmic action of P(TM (thing)).

The namespace-specific-part can be resolved through the use of get, set, and unset disciplines for a given namespace. This enables the predictable algorithmic action to resolve a reference, even when the interpretation of the namespace-specific-part is dependent on the namespace being modeled.

Free Variables

A representation of a reference to a Thing is considered a free variable. The P(TM(bind)) algorithmically binds the reference within the set of Things defined by the context. In traversing the thing:graph, the context of Things is algorithmically updated to reflect those Things that are applicable in the current scope of Things within the domain of discourse. Consider the following assertion:

There is a Thing, such that, there is a Thing where name is equal to Contact, and, there is a Thing where name is equal to Email.

The opening reference "There is a Thing, such that" indicates that all possible Things in the domain of discourse administered by P(TM(thing)) are considered in the current set of Things. The P(TM(bind)) then disqualifies all such Thing in the current set for which the limitation "such that, there is a Thing where name is equal to Contact, and, there is a Thing where name is equal to Email" does not hold.

Figure 30:
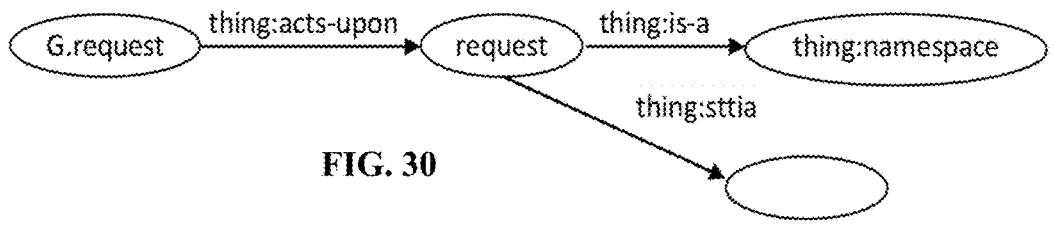
FIG. 30 is a graph illustrating that G.request(P(TM(i))) indicates that P(TM(i)) can act upon a Thing qualified in the request namespace.

Referring to FIG. 30, G.request(P(TM(i))) indicates that P(TM(i)) can act upon a Thing qualified in the request namespace. The unnamed node denotes that the P(TM(i)) can act upon some Thing qualified in the request namespace, without identifying the Thing by name.

Figure 31:
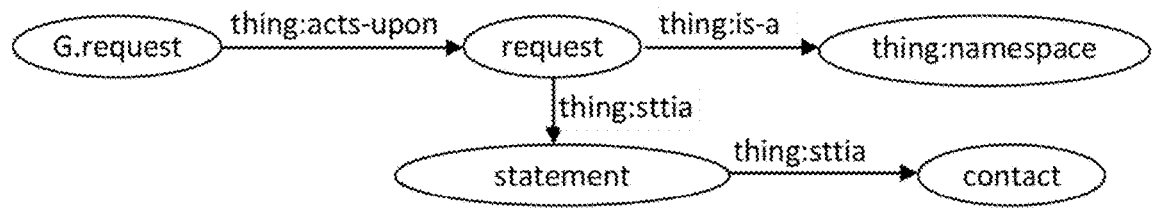
FIG. 31 is a graph illustrating that G.request(P(TM(i))) indicates that P(TM(i)) can act upon a Thing named Contact that is qualified by a Thing named statement, that is qualified in the request namespace.

Referring to FIG. 31, G.request(P(TM(i))) indicates that P(TM(i)) can act upon a Thing named Contact that is qualified by a Thing named statement, that is qualified in the request namespace.

Figure 32:
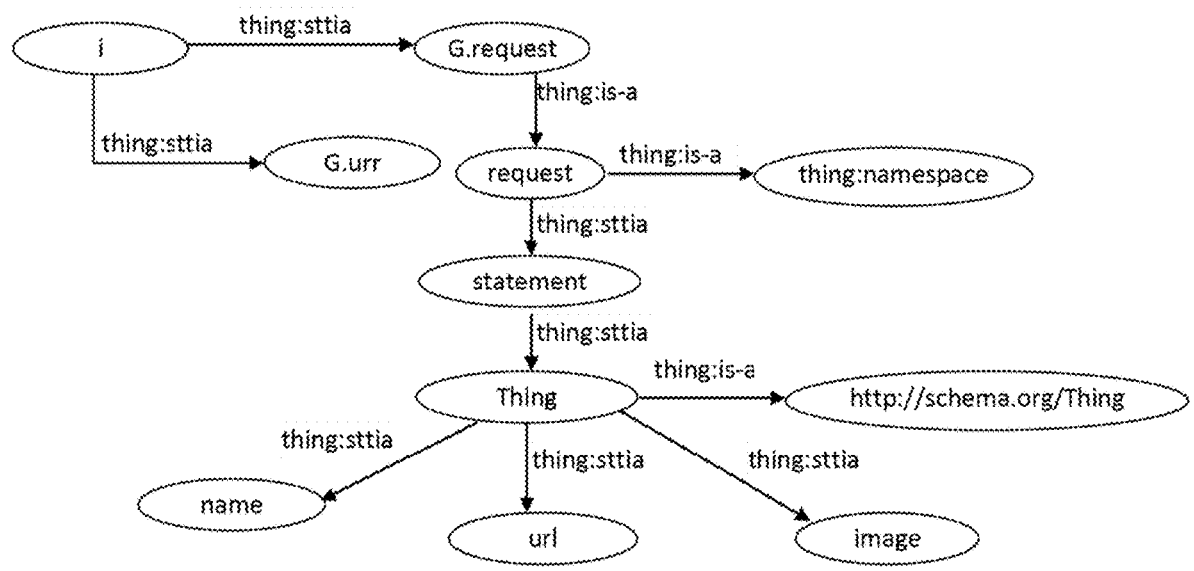
FIG. 32 is a graph illustrating that the exemplary G(P (TM(i))) is a rooted directed thing:graph that includes a G.request(P(TM(i))) subgraph, and, a G.urr(P(TM(i))) subgraph denoting how P(TM(perform)) is to request the P(TM (i)) to perform its action.

Referring to FIG. 32, the exemplary G(P(TM(i))) is a rooted directed thing:graph that includes a G.request(P(TM(i))) subgraph, and, a G.urr(P(TM(i))) subgraph denoting how P(TM(perform)) is to request the P(TM(i)) to perform its action. Note that the components of the request:statement.Thing satisfy the components of a Thing schema as defined by http://www.schema.org/Thing.

Uniform Resource Request

A Uniform Resource Request (URR) Thing is a URI that can be interpreted by P(TM(thing)) as a request for a performable action to be performed. By way of example:

stdlib:load:///usr/local/lib/libboot.so?entry='init'
http:get//www.iotsystems.com/index.hml
http://www.iotsystem.com/index.html
task:list.my.contacts?request:pattern='[A-M].*'

The distinction between a URR and a conventional URI is that a URR is evaluated in the context of Things in a thing:namespace instead of a request for a server to provide an identified resource.

The stdlib:load Thing is an Active Thing whose performable action dynamically loads the corresponding library, resolves a reference to the value of the entry Thing as a performable actions, and performs that action. The action is typically embodied using dlopen( ) and dlsym( ) calls, or equivalent calls on the Windows, Linux, BSD, iOS, or other such operating systems. See pubs.opengroup.org/onlinepubs/009695399/functions/dlopen The response from the performance of the action is a set of thing:statements requesting the Thing Machine configure thing:verbs correlating to the loaded actions. P(TM(bind)) can be used to bind entry point references to performable actions using the dlsym( ) or equivalent operating system call.

The stdlib:unload Thing is an Active Thing whose performable action unloads the corresponding library. The action is typically embodied using dlclose. See pubs.opengroup.org/onlinepubs/009695399/functions/dlclose Care must be taken to note the distinction between client and server resource resolution when using URR versus URI, with the former being resolved to a resource by the Thing Machine, versus the later commonly being resolved to a resource by a server.

A P(TM(i)) can generate a URR and request the P(TM) to evaluate and perform an appropriate action. As an example, a P(TM(parse)) can interact with content to parse, and discover it is in a format or language the parser action does not understand. In such cases, the P(TM(parse)) can request the evaluation and performance of a second P(TM(i)) action that may be able to parse the content.

A first Thing Machine with communication capability can communicate a request to a second Thing Machine to identify a Thing (or the contents thereof). A second Thing Machine can teach the first Thing Machine what something represents; actions that can act upon it; and/or tasks that can be performed using it.

Core POSIX Vocabulary

Core PO SIX.1-2008 defines a standard operating system interface and environment, including a command interpreter (or "shell"), and common utility programs to support applications portability at the source code level. It is intended to be used by both application developers and system implementers. See: pubs.opengroup.org/onlinepubs/9699919799

The core vocabulary follows the POSIX.1-2008 System API though not all application programming interfaces are currently provided. Parameters are Things, and where appropriate conversions between character strings and real integers are provided by the corresponding verb action. The embodiment of a Thing includes a non-mutable component for system specific data so that pointers to data structures can be provided when necessary. By way of example, the POSIX standard that defines the unlink( ) function is defined as "int unlink(const char *path)" which is embodied as a verb action named "unlink" that acts upon the Thing identified by the listing request:path. In the embodiment, the functions are implemented as verb things (i.e., thing:verbs) and configured in the verb namespace, though a suitable namespace such as posix may be used instead, and, the context appropriately set for resolving references. Algorithmic procedures specific to the application domain can be configured. A commonly used verb action, such as http:get for example, can be configured to use the GET method of the HTTP protocol to retrieve a resource specified by a URI.

Executables can be configured as verb actions using interprocess communications, or standard file descriptors. For example, the /bin/date(1) command is well known in the Unix and Linux communities, and can be configured though the output may need to be parsed into a suitable format for the implementation to parse. The listing bin:date for example, can have a performable action that is to exec(2) the/bin/date executable in a separate address space, and pipe the output back as the value of the response. The URR bin:date//response:as="data:date" is interpreted as a request for the bin:date verb action to be performed, and the response (read from the standard output of the command) to be configured as the value of the Thing given by the listing data:date.

Using a well-defined set of verb actions, a task sequence may be translated to source code which can be compiled and performed as an executable to eliminate the steps of evaluating statements and binding Things.

Thing:Machine

A Thing that describes an embodiment of a Thing Machine is a thing:machine. Referring to FIG. 66, P(TM) parses the content expressed in the Thing Language that describes a desired configuration for P(TM). P(TM) interacts with P(TM(thing)) to construct a thing:graph representative of the P(TM), and said thing:graph is a thing:machine Thing.

One skilled in the art of Public Key Infrastructures can embody an authenticating action to ensure the authenticity of the content, such as by the use of X509 certificates, digital signatures, and the use of OpenSSL identity, authentication, and authorization algorithmic actions.

Referring to FIG. 66, a thing:graph describing a thing:machine is comprised of a set of Things denoting the vocabularies, including:
 a) a boot vocabulary;
 b) a core vocabulary; and,
 c) an application runtime vocabulary;
and optional Things from the set including:
 d) a hardware Thing; and,
 e) an operating system Thing.

Note that a hardware Thing can include a processor Thing describing a processor, and, one or more component Things. Hardware Things can include a vocabulary Thing.

The set of Things describing a vocabulary can be comprised of:
 a) the uniform resource request for requesting the verb vocabulary performable actions to be loaded;
 b) the content describing the thing:graph of the thing: verbs;
 c) the listing for the vocabulary;
 d) a prerequisite things;
 e) a discipline thing;
 f) a thing identifying the author;
 g) a thing identifying the distributor which may be discrete from the owner;
 h) a thing identifying the owner which may be discrete from the author;
 i) a thing used in authenticating the content;
 j) a thing used in authorizing the use of the content; and,
 k) a property from https://www.schema.org/SoftwareApplication Note that the application vocabulary URR uses stdfile:parse which performs the action of reading and parsing the file as thing:statements to evaluate. In the embodiment, the statements include a set of tasks to be configured, a runtime task, and a set of services to offer. In the embodiment, the tasks and the services including action blocks and the task is performed by performing the task's action block. Similarly, the service is provided by performing the service's action block. One skilled in the art can configure a multiplicity of tasks and services.

The following are examples of content expressed in the Thing language, wherein said content describes a TM(i).
TM:RaspberryPi3

The following is an example of content expressed in the Thing language, wherein said content describes a TM(i).

```
TM:raspberryPi3=(
    datasheet="https://cdn.sparkfun.com/datasheets/Dev/RaspberryPi/2020826.pdf"
    SOC="Broadcom BCM2837"
    CPU="4x ARM Cortex-A43, 1.2 GHz"
    RAM="1GB LPDDR2 (900 MHz)"
    Ports="HDMI"
)
```

TM(raspberryPi3) is a computational machine configured to perform P(TM) comprising the actions: performing self-configured thing:machine.boot.vocabulary performable actions to configure thing:machine.core.vocabulary to interact with thing:machine.hardware.component.parts, and configure thing:machine.application.vocabulary; and, perform the application runtime.
TM(AMS.TMD26723)

The following is an example of content expressed in the Thing language, wherein said content describes a TM(i). The TMD26723 is a Digital proximity detector, LED driver and IR LED in an optical module 1.8v I2C interface provided by the AMS Corporation (see www.ams.com). The product datasheet is available at ams.com/eng/content/download/364923/1210537/207915.

```
TM:AMS.TMD26273=(
    description="Digital proximity detector, LED driver and IR LED in an optical module"
    manufacturer="AMS"
    website="http://www.ams.com"
    datasheet="http://ams.com/eng/content/download/364923/1210537/file/TMD2672_Datasheet_EN_v1.pdf"
    vocabulary=(
        definition="http://www.thinglanguage/ams/tmd26273/"
        listing="TM:AMS.tmd26273"
        urr="stdlib:///usr/local/iotmachine/tm/libtmd2672.so?entry='init'"
    )
)
```

TM(AMS.TMD26723) is a computation machine configured to interact with the TM2671 using i2c communications configured as specified by the datasheet, and, providing P(TM(AMS.TMD26723)) actions as listed in table 7, below.

TABLE 7

| P(TM(i)) | Provides action of |
| --- | --- |
| disable.interrupts | disabling proximity interrupts; |
| disable.proximity | disabling the proximity function; |
| disable.wait | disabling the wait timer; |
| enable.interrupts | enabling proximity interrupts; |
| enable.proximity | enabling the proximity function; |
| enable.wait | enabling the wait timer; |
| get.proximity | getting the current measured proximity detected; |
| set.command.register | Setting the command register; |
| set.enable.register | setting the Enable Register; |
| set.pdiode | setting the TMD26723 to use channel 0 diode, channel 1 diode, or, both channel 0 and channel 1 diodes; |
| set.pdrive | setting the LED strength; |
| set.persistence | controlling filtering interrupt capabilities of TMD26723. Interrupts are generated after each ADC integration cycle, or, if the ADC integration has produced a result that is outside of the values specified by the threshold register for some specified amount of time; and, |
| set.pgain | setting the proximity gain value; |
| set.power.off | disabling the oscillator; |
| set.power.on | enabling the oscillator; |
| set.proximity.pulse | setting the number of proximity pulses that will be transmitted; |
| set.proximity.register | setting the proximity timing register to control the integration time of the proximity ADC in 2.72 ms increments; |
| set.proximity.threshold | setting the high and low trigger points for the comparison action for interrupt generation; (Note: If the value generated by the proximity channel crosses below the lower threshold specified, or, above the higher threshold specified, an interrupt is signaled to P(TM(AMS:TMD26723.receive.interrupt)) which then interacts with P(TM(thing)) to set a specified Thing to reflect the interrupt); |
| set.timing.register | setting the ALS Timing Register; and, |
| set.wait.time | setting the wait time register. If WLONG is set, then the WLONG bit is asserted and the wait times are 12x longer; |

Note that in a preferred embodiment, P(TM(i)) will algorithmically interact with P(TM(thing)) to access and interact with Things the P(TM(i)) action can act upon. P(TM(i)) interacts with P(TM(thing)) to set the status to FAILED for any value that is not within range of values permitted by the P(TM(i)) action, and, to set the reason to INVALID VALUE. In a preferred embodiment, the reference names for the actions are configured in the TMD26723 namespace, though a second embodiment may use a different namespace.

Additional actions can be included by the embodiment including actions to open a communication channel to the TMD26723 using the i2c interface, thus enabling the actions to act upon a Thing representative of the channel. This is useful when a multiplicity of TMD26723 sensors is used in an embodiment.

TM(piborg.ultraborg)

Ultraborg is a Precision servo control with ultrasonic module support, interface board with i2c communication. The board provides 4 HC-SR04 Ultrasonic distance sensor connectors, and, up to 4 servo motor connectors. The HC-SR04 has a field of view viewing angle of 30 degrees.

The following is an example of content expressed in the Thing language, wherein said content describes a TM(i).

---

```
TM:piborg.ultraborg=(
    description="Precision servo control with ultrasonic module support,
interface board with i2c communication"
    manufacturer="piBorg"
    website="http://www.piborg.com"
    datasheet=" https://www.piborg.org/downloads/ultraborg/
UltraBorg.PDF"
    vocabulary=(
        definition="http://www.thinglanguage/piborg/UltraBorg/"
        listing="TM:piborg.ultraborg"
        urr="stdlib:///usr/local/iotmachine/tm/libtmd2672.so?entry='init'"
    )
)
```

---

TM(piborg.ultraborg) is a computational machine configured to interact with the Ultraborg using i2c communication configured as specified by the datasheet, and, providing P(TM(piborg.ultraborg)) action as shown by table 8.

TABLE 8

| P(TM(i)) | Provides the action of: |
| --- | --- |
| initialize | initializing i2c communication to an ultraborg board; |
| get.proximity | getting the filtered distance for specified ultrasonic module in millimeters; |
| get.raw.distance | getting the raw distance (the unfiltered distance) for the specified ultrasonic module; |
| get.servo.position | getting the drive position for the specified servo; |
| set.servo.position | setting the drive position for the specified servo; |
| get.servo.minimum | getting the minimum PWM level for the specified servo; |
| get.servo.maximum | getting the maximum PWM level for the specified servo; |
| get.servo.startup | getting the startup PWM level for the specified servo; |
| calidate.servo.position | setting the raw PWM level for the specified servo; |
| get.raw.servo.position | getting the raw PWM level for the specified servo; |
| set.servo.minimum | setting the minimum PWM level for the specified servo; |
| set.servo.maximum | setting the maximum PWM level for the specified servo; and, |
| set.servo.startup | setting the startup PWM level for the specified servo |

Note that in a preferred embodiment, P(TM(i)) will algorithmically interact with P(TM(thing)) to access and interact with Things the P(TM(i)) action can act upon. P(TM(i)) interacts with P(TM(thing)) to set the status to FAILED for any value that is not within range of values permitted by the P(TM(i)) action, and, to set the reason to INVALID VALUE.

In a preferred embodiment, the reference names for the actions are configured in the specified namespace, though a second embodiment may use a different listing.

In one embodiment, a HC-SR04 ultrasonic sensor is mounted on a surface that is rotatable by the servo motor motion. In this manner, the servo motor can rotate the surface, such as in 30 degrees increments, to enable the ultrasonic sensor to incrementally cover a wider area.

In a second embodiment, a HC-SR04 ultrasonic sensor is mounted on a fixed position, such as facing forward, to measure distance up to 4 meters with a fixed 30 degree field of view.

TM(Ublox.neo-6m-gps)

Neo-6M-GPS is a ublox 6 GPS module ROM, crystal using standard GPIO interfaces.

The following is an example of content expressed in the Thing language, wherein said content describes a TM(i).

---

```
TM:Ublox.neo-6m-gps=(
    description="Precision servo control with ultrasonic module support,
interface board with i2c communication"
    manufacturer="Ublox"
    website="http://www.ublox.com"
    datasheet=" https https://www.u-blox.com/sites/default/files/products/
documents/NEO-6_DataSheet_%28GPS.G6-HW-09005%29.pdf?utm_
source=en%2Fimages%2Fdownloads%2FProduct_Docs%2FNEO-
6_DataSheet_%28GPS.G6-HW-09005%29.pdf"
    vocabulary=(
        definition="http://www.thinglanguage/u-blox/neo-6m-gps/"
        listing="TM:u-blox.neo-6m-gps"
        urr="stdlib:load///usr/local/iotmachine/tm/libneo6mgps.so?entry=
'init'"
    )
)
```

---

TM(Ublox.neo-6m) is a computational machine configured to interact with the u-blox Neo 6M GPS using general purposes i/o configured as specified by the datasheet, and, providing P(TM(Ublox.neo-6m)) actions as shown by table 9.

TABLE 9

| P(TM(i)) | Provides the action of: |
| --- | --- |
| Ublox.neo-6m.initialize | initializing communication to ublox neo-6m gps; |
| Ublox.neo-6m.open | opening a session; |
| Ublox.neo-6m.close | closing a session; |
| Ublox.neo-6m.send | sending a command; |
| Ublox.neo-6m.receive | receiving a response; and, |
| Ublox.neo-6m.wait | waiting for a time period, which may be specified in place of a default time, for data to be available to read; |
| Ublox.neo-6m.get.location | Setting a thing:graph representative of the longitude, latitude, altitude, and time. |

Note that in a preferred embodiment, P(TM(i)) will algorithmically interact with P(TM(thing)) to access and interact with Things the P(TM(i)) action can act upon. P(TM(i)) interacts with P(TM(thing)) to set the status to FAILED for any value that is not within range of values permitted by the P(TM(i)) action, and, to set the reason to INVALID VALUE. In a preferred embodiment, the reference names for the actions are configured in the specified namespace, though a second embodiment may use a different listing.

TM(HC-SR501)

HC-SR501 Pyroelectric Infrared PIR Motion Sensor Detector Module. The following is an example of content expressed in the Thing language, wherein said content describes a TM(i).

```
TM:HC-SR501=(
  description="PIR Motion Sensor"
  vocabulary=(
    definition="http://www.thinglanguage/sensor/hc-sr501/"
    listing="TM:HC-SR501"
    urr="stdlib:load///usr/local/iotmachine/tm/libpir.so?entry='init'"
  )
)
```

TM(HC-SR501) is a computational machine configured to interact with the PIR using General Purpose I/O interface as specified by the datasheet, and, providing P(TM(HC-SR501)) action illustrated by table 10.

TABLE 10

| P(TM(i)) | Provides the action of: |
|---|---|
| Init | initializing the HC-SR501 communication; and, |
| detect.motion | detecting if there was motion. |

Note that in a preferred embodiment, P(TM(i)) will algorithmically interact with P(TM(thing)) to access and interact with Things the P(TM(i)) action can act upon. P(TM(i)) interacts with P(TM(thing)) to set the status to FAILED for any value that is not within range of values permitted by the P(TM(i)) action, and, to set the reason to INVALID VALUE. In a preferred embodiment, the reference names for the actions are configured in the specified namespace, though a second embodiment may use a different listing.

Cirrus Logic Audio Card

The Cirrus Logic Audio Card, produced by Element14 in collaboration with Cirrus Logic, offers Raspberry Pi® users similar flexibility to a PC sound-card to capture audio alongside their camera, and experiment with stereo digital capture and playback.

The following is an example of content expressed in the Thing language, wherein said content describes a TM(i).

```
TM:Element14.CLAC=(
  description="PIR MotionSensor"
  vocabulary=(
    definition="http://www.thinglanguage/element14/CLAC/"
    listing="TM:Element14.CLAC"
    urr="stdlib:load///usr/local/iotmachine/tm/libe14clac.so?entry='init'"
  )
)
```

TM(Element14.CLAC) is a computational machine configured to interact with the Cirrus Logic Audio Card interface as specified by the datasheet; a stereo microphone connected to the stereo line input; two external powered stereo speakers are connected to the stereo line output; and, providing P(TM(Element14:CLAC)) actions as illustrated by table 11.

TABLE 11

| P(TM(i)) | Provides the action of: |
|---|---|
| initialize | initializing communication with the CLAC; |
| wake.up | detecting if there was notion; |

TABLE 11-continued

| P(TM(i)) | Provides the action of: |
|---|---|
| start.recording | starting a recording session; |
| stop.recording | stopping a recording session; |
| sleep | transitioning to sleep state listening for a wake up command; |
| play.audio.to.headphone | playing an audio from a specified Thing to the headphones; |
| play.audio.to.lineout | playing an audio from a specified Thing to the line out; |
| play.audio.to loudspeakers | playing an audio from a specified Thing to loudspeakers |
| record.from.mic | recording from microphone as the value of a specified Thing; |
| record.from SPDIF.input | Recording from SPDIF input as a specified Thing; |
| reset | resetting the sound card to defaults. |

Note that in a preferred embodiment, P(TM(i)) will algorithmically interact with P(TM(thing)) to access and interact with Things the P(TM(i)) action can act upon. P(TM(i)) interacts with P(TM(thing)) to set the status to FAILED for any value that is not within range of values permitted by the P(TM(i)) action, and, to set the reason to INVALID VALUE. In a preferred embodiment, the reference names for the actions are configured in the specified namespace, though a second embodiment may use a different listing.

An exemplary embodiment of the Cirrus Logic Audio Card TM(Element14.CLAC) is illustrated by the following: https://www.element14.com/community/servlet/Jive-Servlet/downloadBody/65689-102-2-291406/Wolfson%20Audio%20Card%20Schematic%20Diagram.pdf

TM(TI.TMP007)

The TMP007 is an integrated digital thermopile temperature sensor in a wafer chip-scale package (WCSP) that detects the temperature of a remote object by its infrared (IR) emission. See ti.com/lit/ds/symlink/tmp007.pdf.

The following is an example of content expressed in the Thing language, wherein said content describes a TM(i).

```
TM:TI.TMP007]=(
  manufacturer="Texas Instruments"
  website="www.ti.com"
  listing="Texas Instruments:"
  datasheet=" http://www.ti.com/lit/ds/symlink/tmp007.pdf"
  vocabulary=(
    definition="http://www.thinglanguage/ti/tmp007/"
    listing="TM:TI.TMP007"
    urr="stdlib:load///usr/local/iotmachine/tm/libtitmp007.so?entry='init'"
  )
)
```

TM(TI.TMP007) is a computational machine configured to interact with the TI TMP007 as specified by the TMP007 datasheet; and, providing P(TM(TI.TMP007)) actions as illustrated by table 12.

TABLE 12

| P(TM(i)) | Provides the action of: |
|---|---|
| Initialize | initializing communication with the TI TMP007; |
| Calibrate | calibrating the TMP007; |
| validate.calibration | validating the calibration; |
| alert.on.high | Alerting P(TM) if the temperature exceeds a specified high temperature; |
| alert.on.low | Alerting P(TM) if the temperature is below a specified low temperature; |

TABLE 12-continued

| P(TM(i)) | Provides the action of: |
|---|---|
| validate.alert | Validating the alert condition; |
| alert.clear | Clearing the alert condition; |
| set.mode | Setting the mode for TMP007 operation to be INT, or COMP; and |
| get.temperature | Setting the value of a Thing to the recorded temperature. |

Examples of P(TM(i))s

As previously stated, the Thing machine is comprised of a multiplicity of TM(i), wherein each TM(i) is a computational machine with procedure P(TM(i)). Examples of different P(TM(i))s, include, but are not limited to, the following.

The P(TM(format)) action interacts with P(TM(thing)) to format the response namespace Thing as the outbound content response Thing the P(TM(output)) action outputs. Note that algorithmic steps of P(TM(format)) and P(TM(output)) can be combined as a single procedure given by an appropriate P(TM(i)), such as P(TM(format.output)).

The P(TM(runtime)) action interacts with P(TM(thing)) to perform a configured task thing:graph representative of a sequence of statements, each statement is evaluated by P(TM(eval)) with the corresponding performable thing:graph to be performed by P(TM(perform)).

P(TM(runtime)) provides the action of algorithmically:
1. Interacting with P(TM(thing)) to set the value of the Thing given by the listing status to the value "satisfied";
2. Iteratively performing the following sequence while the value of said Thing is equal to "satisfied":
    a. Interacting with P(TM(parse)) to read content from an input device, parse said content, and, interact with P(TM(request)) to generate a corresponding thing:statement graph;
    b. Interacting with P(TM(eval)) to evaluate said graph in the context of Active Things to generate a performable thing:statement graph; and,
    c. Interacting with P(TM(perform)) to perform a said performable thing:statement graph.

The P(TM(runtime)) can be configured as an Active Thing in the set of boot Active Thing. The P(TM(bootstrap)) action can initialize a communication channel and set a Thing representative of that communication channel. The P(TM(parse)) action can interact with P(TM(thing)) to access and interact with said Thing as the communication channel from which to read content.

The P(TM(runtime)) can be configured as an Active Thing in the set of bootstrap Active Thing. The P(TM(bootstrap)) action can initialize a communication channel and set a Thing representative of that communication channel, and, then request the performance of the P(TM(runtime)). The P(TM(parse)) action can interact with P(TM(thing)) to access and interact with said Thing as the communication channel from which to read content.

For unknown Things, the P(TM) can interact with P(TM(bind)) which provides the action of interacting with P(TM(thing)) to bind an unbound Thing as a member of a classification of Things that the P(TM) knows.

P(TM(classifier)) algorithmically classifies the types of statements it is being asked to evaluate, as a classification of interest, and increments a count for that classification of interest. At a predetermined threshold, the P(TM) adds that classification as a topic, to a list of Things P(TM) should learn about. A P(TM) can algorithmically determine an appropriate time to learn about a topic. Using a communication device, the P(TM) can request content related to the topic. This enables the P(TM) to determine the types of topics it would like to learn, and, the rate at which it would like to learn. For example, a Thing Machine that is running at 75% memory capacity, 65% processing capacity, and/or 60% networking capacity may defer spending additional resources on learning until a later time. In many cases, a Thing Machine would typically stick to those areas of interest related to the environment it is performing in. However, by adding a random selection to the list of topics to learn, the Thing Machine can expand its capabilities to be more generalized. For example, a Thing Machine that is a vending machine that vends products could learn the actions required to offer car rentals. Whilst that may seem ridiculous on the surface, think of a vending machine in a busy airport with multiple car rental agencies readily available. Such a machine could learn to use web services to find which car rental company has a suitable selection for the consumer, book the rental, bill the consumer and email them a receipt. The P(TM(classifier)) can provide an action to classify a thing:statement, and P(TM(eval)) uses said classification to identify a set of active Things available to P(TM(eval)) in selecting an active Thing to satisfy the thing:statement. Other forms of artificial intelligence (AI) can be integrated. For example, symbolic AI Sub-Symbolic AI, and Statistical AL algorithmic procedures may be used.

A P(TM(eval)) can generate and cause performance of a first performable thing:statement and use the response thereof in performance of a second performable thing:statement. In an embodiment, the first performable thing:statement can perform P(TM(classifier)) to classify the type of thing:statement being evaluated, such as the topic. In response thereto, the P(TM(eval)) can use the classification to generate the second performable thing:statement, or set the context of accessible Active Things of the generated performable thing:statement.

Figure 33:
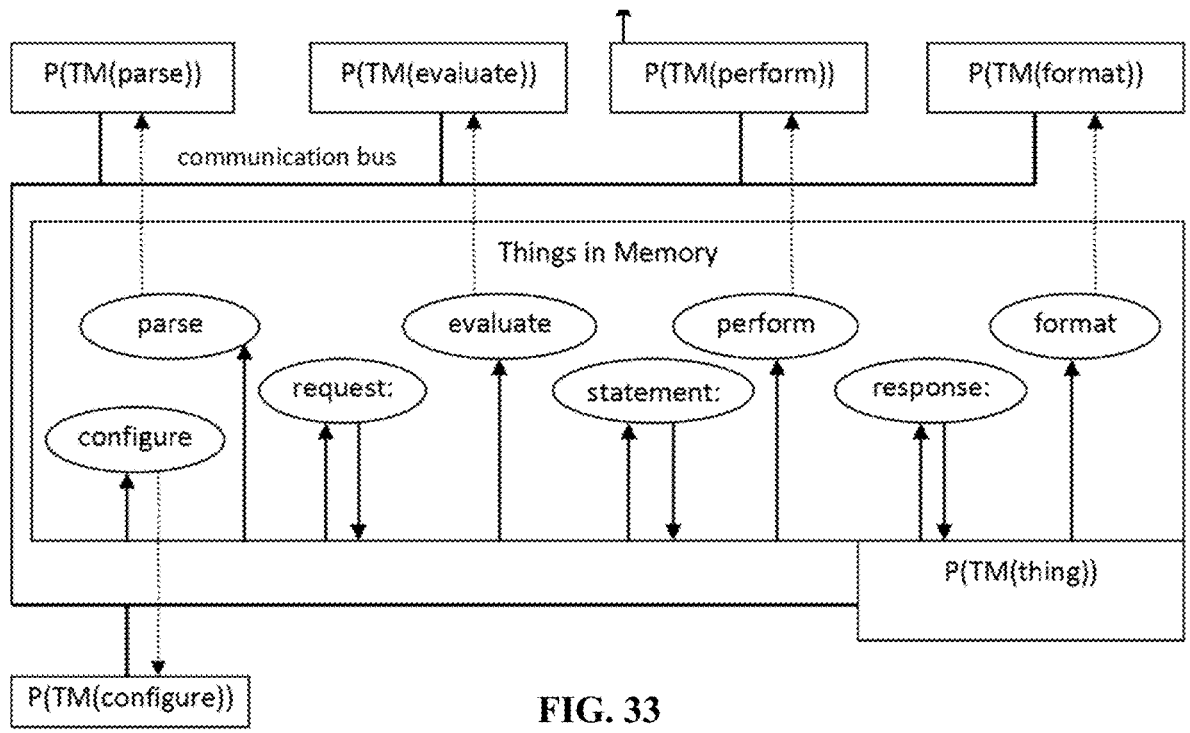
FIG. 33 is a schematic diagram illustrating a Thing Machine as a universal Turing machine.

Referring to FIG. 33, P(TM(parse)) interacts with input device (not illustrated) and P(TM(thing)) to provide the action of generating a request thing:graph; P(TM(eval)) interacts with P(TM(thing)) to provide the action of evaluating the request thing:graph in the context of accessible performable actions to generate a performable thing:graph; P(TM(perform)) interacts with P(TM(thing)) to provide the action of performing the performable thing:graph wherein said graph is to perform a P(TM(configure)) to change the graph of performable actions P(TM) can perform. In an embodiment, input device is a file system device and content is a configuration document syntactically adhering to a language grammar, describing at least one Active Thing to configure. In a preferred embodiment, the parser action and the format action adhere to the Thing Language grammar. In this configuration, the vocabulary of Active Things is dynamically configured from a set of configuration documents.

Figure 34:
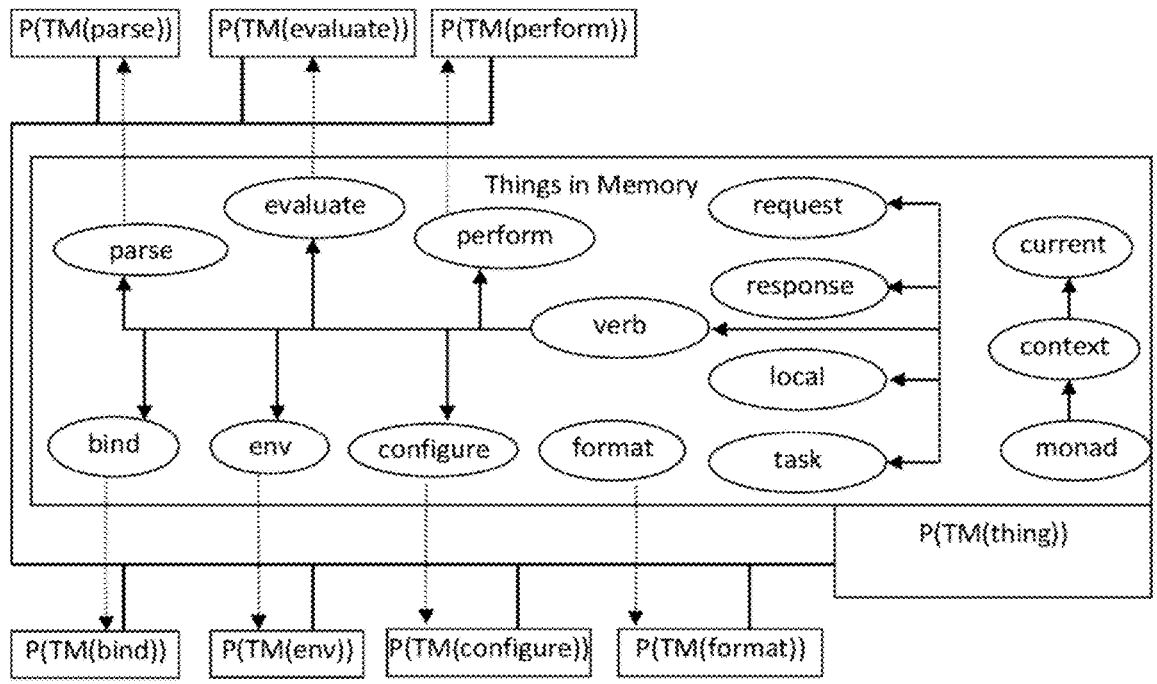
FIG. 34 is a schematic diagram illustrating a Thing Machine as an adaptive Neural Bot.

Referring to FIG. 34, P(TM(env)) interacts with input device (not illustrated) and P(TM(thing)) to provide the action of generating a request thing:graph; P(TM(eval)) interacts with P(TM(thing)) to provide the action of evaluating request thing:graph in the context of performable actions to generate a performable thing:graph; P(TM(perform)) interacts with P(TM(thing)) to provide the action of performing the performable thing:graph wherein said graph is to perform a P(TM(configure)) to change the graph of performable actions P(TM) can perform.

In a preferred embodiment, the input device is an electromagnetic waveform device. In this configuration, a portion of the thing:graph(monad) is algorithmically modified based on the input from the environment, and thus, the P(TM) adapts to the needs of the environment in which it is performing.

In one environment a P(TM) action plays an audio message asking the user "How can I be of service", and, a second action records the user response. A voice to text action converts the audio to text, which is parsed as a thing:graph. A classifier action algorithmically classifies the topic of conversation. The P(TM) communicates a request for tasks related to the topic to a second Thing Machine. In response to receiving the information, the first P(TM) algorithmically configures the task, and, performs the task.

In a second embodiment, a Thing Machine includes a receiver optical subsystem assembly and is used to interrogate a user provided Optical Identifier (OI), and, in response thereto, configures a portion of the thing:graph(monad) to include performable thing:graphs specific to that user. When a user performs an affirmative action, such as by removing the OI from the optical reader, the P(TM) forgets that portion of the thing:gram(monad) specific to the user.

In a third embodiment, a Thing Machine includes a biometric device, such as EyeLock, to identify a user, and, performs an action to configure a portion of the thing:graph (monad) to include performable thing:graphs specific to that user. When a user performs an affirmative action, such as by leaving the area of the biometric device, the P(TM) forgets that portion of the thing:gram(monad) specific to the user.

P(TM(thing)) provides the action of algorithmically initializing and organizing representations of Things and the relationships between them, in non-volatile memory, as a thing:graph. In an embodiment supporting classes, P(TM (thing)) is comprised of discipline P(TM(thing:class)) procedures such as: P(TM(thing:class.set)) to set a Thing satisfying the requirements of what it means for the instance of the Thing to be a member of that class; P(TM(thing: class.get)) to get a reference to a Thing of that class; and, P(TM(thing:class.unset)) to unset an instance of a Thing of the specified class. Modifier actions enable P(TM(thing)) procedures to be modified such as "before" or "after" thus enabling "before set, perform this action" or "after set, perform this action."

Each instance of a Thing is comprised of a set of non-mutable components used by P(TM(thing)). In the preferred embodiment, said set includes: a thing:name, a thing:value, and, a thing:relationship-set. An embodiment can extend the set to incorporate additional components as specified through content the P(TM(thing)) can interact with, such as content in a configuration file.

Figure 35:
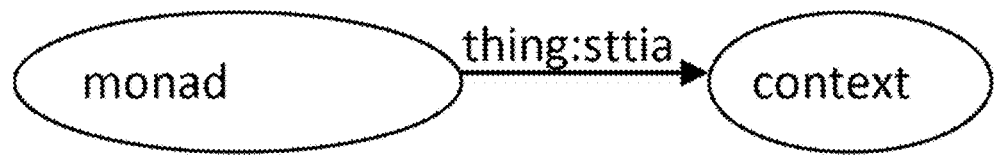
FIG. 35 is a graph illustrating that during initialization, P(TM(thing)) allocates and initializes a Thing with the name equal to monad, as the root of the Thing Machine's thing: graph.

Referring to FIG. 35, during initialization, P(TM(thing)) allocates and initializes a Thing with the name equal to monad, as the root of the Thing Machine's thing:graph, and allocates and initializes a Thing with the name context, and sets the relationship so that the assertion: "There is a Thing where name is equal to monad, such that, there is a Thing where name is equal to context" is true.

Figure 36:
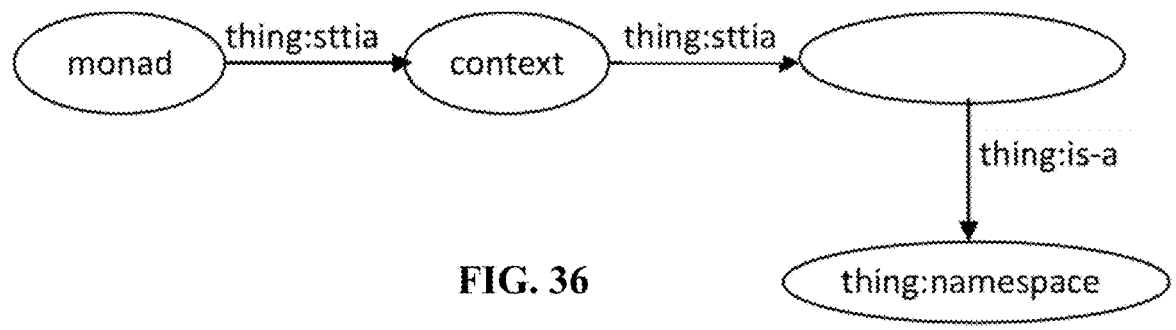
FIG. 36 is a graph illustrating that the context quantifies the set of Things that are in scope for resolving a listing comprised of one or more free variables and expressions of relationships between them.

Referring to FIG. 36, the context quantifies the set of Things that are in scope for resolving a listing comprised of one or more free variables and expressions of relationships between them. By way of example, http://www.iotnamespace.com/thing and request:statement and statement.thing [1] are examples of listings.

Figure 37:
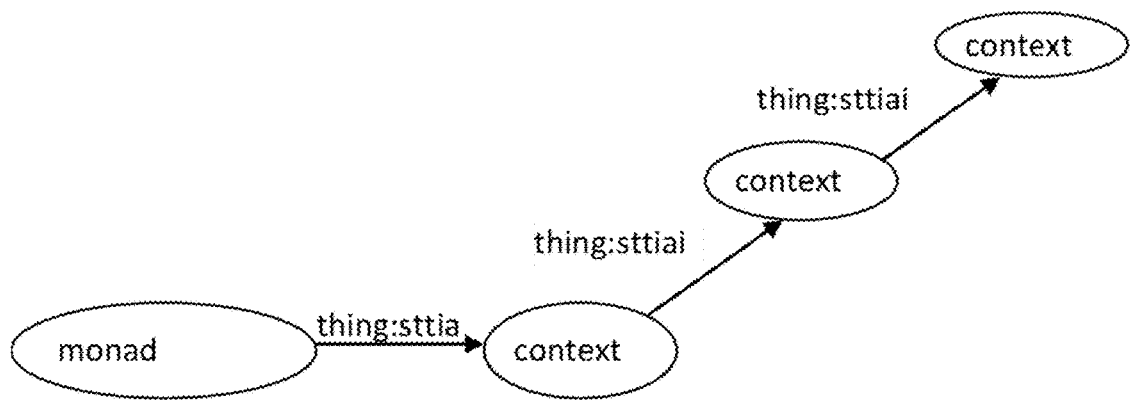
FIG. 37 is a graph illustrating that the context Thing is a thing:stack, through which the P(TM(thing)) can algorithmically push a Thing onto the stack, or pop a Thing off the stack, thus changing the context.

Referring to FIG. 37, in the preferred embodiment, the context Thing is a thing:stack, through which the P(TM (thing)) can algorithmically push a Thing onto the stack, or pop a Thing off the stack, thus changing the context. The P(TM(thing)) algorithmically uses the Thing at the top of the stack as the current context, in quantifying the set of Things that are in scope for resolving a listing.

Referring again to FIG. 36, in the preferred embodiment the current context Thing has a relationship set comprising relationships to one or more Things referred to as namespace Things. The name of the Thing is the name of the namespace. The P(TM(thing)) algorithmically uses a namespace Thing as a Thing that represents a named Thing graph of related Things, even if related solely by being qualified in the same namespace. A URI scheme name can be the name of a Thing that is a namespace. The URI scheme-specific part is a listing that identifies a Thing qualified in that namespace.

Figure 38:
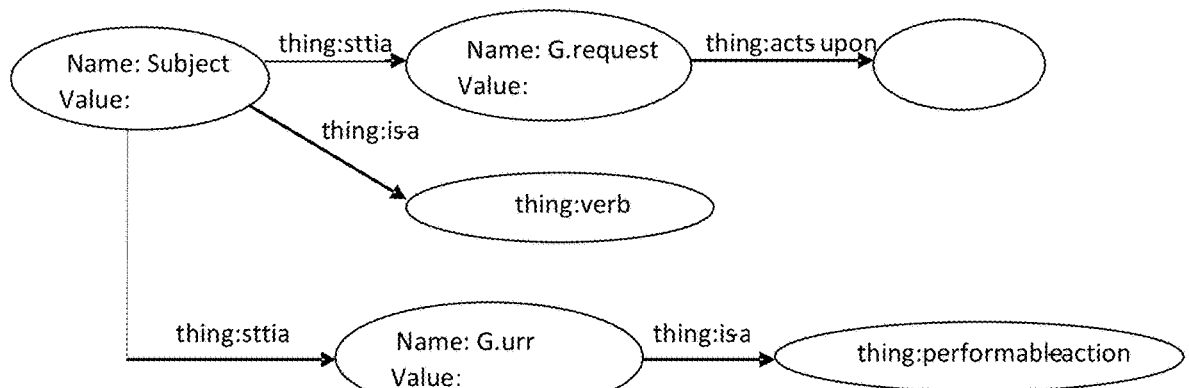
FIG. 38 is a graph illustrating that a Thing that has a representation of a reference to a performable action is classified as an Active Thing.

Referring to FIG. 38, a Thing that has a representation of a reference to a performable action is classified as an Active Thing. An Active Thing is a thing:verb and has a corresponding Active Thing Graph G(P(TM(i))). The Subject node name is replaced with a corresponding Active Thing name, and, the G.request acts-upon Blank Node is replaced by a graph of the Things that the P(TM(i)) can act upon. Each G(P(TM(i))) includes a:

a) G.identifer(P(TM(i)) Thing whose name is an identifier identifying the P(TM(i)), and is the root node (the subject Thing) in a directed graph;
b) G.urr(P(TM(i))) URI Thing whose value denotes a request for the P(TM(i)) to act upon a G.request; and,
c) G.request(P(TM(i))) Thing graph denoting the set of Things the P(TM(i)) can act upon.

Figure 39:
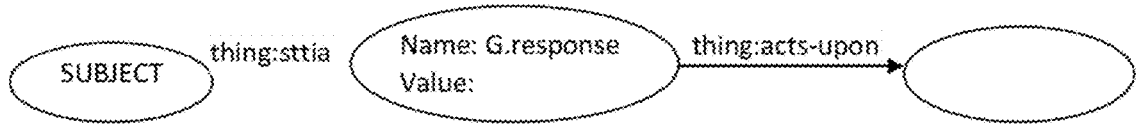
FIG. 39 is a graph illustrating that a G(P(TM(i))) can include additional Thing information, such as a description of the Things that comprise a response from performing P(TM(i)).

Referring to FIG. 39, in an embodiment, the G(P(TM(i))) can include additional Thing information, such as a description of the Things that comprise a response from performing P(TM(i)).

An embodiment can include a multiplicity of G.request graphs for a given G(P(TM(i))) to indicate various permutations of Things the P(TM(i)) can act upon. Such an embodiment can further include a multiplicity of G.response graphs indicating the Things that constitute the corresponding response graphs.

Figure 40:
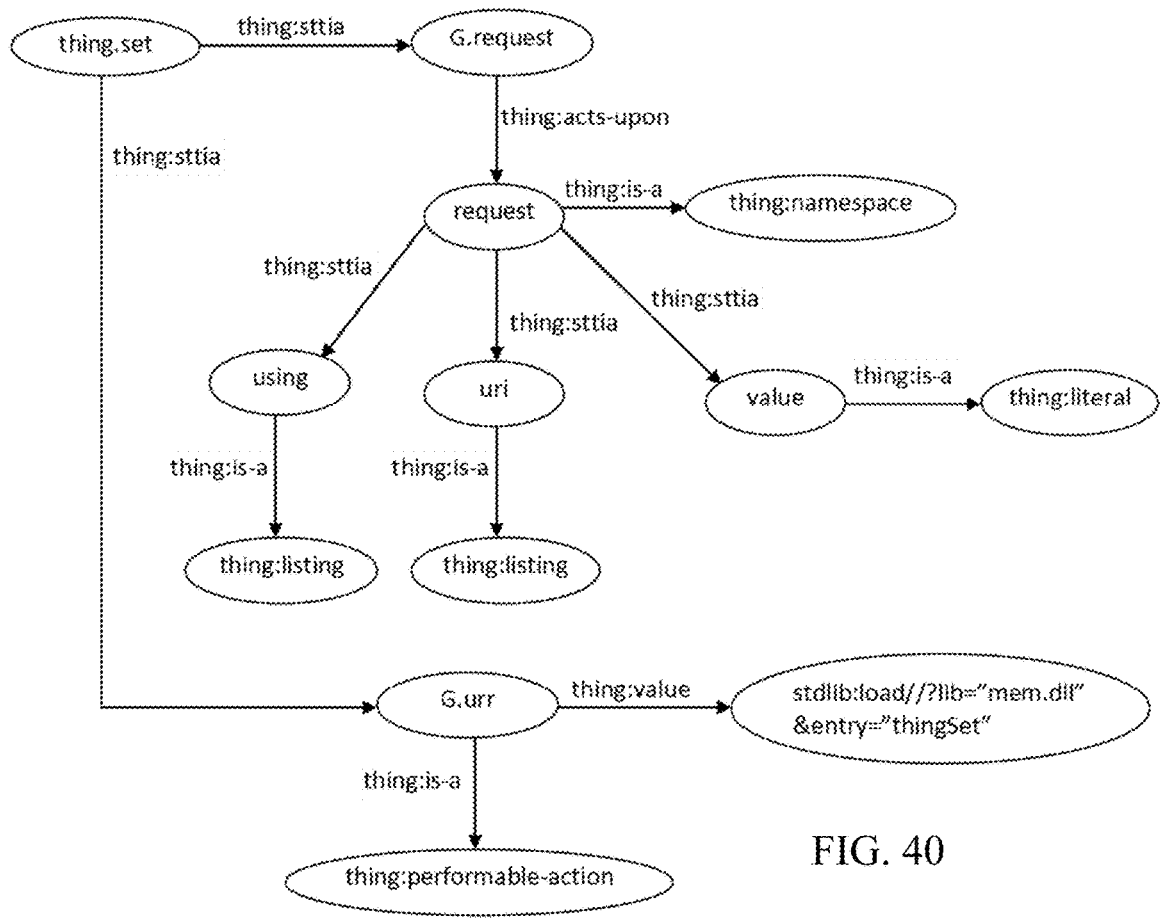
FIG. 40 is a G(P(TM(thing.set))) graph corresponding to the P(TM(Thing.set)) procedure for setting a Thing in non-transitory memory.

FIG. 40 is the G(P(TM(thing.set))) graph corresponding to the P(TM(Thing.set)) procedure for setting a Thing in non-transitory memory. The value of the request:uri Thing is the listing of the Thing to be set, and, its value will be set to the value of the request:value Thing, if specified. If a request:using Thing is specified, then its value is a listing representative of a Thing to use in setting the Thing identified by the value of the request:uri Thing.

Figure 41:
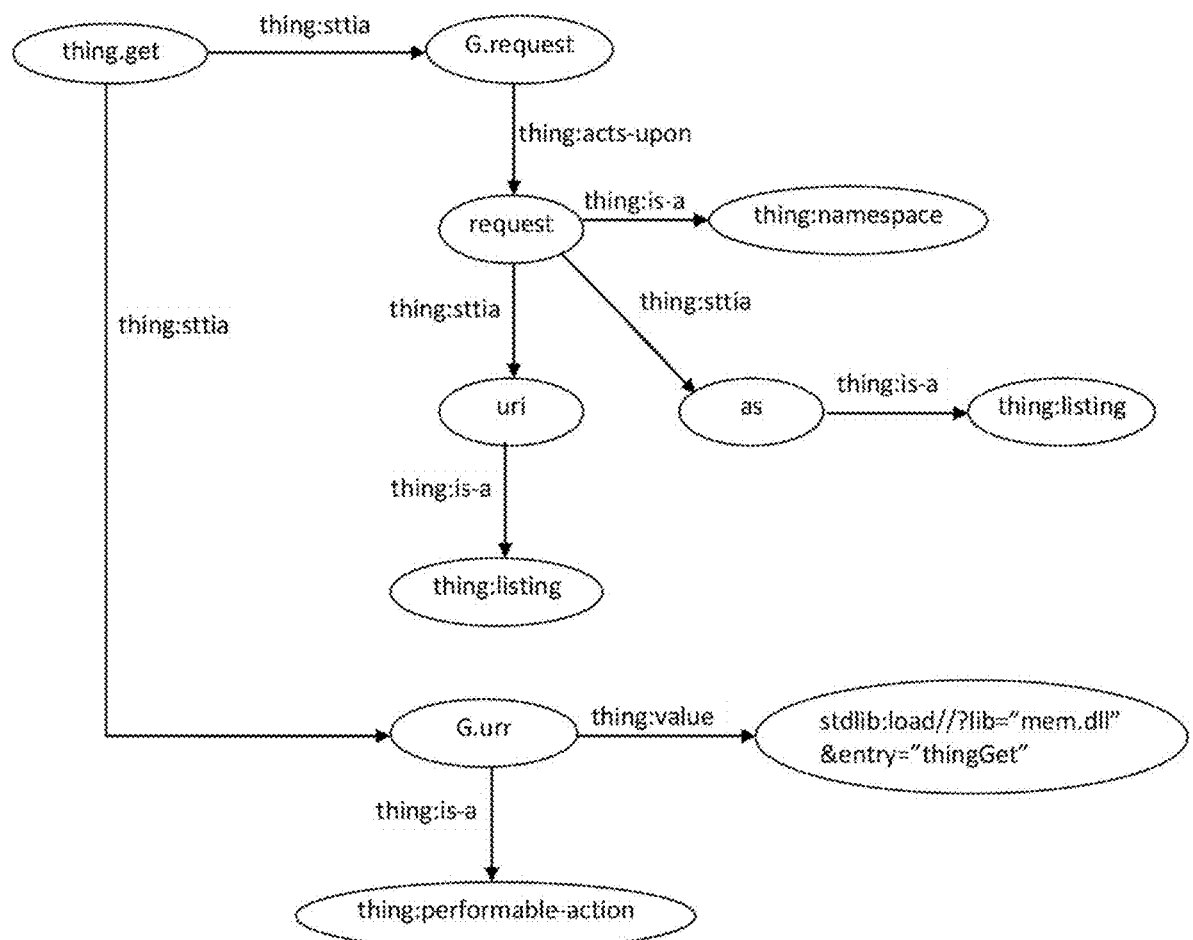
FIG. 41 is a G(P(TM(thing.get))) graph corresponding to the P(TM(Thing.get) procedure for getting a representation of the Thing given by the listing request:uri, non-transitory memory.

FIG. 41 is the G(P(TM(thing.get))) graph corresponding to the P(TM(Thing.get) procedure for getting a representation of the Thing given by the listing request:uri, non-transitory memory. The modifiers name, value, or relationship-set, or relationship can be used to denote specific information requested about the Thing. The information is saved as the value of the Thing given by the listing denoted by the value of request:as Thing.

Figure 42:
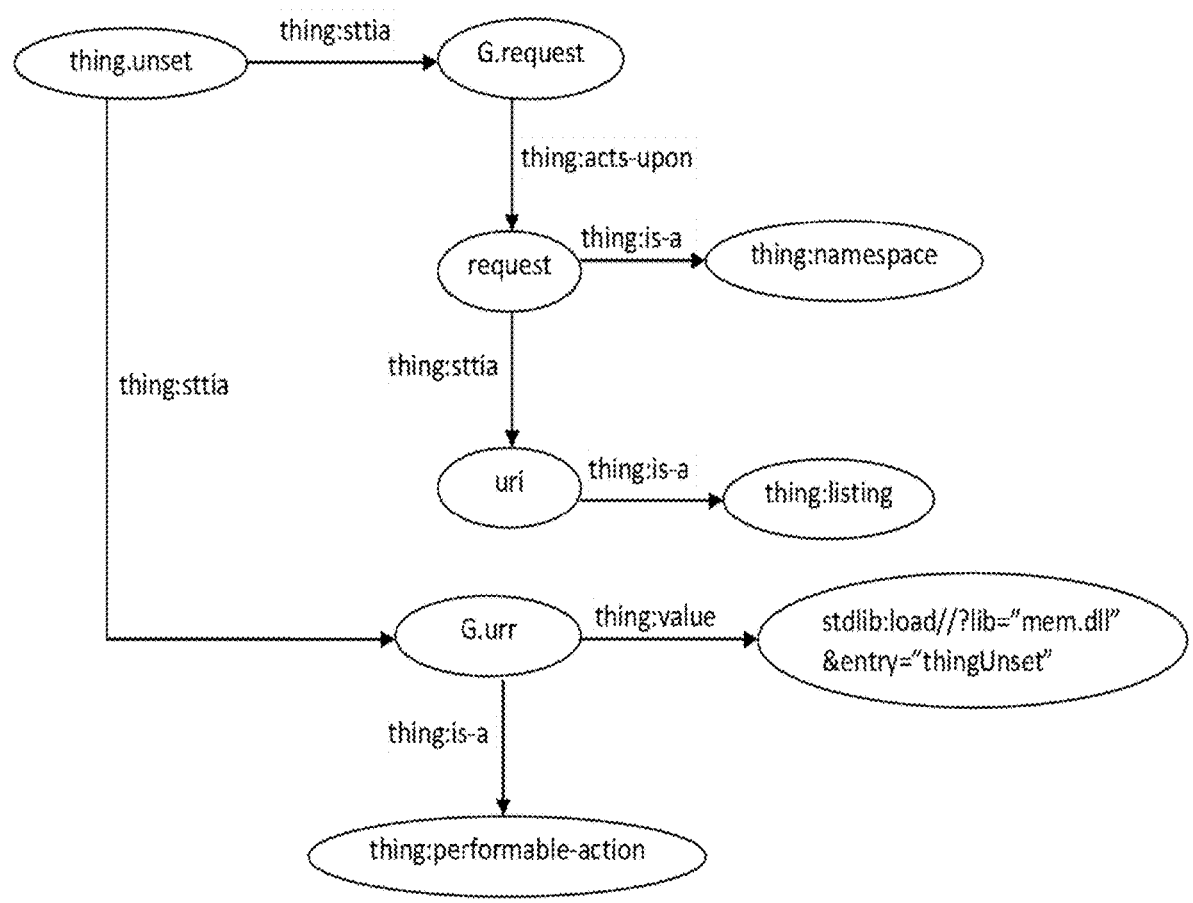
FIG. 42 is a G(P(TM(thing.unset))) graph corresponding to the P(TM(Thing.unset) procedure for unsetting a representation of a Thing from non-transitory memory.

FIG. 42 is the G(P(TM(thing.unset))) graph corresponding to the P(TM(Thing.unset) procedure for unsetting a representation of a Thing from non-transitory memory. The Thing to unset is given by the value of the request:uri Thing.

One skilled in the art can replace P(TM(thing)) with an alternative algorithmic procedure to administer Things and their relationships to further enable features such as concurrency, persistence, caching, synchronization, locking (such as read/write locks), ownership, permissions (such as read/write/execute by owner, group, or all).

P(TM(eval))

Figure 45:
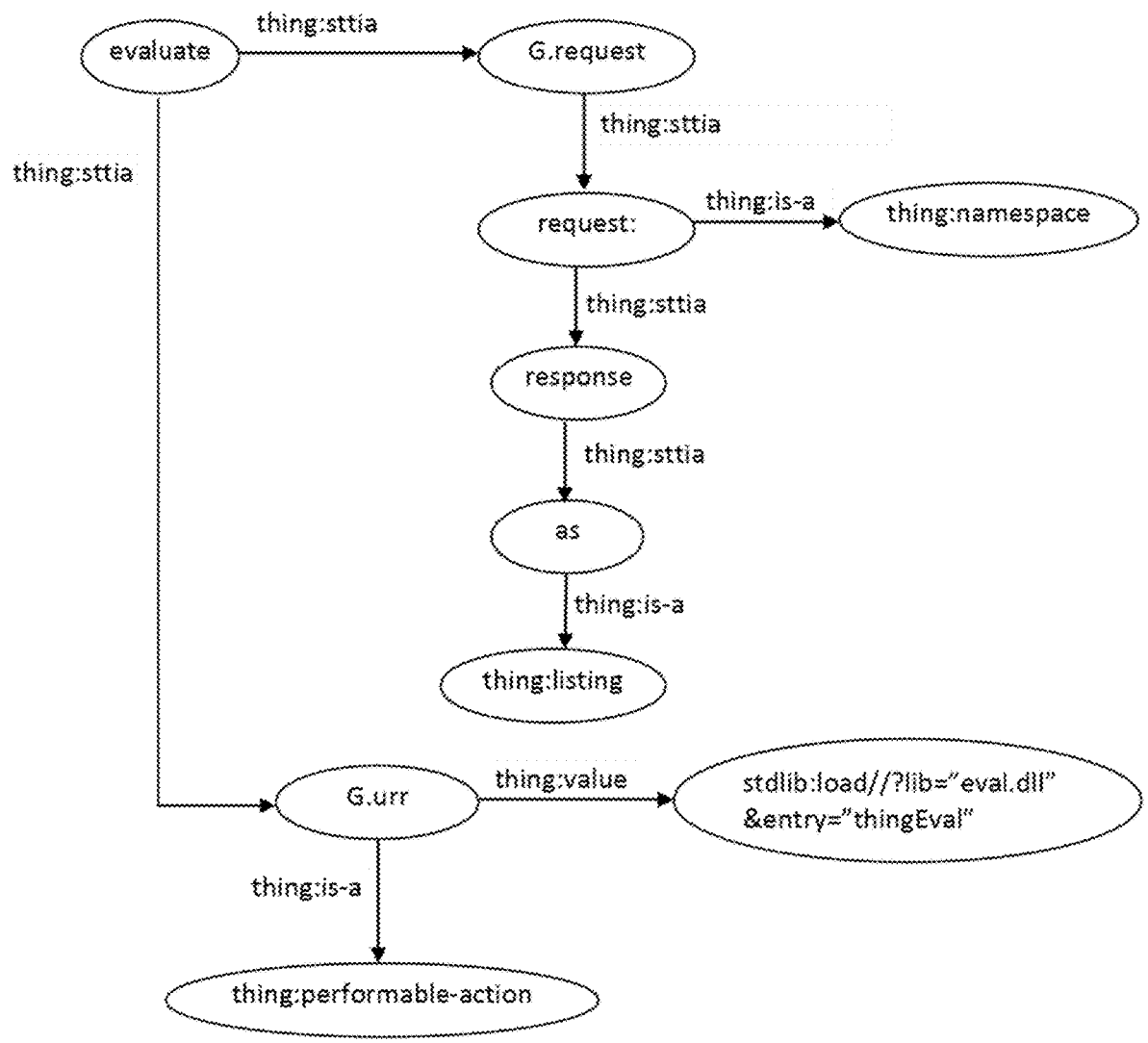
FIG. 45 is a graph illustrating P(TM(eval)) algorithmically interacting with P(TM(thing)).

P(TM(eval)), as described by FIG. 45, algorithmically interacts with P(TM(thing)) to provide the action of:

a) selecting a thing:statement to evaluate;
b) selecting a G(P(TM(i))) as the performable Active Thing from the set of accessible Active Things;
c) initializing a new context Thing as a performable context Thing;
d) performing the Gun of the performable G(P(TM(i))) in the context of the performable context Thing;
e) resetting the performable context Thing to a current context Thing; and,
f) unsetting the new context Thing.

In an embodiment, step a and step b consist of selecting an Active Thing that satisfies the assertion: (There is a thing:statement where listing is equal to request:statement, such that, there is a Thing where Name is equal to .name) and (There is a Thing where listing is equal to verb: vocabulary, such that, there is a thing:verb where Name is equal to .name and Thing is an Active Thing).

In a preferred embodiment, step b can include the step of selecting a default Active Thing when the assertion is not otherwise satisfied.

For an Active Thing with instances, P(TM(eval)) can include the step of: selecting the instance of Active Thing where thing:statement is a subgraph of the instance's G.Request graph.

In an embodiment, the P(TM(eval)) can interact with P(TM(bind)) to include the step of binding the Things qualified by the thing:statement Thing, using the corresponding G.request graph of the performable Active Thing, as Things in the performable context Thing that the Active Thing action can act upon.

In an embodiment, P(TM(eval)) algorithmically classifies the type of statement as an imperative statement; a declarative statement; an interrogative statement; or, an exclamatory statement, and performs an active Thing to evaluate said class of statement. This enables a P(TM(eval.declarative)) procedure to algorithmically evaluate a declarative statement; a P(TM(eval.imperative)) procedure to algorithmically evaluate an imperative statement; a P(TM(eval.interrogative)) procedure to algorithmically evaluate an interrogative statement; and, a P(TM(eval.exclamatory)) procedure to algorithmically evaluate an exclamatory statement.

The action of P(TM(eval)) can algorithmically select a default Active Thing for the performable thing:statement, and, can algorithmically evaluate the thing:statement to determine a more appropriate Active Thing to use. The default action can interact with P(TM(thing)) to increment a counter Thing associated with the classification of the thing:statement for which the default action was performed, to represent the number of times the Thing Machine was asked to perform that classification of a thing:statement. Using performable communication actions, a P(TM(i)) can communicate with a second machine to obtain content related to said classification. P(TM(parse)) action can parse as thing:statements to evaluate and perform. In this manner, the Thing Machine can adapt to the needs of the environment in which it is performing. (The goal here is that you ask the machine to do something. The machine selects a default action, then evaluates whatever you asked to see if there is a better action to perform. If not, it performs the default. The default action classifies the topic, and increments a counter for the number of times it was asked to do something related to that topic. This way, when the counter hits a threshold, the machine can ask somebody to teach it about that topic, or buy books to read related to that topic.

An embodiment can merge graphs between contexts so that if a response.as Thing is specified, P(TM(eval)) can bind the subgraph of the response: namespace Thing in the new context, as the subgraph of the response.as Thing in the current context before unsetting the new context Thing.

In an embodiment P(TM(eval)) can include the step of: pushing the new context onto the context stack as the current context before the step of performing the Gun. In a second embodiment, one skilled in the computer art of parallel processing would use a Thing representative of a graph of thread specific data of a Process Control Block Thing, and said data includes a reference to the current context for resolution of a listing by P(TM(thing)).

Figure 43:
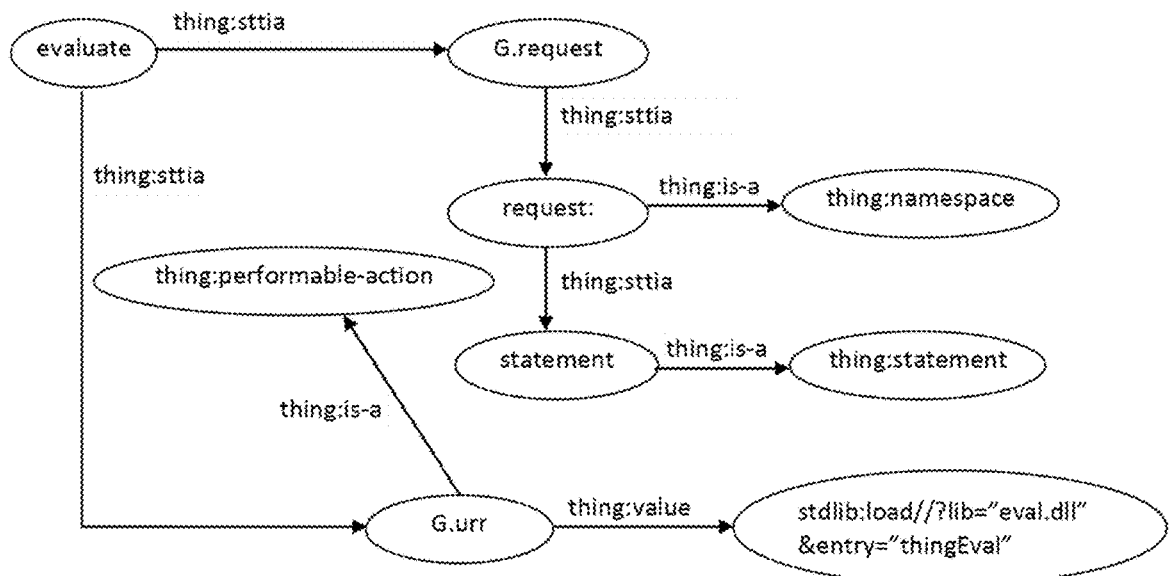
FIG. 43 is a graph illustrating that a G.request denotes that the action can act upon a request:statement that is a thing: statement.

Referring to FIG. 43, the G.request denotes that the action can act upon a request:statement that is a thing:statement. Thus, the subgraph of the request:statement Thing, would need to satisfy the requirement for being a member of the class of Things that are a thing:statement.

Figure 44:
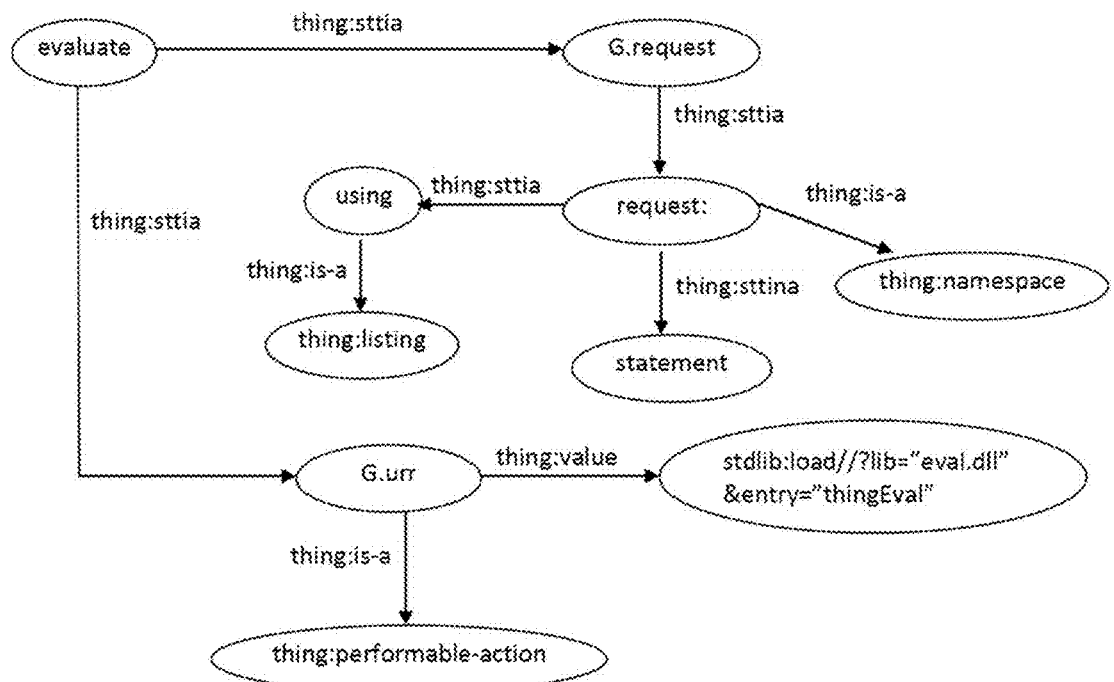
FIG. 44 is a G.request subgraph indicating that an action can act upon a request:using Thing that is a thing:listing.

Referring to FIG. 44, the G.request subgraph indicates the action can act upon a request:using Thing that is a thing:listing. This graph applies if it is true that there is a request namespace Thing, such that, there is not a (thing:sttina) Thing where name is equal to statement, and there is a Thing where name is equal to using. This G.request subgraph provides an alternative method for selecting the evaluate Active Thing.

The algorithmic use of Artificial Intelligence is expressly contemplated for. P(TM(classifier)) provides actions to classify a thing:statement, and, P(TM(eval)) uses said classification to identify a set of Active Things available to P(TM(eval)) in selecting an Active Thing to satisfy the thing:statement. Other forms of Artificial Intelligence can be integrated. For example, Symbolic AI, Sub-Symbolic AI, and Statistical AI algorithmic procedures may be used.

Google Research released TensorFlow, an open source machine learning library, primarily used for academic and research activities. One skilled in the Computer Science art of Machine Learning can use the TensorFlow API to develop a P(TM(classifier)) for deep learning. The TensorFlow API can be modified to directly interact with P(TM(thing)) as a set of Active Things representative of the Tensorflow procedures to be configured. Training data can be provided through the set of Active Things.

P(TM(eval)) provides the action of: a) interacting with P(TM(thing)) to generate a request classifier thing:statement requesting performance of P(TM(classifier)) to classify the current request thing:statement; b) interacting with P(TM(bind)) to bind the classifier thing:statement as a performable thing:statement; c) interacting with P(TM(perform)) to perform the performable thing:statement; and, d) interacting with P(TM(thing)) to interact with the result thereof.

The result thereof identifies a classification (a class) related to the current request thing:statement. For a class of Things that are known to P(TM), P(TM(eval)) interacts with P(TM(thing)) to set the context to include the vocabulary related to the class and evaluates the current request thing:statement in that context.

P(TM(eval)) increments a counter representative of the topic, to denote the number of times that topic applied to a current request thing:statement, which enables the classifier to classify the thing:statements according to the most frequently used topic. When P(TM) does not have a vocabulary for a given topic, P(TM(eval)) can generate a thing:statement to evaluate that represents a default action.

A first P(TM) can communicate with a second P(TM) such as through WiFi communications, to request content related to the class of thing:statements the P(TM) commonly is being asked to evaluate and perform. Said content may be representative of Things such as Active Things, and Things that the action of the Active Thing can act upon, such as tasks.

An embodiment can replace P(TM(eval)) with an evaluation action to algorithmically perform an evaluation appropriate for the embodiment, such as one that supports a given language; implements a particular machine learning algorithm; embodies a multiplicity of machine learning algorithms; provides performance improvements, or interacts with a second machine to evaluate the thing:statement; interacts with a third machine to perform the thing:statement. One skilled in the art would understand a multiplicity of algorithmic modifications are possible within the scope of the invention.

Modifiers can be used as Things in a thing:statement to modify the default P(TM(eval)) procedural action. Alternatively, P(TM(eval)) can interact with a P(TM(classifier)) to algorithmically classify the type of Thing being evaluated, and said type of Thing can be used as the modifier to select and perform an Active Thing. By way of example, evaluating a statement representative of an imperative statement, such as "Perform the task named cleanup" is distinct from evaluating a statement representative of a declarative statement, such as: "Declare a task named cleanup comprises step 1: flush the compoint I/O; and step 2: close the compoint I/O."

By incorporating the types of Things an action can act upon, into the thing:graph of the P(TM(i)), and incorporating the types of Things the action can respond with, appropriate actions can be selected for common verb names, such as open. By way of example, each of the following has very different action though each uses a common verb name: open my email; open the gate; and, open a bank account. Selecting the correct action depends in part on what is being opened. By including a description of the type of Things an action can act upon, the P(TM(eval)) can make an appropriate selection as to the performable thing:graph that it should generate.

P(TM(parse))

P(TM(parse)) provides the action of parsing an input representative of a request, and algorithmically interacting with P(TM(request)) to set a Thing to be representative of the parsed input. In the preferred embodiment, P(TM(parse)) is an XML 1.1 parser.

Figure 46:
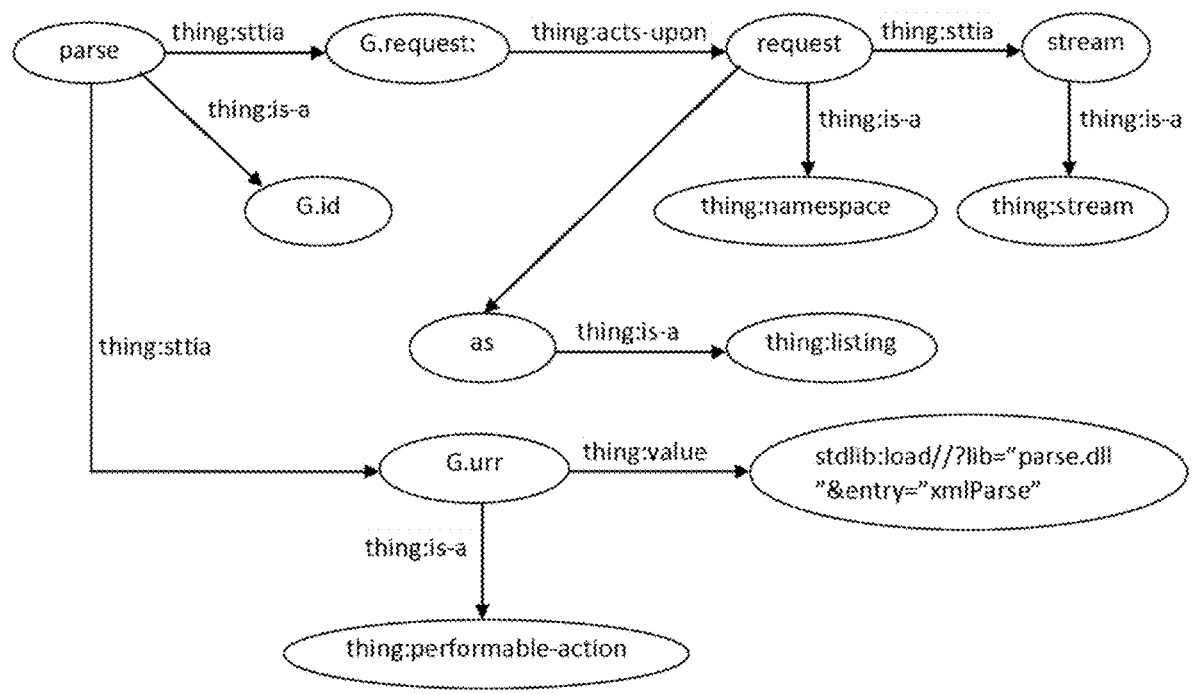
FIG. 46 is a graph illustrating that the value of the Thing identified by the listing request:stream, is the stream to be parsed.

Referring to FIG. 46, the value of the Thing identified by the listing request: stream, is the stream to be parsed. The Thing identified by the value of the request:as Thing, which defaults to request:statement, is set as a thing:statement representative of the parsed input request.

Figure 47:
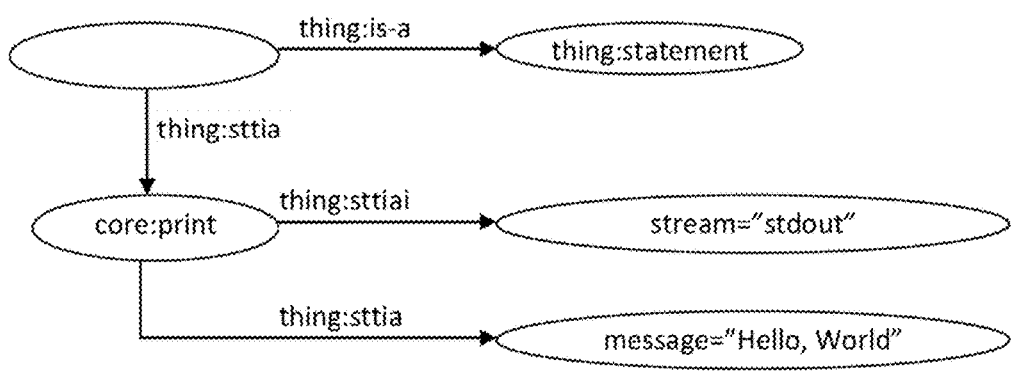
FIG. 47 is an exemplary graph illustrating parsed of an exemplary XML fragment.

Referring to FIG. 47, the exemplary XML fragment is parsed as the exemplary graph. Note that the element attribute is denoted via the "such that there is an instance" relationship (thing:sttiai), while the element is denoted via the "such that there is a" relationship (thing:sttia).

Figure 48:
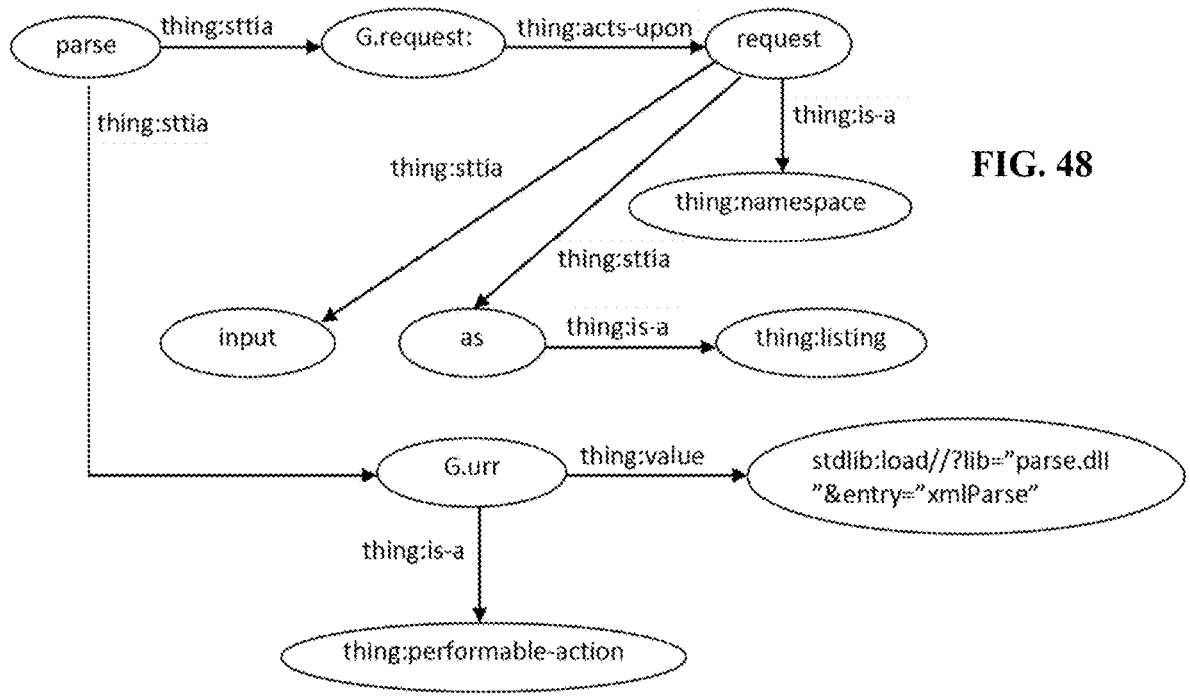
FIG. 48 is a graph illustrating that the value of a Thing given by the request:input listing, is the input to parse.

Referring to FIG. 48, the value of the Thing given by the request:input listing, is the input to parse. The TM(eval) can select the appropriate G.request(P(TM(parse))) graph based on the request graph, and facilitate the appropriate bindings.

It is noted that there is a subtle but important distinction between Parse-1 and Parse-3, specifically, in 1, the action will read from the stream. Alternatively, in 3, the action uses the value of request:input listing (where the value is the content to parse).

This is needed because in certain cases, you would obtain content from a file, and in other cases, an action generates the content and stores it as the value of thing.

P(TM(request))

P(TM(request)) provides the action of algorithmically interacting with P(TM(Thing)) to set the Thing identified by the listing given as the value of the request:as Thing, using the Thing identified by the listing given as the value of the request:using Thing, as a thing:statement Thing graph.

Figure 49:
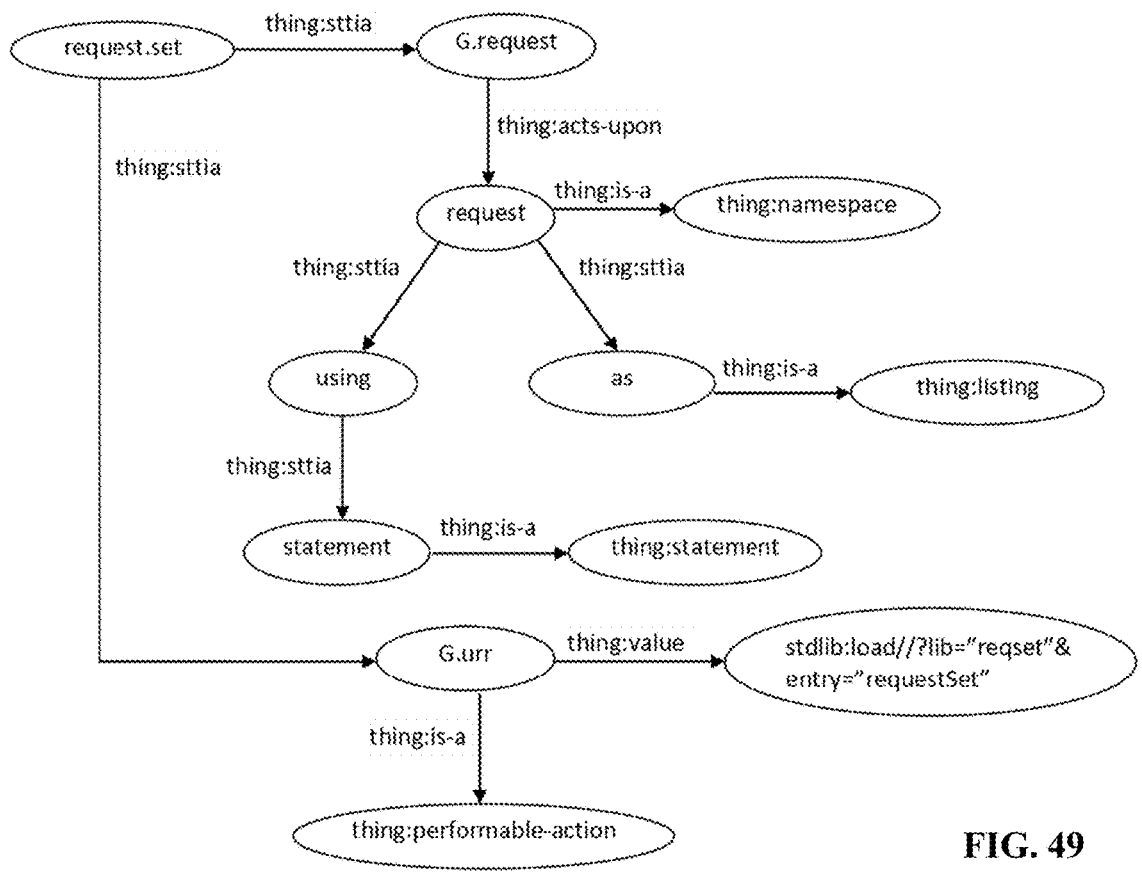
FIG. 49 illustrates a G(P(TM(request))) graph.

A first P(TM(i)) can be used to iteratively construct a thing:statement Thing, and, then to algorithmically interact with P(TM(request)) to set the request:statement Thing. FIG. 49 illustrates the G(P(TM(request))) graph. The default value of the request:as Thing, is request:statement.

P(TM(bind))

P(TM(bind)) algorithmically applies a set of binding rules, in an attempt to bind a Thing as a member of a given class of Things.

By way of example, a Thing whose value matches the pattern "[0-9]{1,}" could be bound as a thing:integer (a Thing with an integer value), whilst a Thing whose value matches the pattern "[0-9A-Fa-f]" could be bound as a thing:hexadecimal (a Thing with a hexadecimal value). In addition to basic classes of Things, such as: thing:thing, thing:text, thing:integer, thing:float, and thing:string, additional types can be expressed using rules of inference, or schemas.

Figure 50:
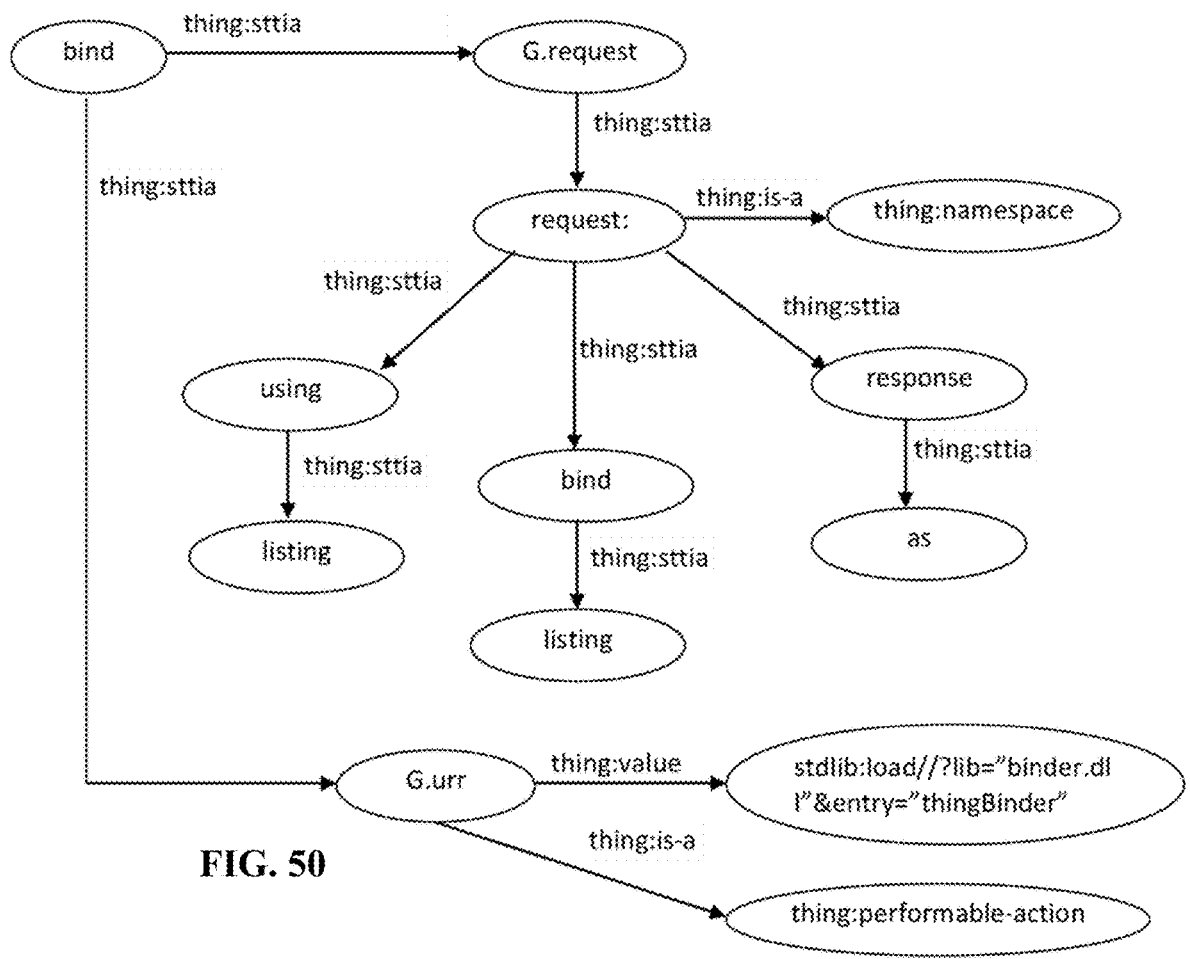
FIG. 50 is a G.request subgraph indicating the Things that the P(TM(bind)) can act upon.

Referring to FIG. 50, the G.request subgraph indicates the Things that the P(TM(bind)) can act upon. The value of the Thing given by request:using is a listing identifying a set of binding rules. The value of the Thing given by request:bind.listing is the listing identifying the thing:graph to be bound. The value of the Thing given by request:response.as is a listing identifying a thing:graph in which the response is to be set. When request:response.as is empty, then the graph of the Thing being bound is updated.

P(TM(bind)) can use state information such as unbound or bound to denote if a Thing has already been bound. This enables P(TM(bind)) to check the state and only perform the binding rules on an unbound Thing. P(TM(bind)) can further include a "found" and "not found" state to denote if the Thing has been bound and found, or bound and not found. In a preferred embodiment, a P(TM(unbind)) interacts with P(TM(thing)) to reset a Thing to the unbound, not found state.

In a first embodiment, one skilled in the art of Computer Science logic uses rules of inference to bind a Thing as a member of a class of Things. A rule is comprised of an assertion and a class identifier. P(TM(bind)) interacts with P(TM(thing)) to algorithmically apply the rule as an assertion about the Thing to be bound, and, if satisfied, P(TM(bind)) interacts with P(TM(thing)) to classify the Thing as a member of the said class identifier.

In a second embodiment, one skilled in the art of Computer Science markup languages can use a thing:schema markup language to describe a Thing class. Industry standard markup schemas are available from schema.org/docs/schemas. Said schemas are a set of types, each associated with a set of properties. See http://schema.org/docs/documents.html for Schema.org schema information, which is incorporated by reference.

Figure 51:
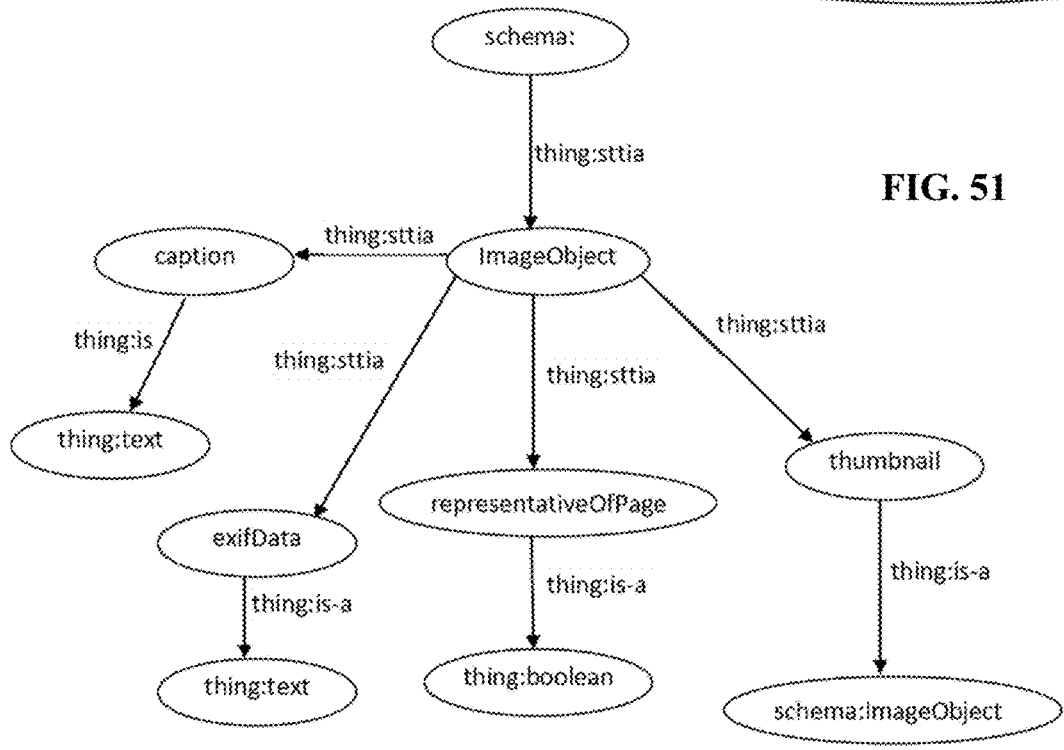
FIG. 51 is a thing:graph that is interpreted as an assertion describing the membership requirements for a Thing to be bound as a member of the ImageObject class.

Referring to FIG. 51, the thing:graph is interpreted as an assertion describing the membership requirements for a Thing to be bound as a member of the ImageObject class. The interpretation is an assertion expressing: There is a Thing where name is equal to schema, such that, there is a Thing where name is equal to ImageObject and Thing is a thing:schema, such that, (there is a Thing where name is equal to Caption and thing:value is a thing:text), and, (there is a Thing where name is equal to exifData and thing:Value is a thing:text), and, (there is a Thing where name is equal to representativeOfPage and thing:value is a thing:Boolean), and, (there is a Thing where name is equal to thumbnail and thing:thing is a schema:ImageObject).

Figure 52:
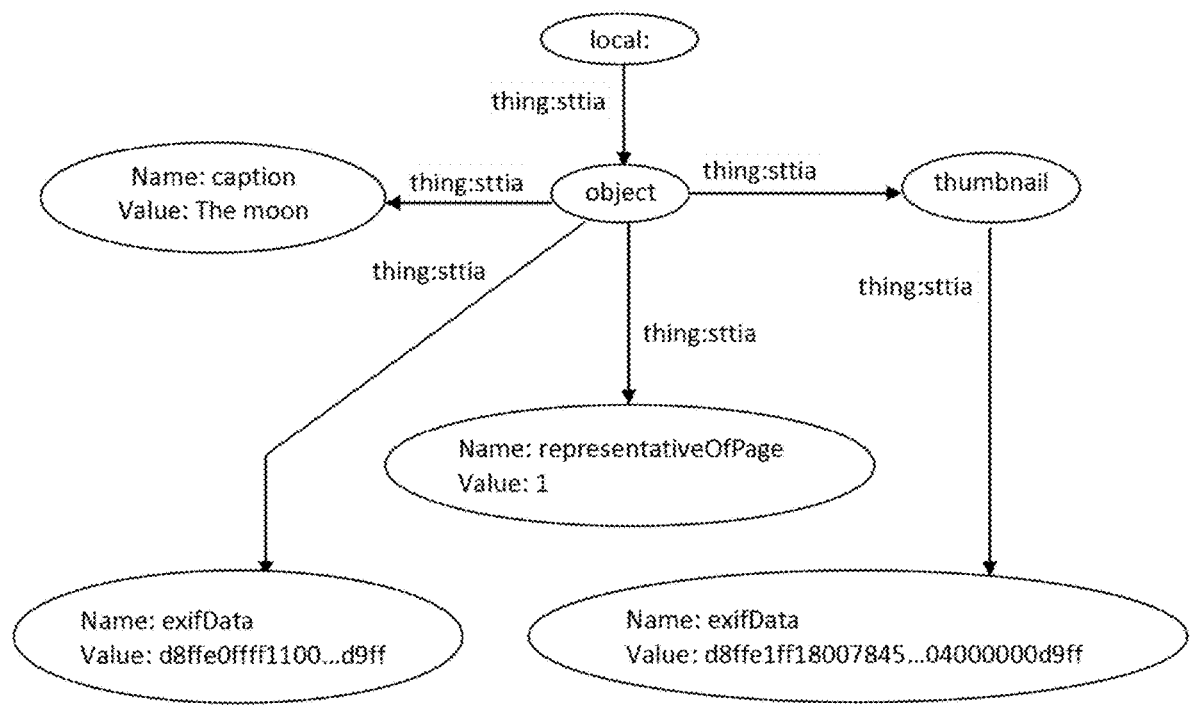
FIG. 52 is an unbound thing:graph given by the listing local:object.

Referring to FIG. 52, an unbound thing:graph given by the listing local:object is presented.

Figure 53:
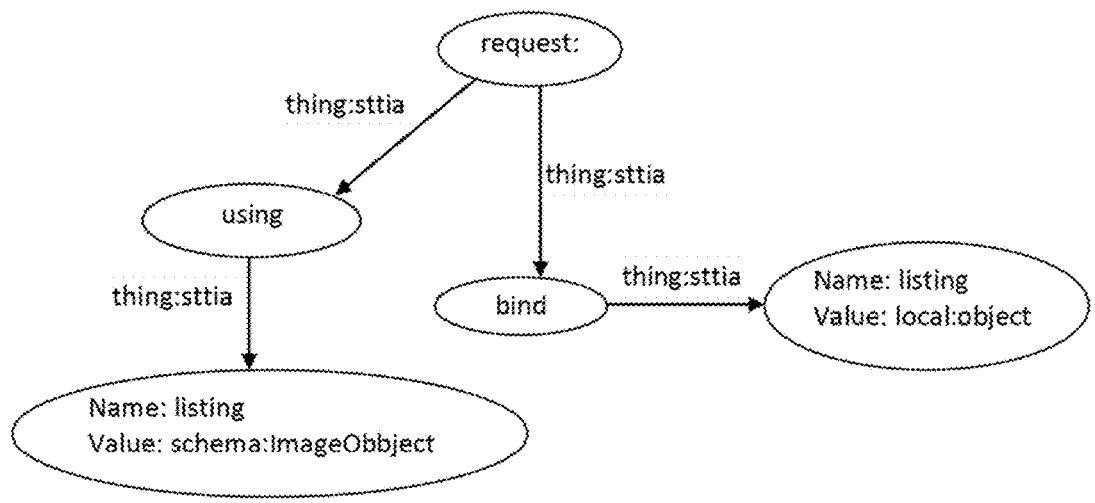
FIG. 53 is a thing:graph illustrating a request to bind the local:object thing:graph as a schema:ImageObject Thing.

Referring to FIG. 53, the thing:graph illustrates a request to bind the local:object thing:graph as a schema:ImageObject Thing (as described by http://www.schema.org/ImageObject). P(TM(bind)) interacts with P(TM(Thing)) to determine if the components of the local:object thing:graph satisfy the requirements for being a schema:ImageObject. The local:object Thing state transitions from unbound to bound. If satisfied, the node "bound.found" is added to the local:object thing:graph, and, the value of the node is set to schema:ImageObject.

One skilled in the art of Computer Science logic can use Rules of Inference to algorithmically make inferences about Things. An inference rule consists of a Procedure which acts upon a thing:graph representative of premises, and generates a thing:graph representative of a conclusion. Referring to FIG. 54, the assertion describes what it means for a Thing to be classified as a BroadcastService. The assertion is parsed and represented as a rule of inference for the specified classification. P(TM(bind)) provides the action of algorithmically evaluating if a specified thing:graph satisfies the rule of inference, and if satisfied, classifying the thing:graph as a member of the specified classification. Referring to FIG. 54 again, one skilled in the art of computer science schemas can generate a rule of inference for a set of schemas, such as the set published by schema.org available at schema.org/docs/full.html.

Note that http://www.schema.org/PerformAction relates to the act of participating in performing arts, not to a machine performing a performable action. Note further that schema.org Actions relate to a vocabulary that enables websites to describe an action they enable, and, how a client can invoke these actions. See blog.schema.org/2014/04/announcing-schemaorg-actions which is incorporated by reference.

P(TM(perform))

P(TM(perform)) algorithmically performs a performable thing:statement by locating the reference to the P(TM(i)) in the thing:statement, and, causing the P(TM(i)) action to be performed. The response from action is either: satisfied, unsatisfied, or failed. The P(TM(perform)) action sets the status Thing value to indicate this response.

Figure 55:
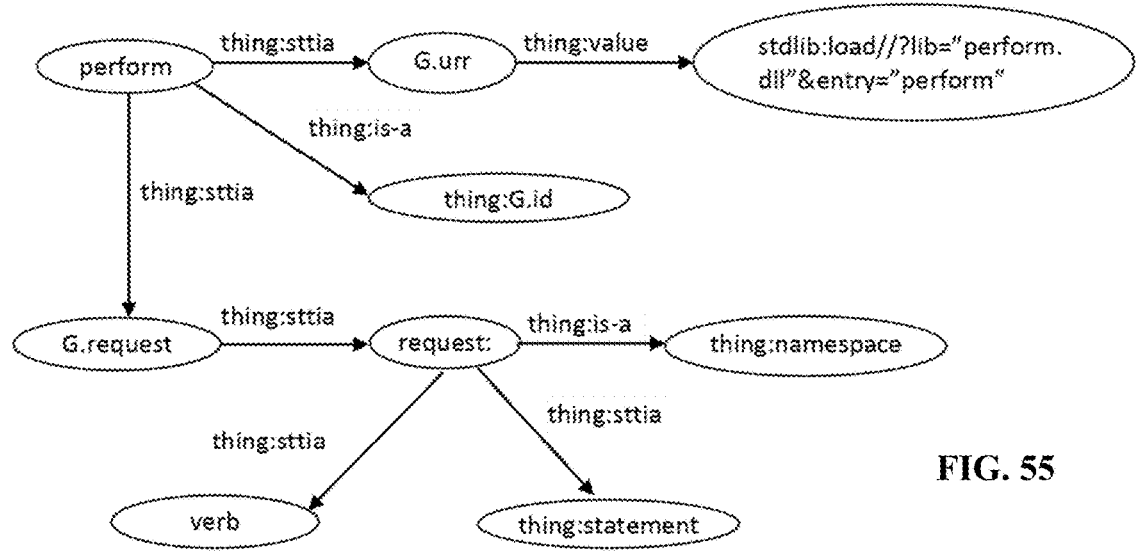
FIG. 55 is a G.request subgraph indicating that a P(TM (perform)) action acts upon a request:statement.

Referring to FIG. 55, the G.request subgraph indicates the P(TM(perform)) action acts upon a request:statement.

P(TM(task))

P(TM(task)) algorithmically interacts with P(TM(thing)) to administer a thing:graph as a thing:task comprised of a set of subgraphs including a thing:list of thing:statements.

In an embodiment, the actions of P(TM(task)) can be comprised of:
 a) P(TM(task.set)) to interact with P(TM(thing)) to set a thing:task;
 b) P(TM(task.get)) to interact with P(TM(thing)) to get a reference to a thing:task;
 c) P(TM(task.unset)) to interact with P(TM(thing)) to unset a thing:task; and,
 d) P(TM(task.perform)) to interact with P(TM(thing)), P(TM(eval)), and, P(TM(perform)) to evaluate and perform the thing:statements of a thing:task.

Figure 56:
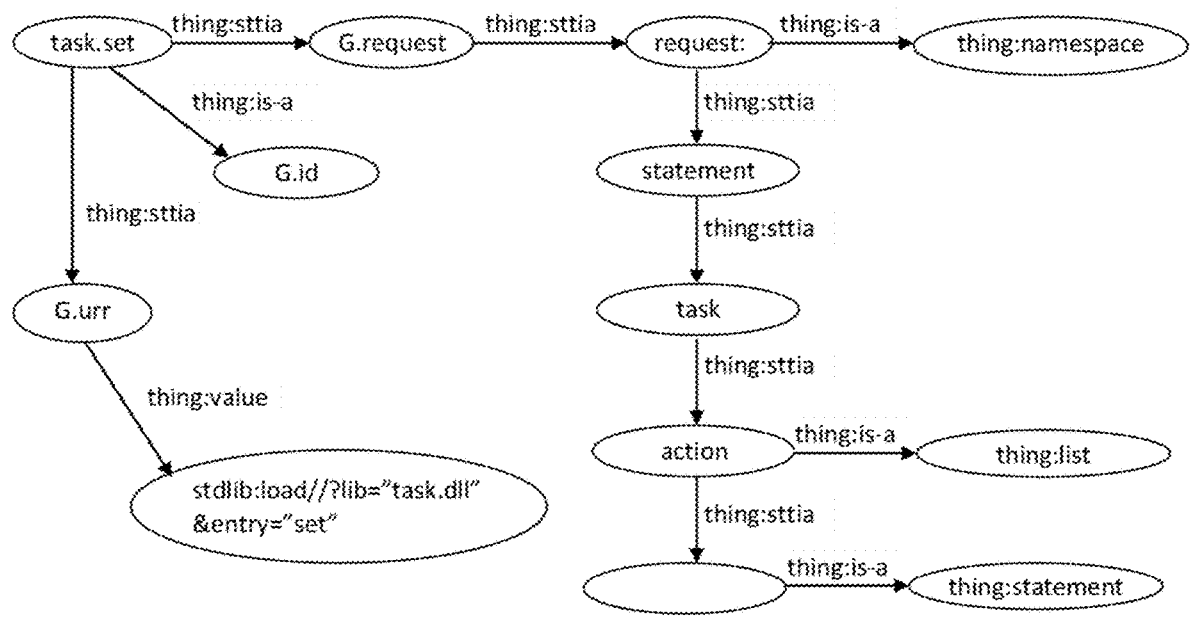
FIG. 56 is a graph illustrating P(TM(task.set)) interacting with P(TM(thing)) to algorithmically act-upon a Thing identified by the listing request:statement.task, whose value is a listing of a Thing to be set as a thing:task.

Referring to FIG. 56, P(TM(task.set)) interacts with P(TM(thing)) to algorithmically act-upon a Thing identified by the listing request:statement.task, whose value is a listing of a Thing to be set as a thing:task. The action subgraph of the request:statement.task is set as a subgraph of the thing:task Thing. An embodiment may include a G.request subgraph as request:statement.task.G.request and said subgraph is representative of the Things the task is to act upon.

P(TM(task.get)) interacts with P(TM(thing)) to algorithmically get a representation of a thing:task, and is primarily used by other P(TM(i)) needing access to that graph, such as the P(TM(task.perform)).

P(TM(task.unset)) interacts with P(TM(thing)) to algorithmically unset (remove) a specified task from the thing:thing(monad) graph.

Figure 57:
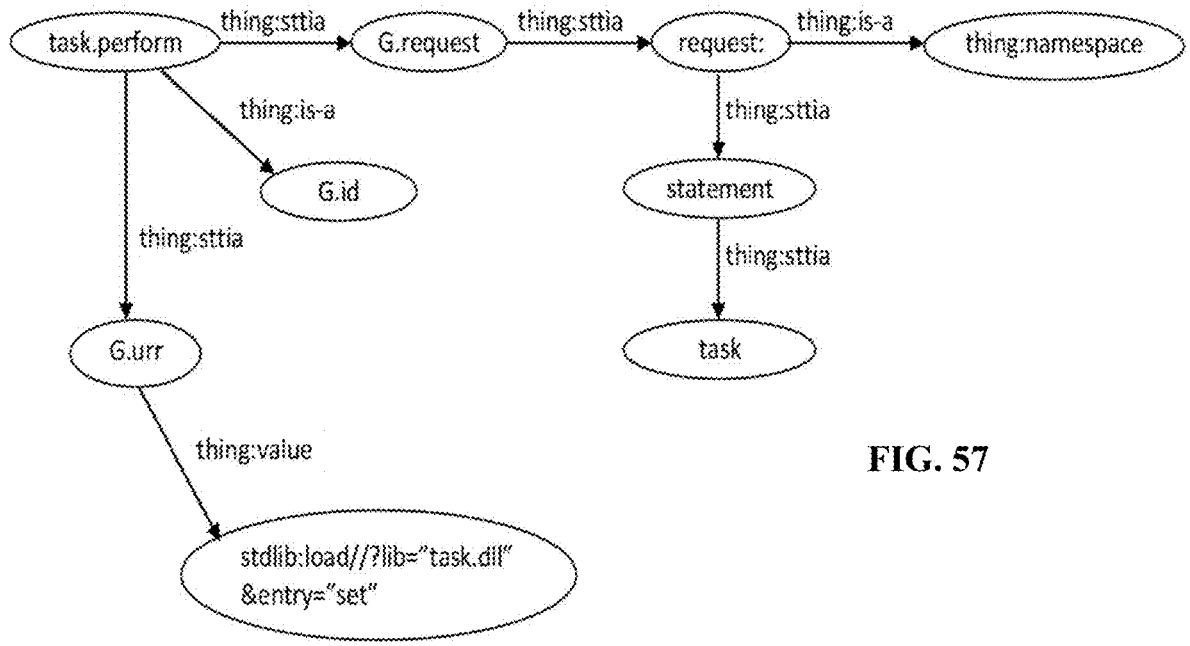
FIG. 57 is a graph illustrating P(TM(task.perform)) interacting with P(TM(thing)), P(TM(eval)), and P(TM(perform)).

Referring to FIG. 57, P(TM(task.perform)) interacts with P(TM(thing)), P(TM(eval)), and P(TM(perform)) to algorithmically evaluate and perform the sequence of thing:statement subgraphs given by the action subgraph of the thing:task identified by the value of request:statement.task.

In an embodiment, a thing:task graph can include a thing:statement subgraph that can be evaluated and performed as a prerequisite to evaluating and performing the thing:task action subgraph. This enables the performance of a set of Active Things to obtain content representative of the action subgraph, to parse said content as the sequence of thing:statements of the action subgraph that is to be evaluated and performed. Other actions can include identification, authentication, and authorization to validate, authorize or reject performance of the thing:task. Similarly, prerequisite actions can be used to ensure a prerequisite condition is satisfied prior to evaluation of the thing:task, such as configuring Active Things.

In an embodiment, the thing:task can include an on.status subgraph representative of a thing:statement to evaluate and perform, depending on the value of the status Thing. After each thing:statement is evaluated and performed, an embodiment can interact with P(TM(thing)) action to algorithmically test the status to see if the value is satisfied, unsatisfied, or failed, and, evaluate and perform the corresponding on.status.satisfied, on.status.unsatisfied, or on.status.failed thing:statement subgraphs.

An embodiment can include an on.status subgraph representative of a thing:statement to evaluate and perform, depending on the value of the status Thing. After each thing:statement is evaluated and performed, an embodiment can interact with P(TM(thing)) action to algorithmically test the status to see if the value is satisfied, unsatisfied, or failed, and, evaluate and perform the corresponding on.status.satisfied, on.status.unsatisfied, or on.status.failed thing:statement subgraphs.

P(TM(format))

P(TM(format)) provides the action of interacting with P(TM(thing)) to traverse a thing:graph and generate a formatted representation of said thing:graph. By way of example, a representation of a thing:graph can be formatted as an XML document, an HTML document, a Thing document, or other such format as required by an embodiment.

Figure 58:
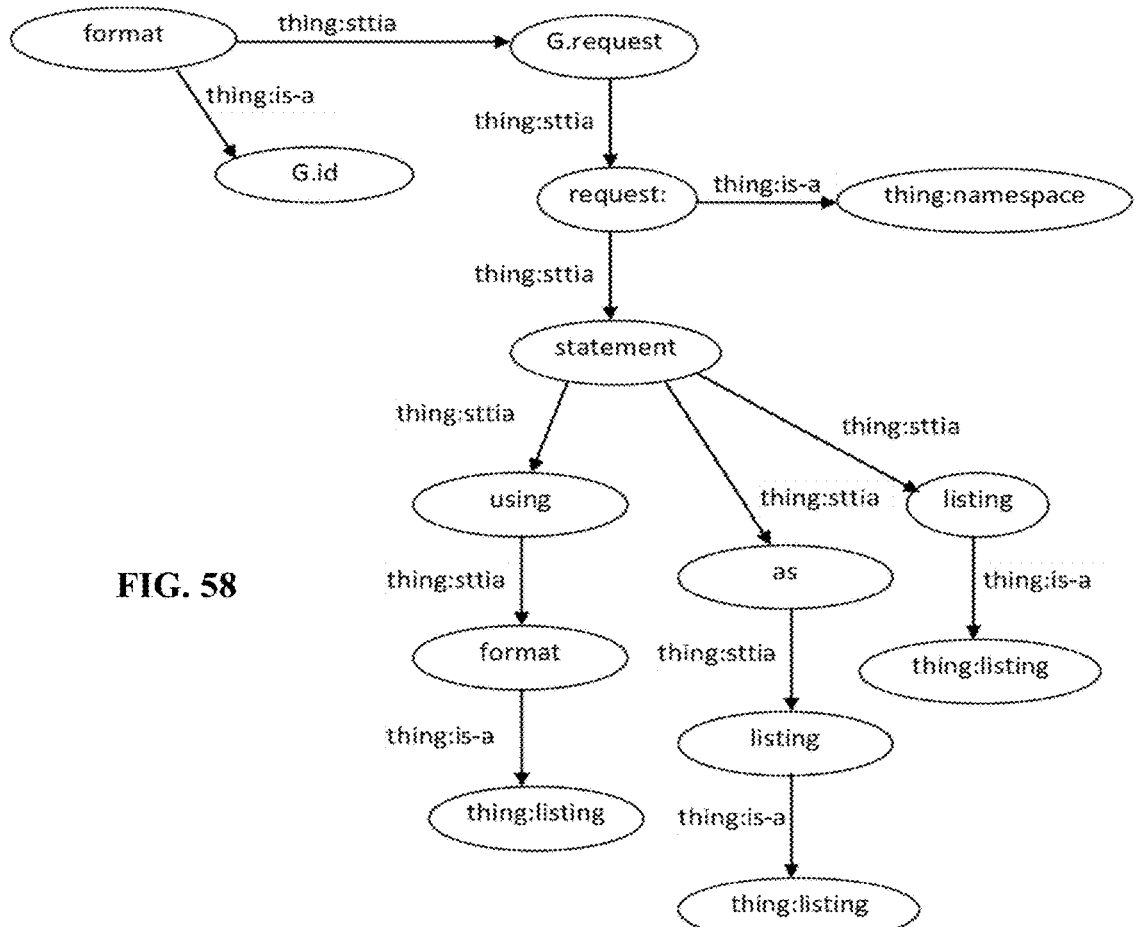
FIG. 58 is a graph illustrating request:statement.listing identifying a Thing whose value is a listing representative of a thing:graph that the P(TM(format)) is to format.

Referring to FIG. 58, the request:statement.listing identifies a Thing whose value is a listing representative of a thing:graph that the P(TM(format)) is to format. The request:statement.as identifies a Thing whose value is representative of a thing:graph representative of the resulting format response. The request:statement.using identifies a Thing whose value is representative of the desired format.

The default P(TM(format)) to use is Thing-XML. Nodes of the thing:graph being traversed are formatted as the root element. Subgraphs that are instances are formatted as attributes whilst non instance subgraphs are formatted as inner elements.

In an embodiment, a P(TM(format)) can interact with P(TM(thing)) to traverse a thing:graph to generate a stream of text and P(TM(text-to-speech)) to perform a synthesis of the stream of text to an audible stream containing the synthesized spoken text representation. P(TM(play-audio)) communicates the audible stream to the sound subsystem to produce the audible playback.
P(TM(http:get))

P(TM(http:get)) provides action of algorithmically interacting with P(TM(thing)) to generate a URI; communicating an HTTP GET method request for the resource identified by URI; receiving the HTTP response; and, generating a thing:graph representative of the HTTP response including a response.headers thing:subgraph, and, a response.entity thing:subgraph.

One skilled in the art of Computer Science Web Services can use a set of HTTP method Active Things to provide HTTP methods such as: connect, delete, get, head, options, post, put, and trace in the vocabulary. The set of methods can be configured relative to the http: namespace. Similarly, one skilled in the art can provide a set of methods related to the HTTPS protocol and said set can be configured as Active Things of the https: namespace.

Figures 59, 60, 61:
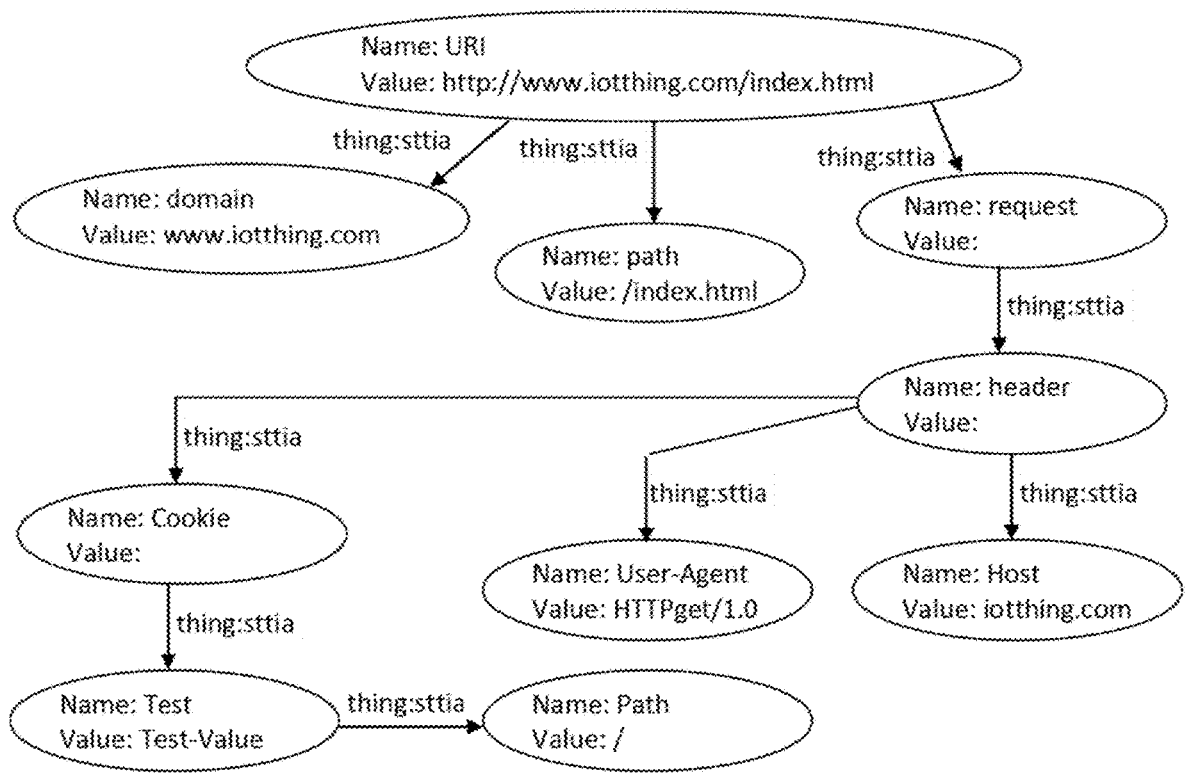
FIG. 59 is a graph illustrating that URI Thing qualifies a domain Thing, a path Thing, and a request Thing that qualifies a header Thing.
FIG. 60 is an illustrating of a generated HTTP Get Method request.
FIG. 61 is an illustration of a response received by P(TM(http:get)).

Referring to FIG. 59, the URI Thing qualifies a domain Thing, a path Thing, and a request Thing that qualifies a header Thing. The P(TM(http:get)) interacts with the P(TM(thing)) to algorithmically interact with the URI Thing to generate an HTTP Get Method request (illustrated in FIG. 60) and communicates said request to the domain web service. In response thereto, P(TM(http:get)) receives a response (see FIG. 61).

Figure 62:
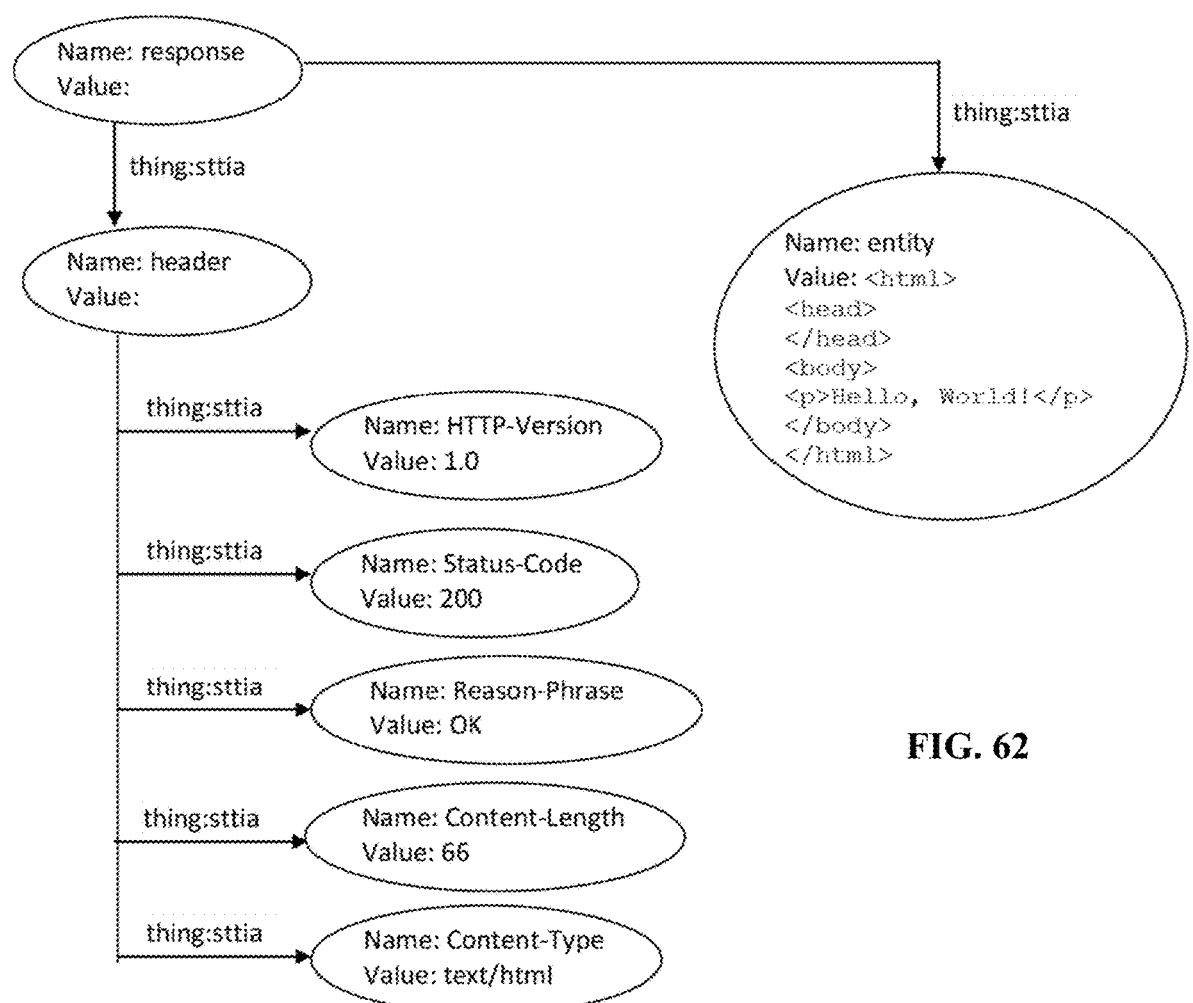
FIG. 62 is a set thing:graph resulting from parsing the response and interacting with P(TM(thing)).

Referring to FIG. 61, P(TM(http:get)) performs the action of receiving the response from the HTTP Get Method request; parsing the response and interacting with P(TM(thing)) to set a thing:graph representative of the response, such as that shown in FIG. 62.

The request.header Thing can be configured with a set of request header field components, each expressed as a Thing qualified by request.header. Similarly, in response to receiving and parsing the response header, the response.header Thing can be configured with a set of response header field components, each expressed as a Thing.

In an embodiment, P(TM(http:get)) performs the action of interacting with P(TM(thing)) to get a set of Things representative of media types that are acceptable in the response, and adds the Accept request header field to the request header thing:subgraph accordingly. In a second embodiment, P(TM(http:get)) performs the action of interacting with P(TM(thing)) to get a set of encodings that are acceptable in the response, and adds the Accept-Encoding header field to the request header accordingly.
P(TM(parse.html))

P(TM(parse.html)) interacts with P(TM(thing)) to algorithmically provide the action of parsing a thing:graph representative of HTML content, into a set of thing:graphs.

Figures 63, 64:
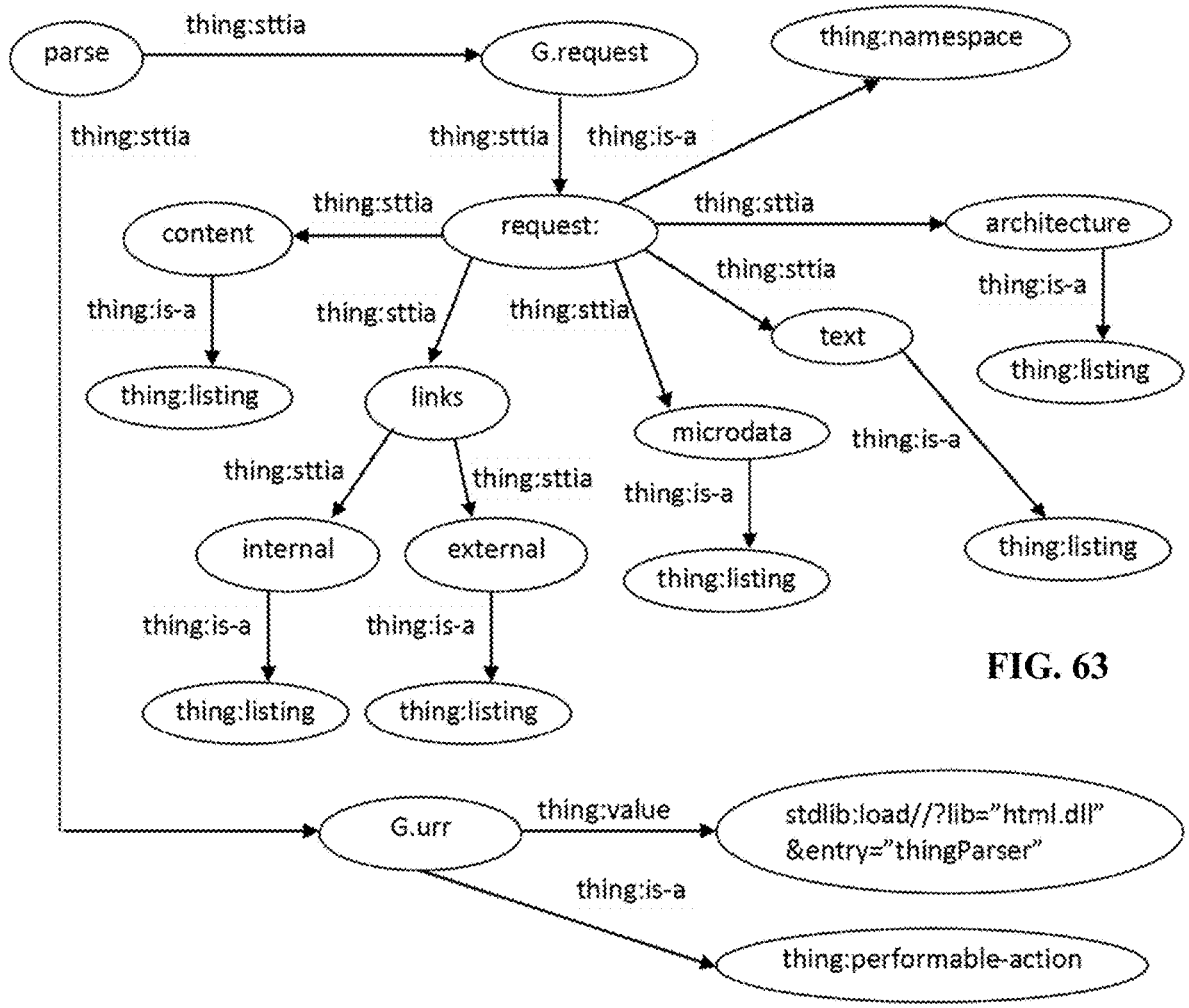
FIG. 63 is a graph illustrating P(TM(parse.html)) acting upon a request:content Thing whose value is a listing representative of Thing whose value is HTML content to parse.
FIG. 64 is an illustration of exemplary microdata in HTML content.

Referring to FIG. 63, P(TM(parse.html)) acts upon a request:content Thing whose value is a listing representative of Thing whose value is HTML content to parse. Anchor links embedded in the HTML, that are qualified within the same domain as the HTML content, are classified as internal links and are added to the thing:graph of the Thing identified by the request:links.internal Thing value. Similarly external links are added to the thing:graph of the Thing identified by the request:links.external Thing value. Untagged text is saved to the value of the Thing identified by the request:text Thing value. HTML tags are added to the thing:graph of the Thing identified by the request:architecture Thing value.

Microdata is added to the thing:graph identified by the request:microdata Thing value.

Figure 65:
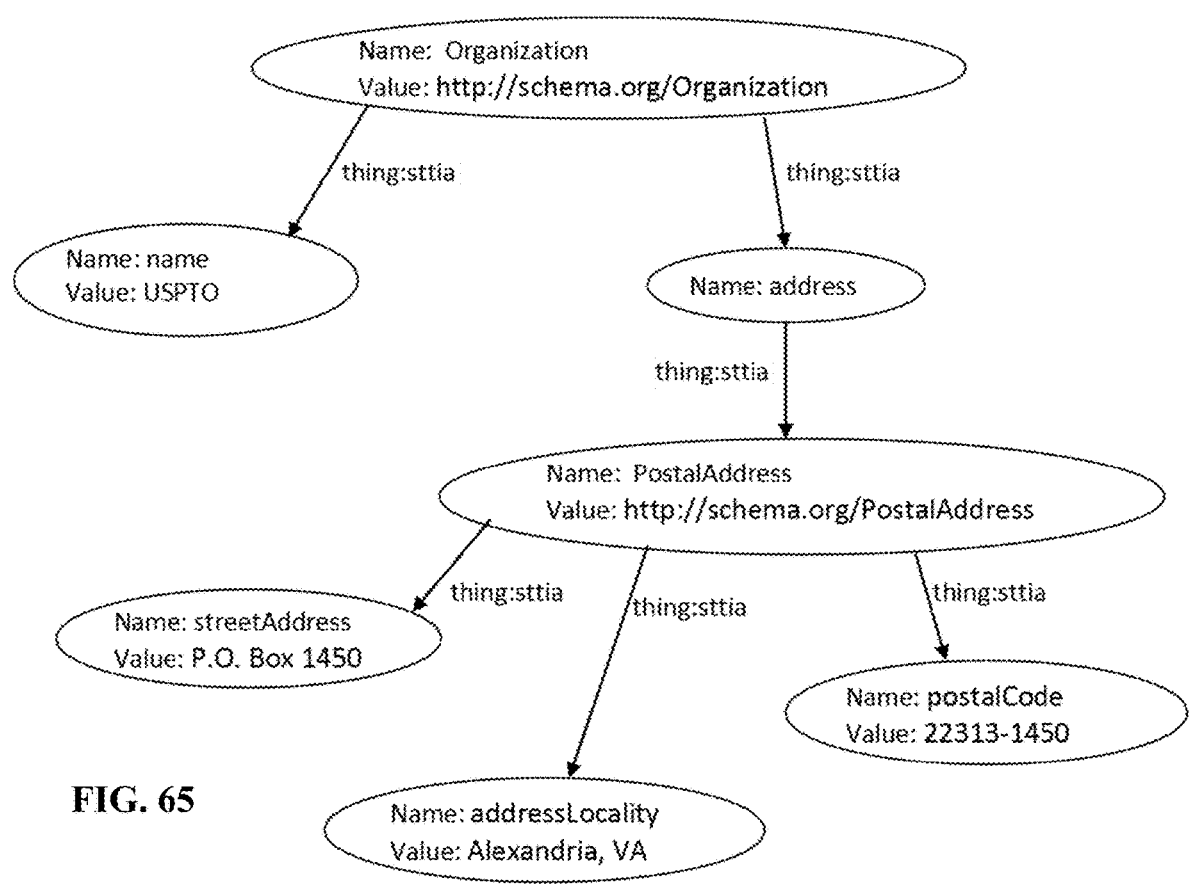
FIG. 65 is a thing:graph that represents microdata from P(TM(parse.html)) providing the action of interacting with P(TM(thing)) to parse content.

Referring to FIG. 64, exemplary microdata in HTML content is illustrated. P(TM(parse.html)) provides the action of interacting with P(TM(thing)) to parse said content, and, representing the microdata as a thing:graph, as shown in FIG. 65.

As illustrated, a first schema can include a second schema, such as Organization can include an address, as described by http://www.schema.org.
TM(openssl)

Potions of the P(TM(openssl)) are covered under the OpenSSL License Agreement included in this disclosure. TM(openssl) is a computational machine configured with the OpenSSL open source software and Procedure P(TM (OpenSSL)). OpenSSL is well known in the state of the art and used extensively with web services to provide TLS and SSL protocol actions, a general purpose cryptographic library, and, support programs for a Public Key Infrastructure. See www.openssl.org for details.

In learning the P(TM(openssl)) thing:verbs, a P(TM) can perform a set of actions commonly provided by a Certificate Authority. For example, one skilled in the art of Computer Science Public Key Infrastructure can use the P(TM (openssl)) verb actions for: to encrypt content; to decrypt content; to generate a hash code; to generate a certificate signing request; to sign a certificate; to create a self-signed certificate; to validate a certificate request; to validate a certificate; to revoke a certificate; to algorithmically examine a component of a certificate; to generate a digital signature; to validate a digital signature; to provide a set of services normally associated with a certificate authority; to authorize the use of a certificate for a purpose; and, to enable the use of SSL/TLS protocols.

For use with P(TM), the OpenSSL source code was modified so that the original C source code functions could interact with P(TM(thing)) to reference Things as parameters. One skilled in the art of Computer Science could modify similar existing source code libraries and use the configure action to configure additional P(TM(i)).

In general, OpenSSL commands are configured as actions the P(TM) can perform where the command name is configured as a thing:verb, and the parameters the command acts upon are configured as Things the thing:verb action can act upon.

Several of the P(TM(i)) can act upon content representative of data, which may be further classified as a: certificate signing request; a certificate; a password; a private key; a public key; configuration information; a certificate to revoke; an extension; random data; or, some other type of Thing an action can act upon. In some cases, content is parsed by a P(TM(i)) and represented as Things in a Thing graph, whilst in other cases, content is used as the value of a Thing given by a listing. In many cases, a Thing that an action can act upon can be specified as a Thing.urr which is interpreted as a Uniform Resource Request for that Thing. Similarly, a P(TM(i)) may algorithmically generate content representative of data, which may be further classified, such as described above.

In some cases, content may be parsed by a P(TM(i)) and represented as Things in a thing:graph, whilst in other cases, content can be used as the value of a Thing given by a listing. An action may interact with a system device driver to obtain or store content in a second storage device, to communicate content to a second P(TM), or, to communicate content to a sensor or device.

In general, for Things that can have value, the Thing may be specified as thing:name.urr=URR (wherein URR is a Uniform Resource Request) in a thing:statement being evaluated by P(TM(evaluate)) to generate a performable thing:graph. For clarity, this will be called step 1.

In traversing the thing:statement thing:graph, the P(TM(evaluate)) will see the thing:name.urr and evaluate the URR to generate a performable thing:graph. The performable thing:graph is performed to generate a response thing:graph.

The P(TM(evaluate)) in step 1 will use the response thing:graph in evaluating and binding the thing:statement Things.

Specific examples of P(TM(openssl)) actions are provided in the following pages to provide the reader with sufficient explanation to then provide the remainder of the openssl commands following the same format.

Several of the P(TM(i)) actions can act upon a common set of Things, which are provided below in table 13.

TABLE 13

| | |
|---|---|
| Help | This Thing indicates the response should include a description of the Things the ca verb action can act upon. |
| response.as | The value of the Thing given by the listing response.as, is a listing representative of a thing:graph in which the response is to set. |
| using | The value of the Thing given by the listing, is a listing of a thing:graph to be used in binding Things to the Things the action can act upon. This enables the P(TM(bind)) to use a thing:graph to augment the Things in the request namespace. |
| request.urr | The value of the Thing given by the listing is a Uniform Resource Request for Things the action is to act upon. P(TM(evaluate)) evaluates the URR to generate a performable thing:graph, interacts with P(TM(perform)) to perform the performable thing:graph, and, uses the response namespace thing:graph to set the request namespace thing:graph for the action. |
| input.urr | The value of the Thing given by the listing, is a Uniform Resource Request to obtain content. P(TM(evaluate)) evaluates the URR to generate a performable thing:graph, interacts with P(TM(perform)) to perform the performable thing:graph, and, uses the response namespace thing:graph to set a Thing representative of the content in the request namespace thing:graph for the action to act upon. |
| output.urr | The value of the Thing given by the listing is a Uniform Resource Request (URR) that the response is to be used as the request for. The URR could be, for example, bound to an action to write the content to a filename such as in stdfile:write///usr/local/openssl/cert/cert.pem?listing="request:" The default response is set as the value of the response:statement Thing. |
| configuration.urr | The value of the Thing given by the listing is a Uniform Resource Request representative of a request to obtain content representative of the openssl configuration content. This may be specified as an input filename to read. |

P(TM(openssl.ca))

The P(TM(openssl.ca)) provides the action of a minimal Certificate Authority.

Things the openssl.ca verb action can act upon include those listed in table 14 below.

TABLE 14

| | |
|---|---|
| verbose | This Thing indicates the response should include extra details about the actions being performed. |
| configuration.urr | The value of the Thing given by the listing is a Uniform Resource Request representative of a request to obtain content representative of the openssl configuration content. This may be specified as an input filename to read. |
| name | The value of the Thing given by the listing specifies the configuration content section to use (overrides default.ca in the ca section). |
| ss.certificate | The value of the Thing given by the listing is a Uniform Resource Request to obtain content representative of a single self-signed certificate to be signed by the CA. This may be specified as an input filename to read from. |
| Input.files | The input files Thing is a list of Things, each representative of an input file path name containing a certificate request. |
| output.directory | The value of the Things is a pathname to an output directory in which the output certificates are to be saved. The certificate will be written to a filename consisting of the serial number in hexadecimal form with a .pem suffixed appended. |
| certificate.urr | The value of the Thing given by the listing is a Uniform Resource Request (URR) for requesting the CA certificate. This may be a pathname to a file containing the CA certificate. |
| key.form | The value of the Thing given by the listing specifies the format (DER or PEM) of the private key file used in the sign.key option. |
| key.urr | The value of the Thing given by the listing is a Uniform Resource request (URR) for requesting the password that will be used to encrypt the private key. password used to encrypt the private key. |

TABLE 14-continued

| | |
|---|---|
| ley | The value of the Thing given by the listing is a password used to encrypt the private key (Note: that key has precedence over key.urr) |
| self.sign | The self-sign Thing indicates the issued certificate is to be signed with the key the certificate requests were signed with. Certificates signed with a different key are ignored. If spkac, ss.cert, or gen.crl is given, then self.sign is ignored. A consequence of using self.sign is that the self-signed certificate appears among the entries in the certificate database (see the configuration option database), and uses the same serial number counter as all other certificates sign with the self-signed certificate. |
| passin.urr | The value of the Thing given by the listing is a Uniform Resource Request for requesting the password key. |
| no.text | This Thing indicates that the text form a certificate should not be provided in the response. |
| start.date | The value of the Thing given by the listing represents the start date. |
| end.date | The value of the Thing given by the listing represents the expiry date. |
| days | The value of the Thing given by the listing represents the number of days to certify the certificate for. |
| md | The value of the Thing given by the listing represents the message digest to use. Any digest supported by the OpenSSL dgst command can be used. This option also applies to CRLs. |
| policy | The value of the Thing given by the listing represents the CA "policy" to use. This is a section in the configuration file which decides which fields should be mandatory or match the CA certificate. Check out the POLICY FORMAT section for more information. |
| no.email.DN | The DN of a certificate can contain the EMAIL field if present in the request DN, however it is good policy just having the e-mail set into the altName extension of the certificate. When this Thing is set, then the EMAIL field is removed from the certificate' subject and set only in the, eventually present, extensions. The email.in.dn keyword can be used in the configuration file to enable this behavior. |
| batch | This Thing indicates that the action is to be performed in a non-interactive mode; a batch mode. |
| extensions | The value of the Thing given by the listing represents the section of the configuration file containing certificate extensions to be added when a certificate is issued (defaults to x509.extensions unless the -extfile option is used). If no extension section is present then, a V1 certificate is created. If the extension section is present (even if it is empty), then a V3 certificate is created. See the:w x509v3.config manual page for details of the extension section format. |
| extfile | The value of the Thing given by the listing represents an additional configuration file to read certificate extensions from (using the default section unless the -extensions option is also used). |
| engine | The value of the Thing given by the listing represents an engine (by its unique id string) will cause ca to attempt to obtain a functional reference to the specified engine, thus initializing it if needed. The engine will then be set as the default for all available algorithms. |
| subj | The value of the Thing given by the listing represents, and supersedes, the subject name given in the request. The arg must be formatted as /type0=value0/type1=value1/type2= . . . , characters may be escaped by \ (backslash), no spaces are skipped. |
| utf8 | This Thing indicates that field values to be interpreted as UTF8 strings, by default they are interpreted as ASCII. This means that the field values, whether prompted from a terminal or obtained from a configuration file, must be valid UTF8 strings. |
| create.serial | If reading serial from the text file as specified in the configuration fails, then this Thing causes the action to create a new random serial to be used as next serial number. |
| multivalue-rdn | This Thing causes the subj to be interpreted by the action with full support for multivalued RDNs. |

P(TM(openssl.x509))

P(TM(openssl.x509)) provides the action of providing certificate information, converting certificate to various forms, signing a certificate request (similar to a mini certificate authority), or, editing certificate trust settings. It can be used to display certificate information, convert certificates to various forms, sign certificate requests like a "mini CA" or edit certificate trust settings. Things that the openssl.x509 verb action can act upon are listed within table 15.

TABLE 15

| | |
|---|---|
| help | This Thing indicates the action is to provide a description of the Things the x509 verb action can act upon, in the response. |
| input.format | The value of the Thing given by the listing denotes the input format such as X509, DER, or PEM. Normally the action will expect an X509 certificate but this can change if other options such as req are present. The DER format is the DER encoding of the certificate and PEM is the base64 encoding of the DER encoding with header and footer lines added. |

TABLE 15-continued

| | |
|---|---|
| output.format | The value of the Thing given by the listing specifies the output format (the options have the same meaning as the input format option). |
| digest | The value of the Thing given by the listing is the digest to use. This affects any signing or display option that uses a message digest, such as the -fingerprint, -signkey and -CA options. Any digest supported by the OpenSSL dgst command can be used. If not specified then SHA1 is used with -fingerprint or the default digest for the signing algorithm is used, typically SHA256. |
| engine | The value of the Thing given by the listing specifies an engine (by its unique id string) will cause x509 to attempt to obtain a functional reference to the specified engine, thus initializing it if needed. The engine will then be set as the default for all available algorithms. |
| text | The response is to include the certificate in text form. Full details are output including the public key, signature algorithms, issuer and subject names, serial number any extensions present and any trust settings. |
| cert.option | customize the response format used with text. The value of the cert.option Thing can be a single option or multiple options separated by commas. The cert.option may be also be used more than once to set multiple options. See the TEXT OPTIONS section for more information. |
| no.out | This option prevents response of the encoded version of the request. |
| pubkey | The response is to include the certificate's SubjectPublicKeyInfo block in PEM format. |
| modulus | The response is to include the value of the modulus of the public key contained in the certificate. |
| serial | The response is to include the certificate serial number. |
| subject.hash | The response is to include the "hash" of the certificate subject name. This is used in OpenSSL to form an index to allow certificates in a directory to be looked up by subject name. |
| issuer.hash | The response is to include the "hash" of the certificate issuer name. |
| ocspid | The response is to include the OCSP hash values for the subject name and public key. |
| subject | The response is to include the subject name. |
| issuer | The response is to include the issuer name. |
| name.options | The value of the Thing given by the listing determines how the subject or issuer names are displayed. The value can be a single option or multiple options separated by commas. |
| email | The response is to include the email address(es) if any. |
| ocsp.uri | The response is to include the OCSP responder address(es) if any. |
| startdate | The response is to include out the start date of the certificate, that is the notBefore date. |
| end.date | The response is to include out the expiry date of the certificate, that is the notAfter date. |
| dates | The response is to include out the start and expiry dates of a certificate. |
| check.end | checks if the certificate expires within the next seconds (as given by the value of the Thing given by the listing) and sets the status to satisfied if true, otherwise to false. |
| fingerprint | The response is to include the digest of the DER encoded version of the whole certificate (see digest options) |
| C | The response is to include the certificate in the form of a C source file. |
| trust.out | This Thing causes the x509 action to provide a trusted certificate. An ordinary or trusted certificate can be input but by default an ordinary certificate is provided in the response and any trust settings are discarded. With the trustout option a trusted certificate is provided in the response. A trusted certificate is automatically provided in the response if any trust settings are modified. |
| set.alias.arg | This Thing causes the x509 action to set the alias of the certificate to the value of the Thing given by the listing. This will allow the certificate to be referred to using a nickname for example "Steve's Certificate". |
| alias | This Thing causes the x509 action to provide the certificate alias, if any, in the response. |
| clear.trust | This Thing causes the x509 action to clear all the permitted or trusted uses of the certificate. |
| clear.reject | This Thing causes the x509 action to clear all the prohibited or rejected uses of the certificate. |
| add.trust | This Thing causes the x509 action to add a trusted certificate use, as given by the value of the Thing specified by the listing. Any object name can be used here (as the value of the listing) but currently only clientAuth (SSL client use), serverAuth (SSL server use), emailProtection (S/MIME email) and anyExtendedKeyUsage are used. As of OpenSSL 1.1.0, the last of these blocks all purposes when rejected or enables all purposes when trusted. |
| add.reject | This Thing causes the x509 action to add a prohibited use as given by the value of the specified listing. It accepts the same values as the -addtrust option. |
| purpose | This Thing causes the x509 action to perform tests on the certificate extensions and provides the results in the response. For a more complete description see the CERTIFICATE EXTENSIONS section. |

TABLE 15-continued

| | |
|---|---|
| sign.key.urr<br>sign.key.filename | this option identifies the private key to use for signing. If specified as sign.key.urr, then the value of the sign.key.urr is a Uniform Resource Request to obtain the private key, otherwise, the private key is in the file name given by the value of the sign.key.filename Thing. The input content is to be self-signed using the supplied private key. If the input content is a certificate it sets the issuer name to the subject name (i.e. makes it self-signed) changes the public key to the supplied value and changes the start and end dates. The start date is set to the current time and the end date is set to a value determined by the days option. Any certificate extensions are retained unless the clear.ext is supplied; this includes, for example, any existing key identifier extensions. If the input content is a certificate request then a self-signed certificate is created using the supplied private key using the subject name in the request. |
| passin.urr | The value of the Thing given by the listing is a Uniform Resource Request for requesting the password key. |
| clear.ext | This Thing causes the x509 action to delete any extensions from a certificate. This option is used when a certificate is being created from another certificate (for example with the sign.key or the CA options). Normally all extensions are retained. |
| key.form | The value of the Thing given by the listing specifies the format (DER or PEM) of the private key file used in the sign.key option. |
| days | The value of the Thing given by the listing specifies the number of days to make a certificate valid for. The default is 30 days. |
| x509.to.req | This Thing indicates the x509 action is to convert the certificate to a certificate request. The sign.key option is used to pass the required private key. |
| req | By default a certificate is expected as the input content. With this option a certificate request is expected instead. |
| set.serial | The value of the Thing given by the specified listing, specifies the serial number to use. This option can be used with either the sign.key or CA options. If used in conjunction with the CA option the serial number file (as specified by the CA.serial or CA.create.serial options) is not used. The serial number can be decimal or hex (if preceded by 0x). |
| CA.filename | The value of the Thing given by the specified listing, specifies the filename of the CA certificate to be used for signing. When this option is present x509 action behaves like a mini Certificate Authority. The input file is signed by this CA using this option: that is its issuer name is set to the subject name of the CA and it is digitally signed using the CAs private key. This option is normally combined with the req option. Without the req option the input is a certificate which must be self-signed. |
| CA.key.filename | The value of the Thing given by the specified listing, sets the CA private key to sign a certificate with. If this option is not specified then it is assumed that the CA private key is present in the CA certificate file. |
| CA.serial.filename | The value of the Thing given by the specified listing is the filename of a serial number file to use. When the CA option is used to sign a certificate it uses a serial number specified in a file. This file consists of one line containing an even number of hex digits with the serial number to use. After each use the serial number is incremented and written out to the file again. The default filename consists of the CA certificate file base name with ".srl" appended. For example if the CA certificate file is called "mycacert.pem" it expects to find a serial number file called "mycacert.srl". |
| CA.create.serial | With this option the CA serial number file is created if it does not exist: it will contain the serial number "02" and the certificate being signed will have the 1 as its serial number. If the -CA option is specified and the serial number file does not exist a random number is generated; this is the recommended practice. |
| extensions.filename | The value of the Thing given by the specified listing is a filename of a file containing certificate extensions to use. If not specified then no extensions are added to the certificate. |
| extensions section | The value of the Thing given by the specified listing is the section to add certificate extensions from. If this option is not specified then the extensions should either be contained in the unnamed (default) section or the default section should contain a variable called "extensions" which contains the section to use. |
| force.public.key | When a certificate is created set its public key to the value of the Thing given by the specified listing instead of the key in the certificate or certificate request. This option is useful for creating certificates where the algorithm can't normally sign requests, for example DH. The format or key can be specified using the key.form option. |
| name.opt.RFC2253 | This Thing indicates the action should displays names compatible with RFC2253 equivalent to esc.2253, esc.ctrl, esc.msb, utf8, dump.nostr, dump.unknown, dump.der, sep.comma.plus, dn.rev and sname. |

TABLE 15-continued

| | |
|---|---|
| name.opt.oneline | This Thing indicates the action should use a oneline format which is more readable than RFC2253. It is equivalent to specifying the esc.2253, esc.ctrl, esc.msb, utf8, dump.nostr, dump.der, use.quote, sep.comma.plus.space, space.eq and sname options. This is the default of no name options are given explicitly. |
| name.opt.multiline | This Thing indicates the action should use a multiline format. It is equivalent esc.ctrl, esc.msb, sep.multiline, space.eq, lname and align. |
| name.opt.esc.2253 | This Thing indicates the action should escape the "special" characters required by RFC2253 in a field. That is ,+"<>;. Additionally # is escaped at the beginning of a string and a space character at the beginning or end of a string. |
| name.opt.esc.2254 | This Thing indicates the action should escape the "special" characters required by RFC2254 in a field. That is the NUL character as well as and ( )*. |
| name.opt.esc.ctrl | This Thing indicates the action should escape control characters. That is those with ASCII values less than 0x20 (space) and the delete (0x7f) character. They are escaped using the RFC2253 \XX notation (where XX are two hex digits representing the character value). |
| name.opt.esc.msb | This Thing indicates the action should escape characters with the MSB set, that is with ASCII values larger than 127. |
| name.opt.use.quote | This Thing indicates the action should escapes some characters by surrounding the whole string with " characters, without the option all escaping is done with the \ character. |
| name.opt.utf8 | This Thing indicates the action should convert all strings to UTF8 format first. This is required by RFC2253. If you are lucky enough to have a UTF8 compatible terminal then the use of this option (and not setting esc.msb) may result in the correct display of multibyte (international) characters. Is this option is not present then multibyte characters larger than 0xff will be represented using the format \UXXXX for 16 bits and \WXXXXXXXX for 32 bits. Also if this option is off any UTF8Strings will be converted to their character form first. |
| name.opt.ignore.type | This Thing indicates the action should not attempt to interpret multibyte characters in any way. That is their content octets are merely dumped as though one octet represents each character. This is useful for diagnostic purposes but will result in rather odd looking output. |
| name.opt.show.type | This Thing indicates the action is to respond with the type of the ASN1 character string. The type precedes the field contents. For example "BMPSTRING: Hello World". |
| name.opt.dump.der | This Thing indicates that any fields that need to be hexdumped are to be dumped using the DER encoding of the field. Otherwise just the content octets will be displayed. Both options use the RFC2253 #XXXX . . . format. |
| name.opt.dump.nostr | This Thing indicates the action should dump non character string types (for example OCTET STRING) if this option is not set then non character string types will be displayed as though each content octet represents a single character. |
| name.opt.dump.all | This Thing indicates the action should dump all fields. This option when used with dump.der allows the DER encoding of the structure to be unambiguously determined. |
| name.opt.dump.unknown | Dump any field whose OID is not recognized by OpenSSL. |
| name.opt.sep.comma.plus, name.opt.sep.comma.plus.space, name.opt.sep.semi.plus.space, name.opt.sep.multiline | These Things determine the field separators. The first character is between RDNs and the second between multiple AVAs (multiple AVAs are very rare and their use is discouraged). The options ending in "space" additionally place a space after the separator to make it more readable. The sep.multiline uses a linefeed character for the RDN separator and a spaced + for the AVA separator. It also indents the fields by four characters. If no field separator is specified then sep.comma.plus.space is used by default. |
| name.opt.dn.rev | This Thing indicates the action should reverse the fields of the DN. This is required by RFC2253. As a side effect this also reverses the order of multiple AVAs but this is permissible. |
| name.opt.nofname, name.opt.sname, name.opt.lname, name.opt.oid | These Things alter how the field name is displayed. nofname does not display the field at all. sname uses the "short name" form (CN for commonName for example). lname uses the long form. oid represents the OID in numerical form and is useful for diagnostic purpose. |
| name.opt.align | This Thing indicates the action should align field values for a more readable output. Only usable with sep.multiline. |
| name.opt.space.eq | This Thing indicates the action should place spaces round the = character which follows the field name. |

TABLE 15-continued

| | |
|---|---|
| cert.option.no.header | This Thing indicates the action should not include the header information: that is the lines saying "Certificate" and "Data", in the response. |
| cert.option.no.version | This Thing indicates the action should not include the version number in the response. |
| cert.option.no.serial | This Thing indicates the action should not include the serial number in the response. |
| no.sig.name | This Thing indicates the action should not include the signature algorithm used in the response. |
| no.validity | This Thing indicates the action should not include the validity, that is the notBefore and notAfter fields, in the response. |
| no.subject | This Thing indicates the action should not include the subject name in the response. |
| no.issuer | This Thing indicates the action should not include the issuer name in the response. |
| no.pubkey | This Thing indicates the action should not include the public key in the response. |
| no.sigdump | This Thing indicates the action should not include a hexadecimal dump of the certificate signature in the response. |
| no.aux | This Thing indicates the action should not include the certificate trust information in the response. |
| no.extensions | This Thing indicates the action should not include any X509V3 extensions in the response. |
| ext.default | This Thing indicates the action should retain default extension behavior: attempt to include unsupported certificate extensions, in the response. |
| ext.error | This Thing indicates the action should provide an error message for unsupported certificate extensions. |
| ext.parse | This Thing indicates the action should ASN1 parse unsupported extensions, in the response. |
| ext.dump | This thing indicates that the action should hex dump unsupported extensions, in the response. |
| ca.default | The value of the Thing given by listing is used to set response modifiers |

P(TM(openssl.genrsa))

The P(TM(openssl.genrsa)) provides the action of generating an RSA private key. The Things the P(TM(openssl.genrsa)) action can act upon are included in table 16.

TABLE 16

| | |
|---|---|
| Output | Output the key to the specified file. If not specified then the key is stored as the value of the Thing given by response.as listing. |
| passout | The value of the Thing given by the listing is a pass phrase to be used by the cipher action in encrypting the private key (see cipher below). For more information about the format of the value, see the PASS PHRASE ARGUMENTS section in openssl. |
| Cipher<br>aes128<br>aes192<br>aes256<br>camellia128<br>camellia192<br>camellia256<br>des<br>des3<br>idea | The value of the Thing given by the cipher listing, is the name of a cipher. If not specified, but there is a Thing that is the name of a cipher, than that name will be used. The name of the cipher indicates the cipher action will be used to encrypt the private key. If a cipher name is not provided, then the key will not be encrypted. |
| F4<br>3 | The Thing indicates the public exponent to use, either 65537 or 3. The default is 65537. |
| rand | The Thing given by the listing is a set of Things representative of random data content used to seed the random number generator or an EGD socket (see openssl RAND.egd). A multiplicity of files can be specified separated by an OS-dependent character. The separator is ; for MS-Windows, , for OpenVMS, and : for all others. |
| engine | The value of the Thing given by the listing represents an engine (by its unique id string) will cause ca to attempt to obtain a functional reference to the specified engine, thus initializing it if needed. The engine will then be set as the default for all available algorithms. |
| Numbits | The value of the Thing given by the listing represents the size of the private key to generate in bits. The default is 512. |

P(TM(openssl.req))

The P(TM(openssl.req)) provides certificate request and certificate generating actions. The Things the P(TM (openssl.req)) action can act upon include those listed in table 17.

TABLE 17

| | |
|---|---|
| inform | The value of the Thing given by the listing specifies the input format. The DER option uses an ASN1 DER encoded form compatible with the PKCS#10. The PEM form is the default format: it consists of the DER format base64 encoded with additional header and footer lines. |
| outform | The value of the Thing given by the listing specifies the output format, the options have the same meaning as the -inform option. |
| in | The value of the Thing given by the listing specifies the input filename to read a request from or standard input if this option is not specified. A request is only read if the creation options (-new and -newkey) are not specified. |
| passin | The value of the Thing given by the listing is the input file password source. For more information about the format of arg see the PASS PHRASE ARGUMENTS section in openssl. |
| Out | The value of the Thing given by the listing specifies the output filename to write to or standard output by default. |
| Passout | The value of the Thing given by the listing specifies the output file password source. For more information about the format of arg see the PASS PHRASE ARGUMENTS section in openssl. |
| Text | The Thing indicates the action is to provide out the certificate request in text form. |
| Subject | The Thing indicates the action is to provide the request subject (or certificate subject if -x509 is specified) |
| Pubkey | The Thing indicates the action is to provide the public key. |
| Noout | The Thing indicates the action should not provide the encoded version of the request. |
| Modulus | The Thing indicates the action should provide the value of the modulus of the public key contained in the request. |
| Verify | The Thing indicates the action is to verify the signature of the request. |
| New | The Thing indicates the action is to generate a new certificate request. It will prompt the user for the relevant field values. The actual fields prompted for and their maximum and minimum sizes are specified in the configuration file and any requested extensions. If the -key option is not used it will generate a new RSA private key using information specified in the configuration file. |
| rand | The Thing given by the listing is a set of Things representative of random data content used to seed the random number generator or an EGD socket (see openssl RAND.egd). A multiplicity of files can be specified separated by an OS-dependent character. The separator is ; for MS-Windows, , for OpenVMS, and : for all others. |
| newkey | The value of the Thing given by the listing indicates the action is to create a new certificate request and private keythis option creates a new certificate request and a new private key. The argument takes one of several forms. rsa:nbits, where nbits is the number of bits, generates an RSA key nbits in size. If nbits is omitted, i.e. -newkey rsa specified, the default key size, specified in the configuration file is used. All other algorithms support the -newkey alg:file form, where file may be an algorithm parameter file, created by the genpkey -genparam command or and X.509 certificate for a key with appropriate algorithm. param:file generates a key using the parameter file or certificate file, the algorithm is determined by the parameters. algname:file use algorithm algname and parameter file file: the two algorithms must match or an error occurs. algname just uses algorithm algname, and parameters, if necessary should be specified via -pkeyopt parameter. dsa:filename generates a DSA key using the parameters in the file filename. ec:filename generates EC key (usable both with ECDSA or ECDH algorithms), gost2001:filename generates GOST R 34.10-2001 key (requires ccgost engine configured in the configuration file). If just gost2001 is specified a parameter set should be specified by -pkeyopt paramset:X |
| pkeyopt.opt | The value of Thing given by the listing represents the value for the public key algorithm option opt. The precise set of options supported depends on the public key algorithm used and its implementation. See KEY GENERATION OPTIONS in the genpkey manual page for more details. |
| Key | The value of the Thing given by the listing specifies the file to read the private key from. It also accepts PKCS#8 format private keys for PEM format files. |
| Keyform | The value of the Thing given by the listing specifies the format of the private key file specified in the -key argument. PEM is the default. |
| keyout | The value of the Thing given by the listing gives the filename to write the newly created private key to. If this option is not specified then the filename present in the configuration file is used. |
| Nodes | This Thing that if a private key is created, it should not be encrypted. |
| Digest | The value of the Thing given by the listing is the digest to use in signing the request. Any digest supported by the OpenSSL dgst command can be used. This overrides the digest algorithm specified in the configuration file. Some public key algorithms may override this choice. For instance, DSA signatures always use SHA1, GOST R 34.10 signatures always use GOST R 34.11-94 (-md.gost94). |

TABLE 17-continued

| | |
|---|---|
| config.urr | The value of the Thing given by the listing is a Uniform Resource Request representative of a request to obtain content representative of the openssl configuration content. This may be specified as an input filename to read. |
| Subj | The value of the Thing given by the listing represents, and supersedes, the subject name given in the request. The value must be formatted as /type0=value0/type1=value1/type2= . . . , characters may be escaped by \ (backslash), no spaces are skipped. |
| multivalue-rdn | This Thing causes the subj to be interpreted by the action with full support for multivalued RDNs. |
| x509 | This Thing indicates the action is to output a self-signed certificate instead of a certificate request. The x509 Thing is typically used to generate a test certificate or a self-signed root Certificate Authority certificate. The extensions added to the certificate (if any) are specified in the configuration file. Unless specified using the set.serial Thing, a large random number will be used for the serial number. |
| Days | The value of the Thing given by listing indicates the number of days to certify the certificate for. The default is 30 days. |
| set.serial | The value of the Thing given by the listing is the serial number to use when outputting a self-signed certificate. This may be specified as a decimal value or a hex value if preceded by 0x. It is possible to use negative serial numbers but this is not recommended. |
| extensions section | The value of the Thing given by the listing specifies an alternative section to include certificate extensions or certificate request extensions. This allows several different sections to be used in the same configuration file to specify requests for a variety of purposes. |
| reqexts section | The value of the Thing given by the listing specifies an alternative section to include certificate request extensions. This allows several different sections to be used in the same configuration file to specify requests for a variety of purposes. |
| utf8 | This Thing causes field values to be interpreted as UTF8 strings, by default they are interpreted as ASCII. This means that the field values, whether prompted from a terminal or obtained from a configuration file, must be valid UTF8 strings. |
| Nameopt | The value of the Thing given by the listing determines how the subject or issuer names are displayed. The value can be a single option or multiple options separated by commas. |
| req.opt | The value of the Thing given by the listing is used by the action to customize the output format used with -text. The value can be a single option or multiple options separated by commas. |
| Newhdr | This Thing indicates the action is to add the word NEW to the PEM file header and footer lines. |
| Batch | This Thing indicates the action is to perform in a non-interactive mode. |
| Berbose | This Thing indicates the response should include extra details about the actions being performed. |
| Engine | The value of the Thing given by the listing represents an engine (by its unique id string) will cause ca to attempt to obtain a functional reference to the specified engine, thus initializing it if needed. The engine will then be set as the default for all available algorithms. |
| keygen.engine | The value of the Thing given by the listing represents an engine (by its unique id string) that will be used for key generation operations. |

P(TM(OI))

TM(OI) is a computational machine with procedure P(TM (OI)) configured to interact with optical reader device driver to provide the actions comprising:
 a. setting reading angle P(TM(OI:set.angle));
 b. setting position (P(TM(OI:set.position));
 c. optically interrogating optical identifier (P(TM(OI: interrogate));
 d. generating corresponding bitmap of digital data P(TM (OI:generate)); and,
 e. interacting with P(TM(thing)) to generate a thing:graph representative of a code page.

Similarly, the algorithmic actions of the '545 IOT-Modules can be embodied as a set of P(TM(i)) to be configured for use within a P(TM). Thus, the teachings of the '545 can be embodied as a set of Things representative of actions, and, the Things the actions can act upon.

Exemplary P(TM)s

An exemplary P(TM) comprises the steps of startup, main, and shutdown, as follows.
 1. P(TM(startup));
 2. P(TM(main)); and,
 3. P(TM(shutdown)).

In an embodiment, P(TM) is stored in the non-transitory secondary storage device of Thing Machine. In a second embodiment, P(TM) is encoded in a code page of an optical identifier as described in U.S. Patent Application Ser. No. 62/288,545, filed Jan. 29, 2016, and entitled "Optical Identifier System and Methods, which is incorporated by reference herein in its entirety. A Thing Machine with an optical subassembly can optically interrogate the Optical Identifier to render a representation of the programmatic instructions in executable memory.

A first procedure of TM, such as a boot strap procedure, causes processor to perform an action to load P(TM) into executable processor memory, such as from a code page, secondary non-transitory storage, or as received using an electromagnetic waveform device, and, cause processor to perform P(TM).

P(TM(startup)) provides the action of:
 1. Performing P(TM(thing)) to initialize the P(TM) thing: subject(monad) in non-transitory memory as the root of a thing:graph representative of the state of P(TM) at a moment in time;
 2. Performing P(TM(boot)) which provides action for interacting with P(TM(thing)) to self-configure a set of boot Active Things representative of boot computational procedures including a P(TM(eval), a P(TM (perform)), and, a P(TM(configure)); and, 3. Performing P(TM(bootstrap)) which provides action for interacting with P(TM(eval)) to evaluate a thing: statement in the context of boot Active Things, to generate a performable thing:statement, and, P(TM (perform)) to cause performance of a computational procedure corresponding to an Active Thing of said performable thing:statement, to bootstrap a main application to be performed in the context of the configured Active Things.

In a preferred embodiment, P(TM(boot)) performs action to self-configure boot Active Things representative of boot computational procedures comprising:

1. P(TM(eval)) providing action for interacting with P(TM(thing)) to evaluate a thing:statement graph in the context of a set of configured Active Things in non-transitory memory administered by P(TM(thing)) to construct a performable thing:statement graph including at least one Thing representative of an Active Thing in said set;
2. P(TM(perform)) providing action for interacting with P(TM(thing)) to perform a performable thing:statement graph by causing performance of the Active Thing's corresponding G.urr performable action;
3. P(TM(request)) providing action for interacting with P(TM(thing)) to set a thing:graph representative of a thing:statement to evaluate;
4. P(TM(parse)) providing action for parsing an input and interacting with P(TM(request)) to set said request thing:statement; and,
5. P(TM(configure)) providing action for interacting with P(TM(thing)) to change the set of configured Active Things.

P(TM(bootstrap)) performs the action of algorithmically:

1. Interacting with P(TM(parse)) to parse content and interact with P(TM(request)) to generate a corresponding thing:statement graph;
2. Interacting with P(TM(eval)) to evaluate a said graph in the context of the Active Things to generate a performable thing:statement graph; and,
3. Interacting with P(TM(perform)) to perform a said performable thing:statement graph.

In an embodiment, at least one request is representative of a request to configure an Active Thing corresponding to a P(TM(i)).

In an embodiment, at least one Active Thing is representative of a Procedure providing the action of interacting with P(TM(thing)) to reference a sub graph of thing:graph (monad) as a thing:graph representative of a sequence of thing:statements; interact with P(TM(eval)) to evaluate a said thing:statement; and interact with P(TM(perform)) to perform a corresponding performable thing:statement. In a preferred embodiment, the name of said Active Thing name is equal to action, and, the value of the G.urr of said Active Thing is stdlib://usr/local/lib/libaction.so?entry=action. P(TM(configure)) dynamically loads library libaction.so using a dlopen function call of a Linux operating system, and resolves the reference to the value of entry (in this example, the value is action) using the dlsym function call of a Linux operating system, to an executable instruction in memory.

P(TM(action)) acts upon a thing:graph representative of a list of thing:statements to be evaluated, and, said thing:graph is a thing:action. For each thing:statement of thing:action, P(TM(action)) interacts with P(TM(eval)) to evaluate the thing:statement, and P(TM(perform)) to perform the corresponding performable thing:statement.

In said embodiment, at least one request is to configure a thing:action. In response to performing the corresponding performable thing:statement, P(TM(eval)) interacts with P(TM(perform)) to perform a computational procedure to configure the thing:action. A thing:action may be configured in the context of a thing:thing graph, such as in the context of a thing:task, thing:conditional, or, thing:while.

P(TM(main)) interacts with P(TM(eval)) to evaluate the thing:graph. In a first preferred embodiment, the thing:graph to evaluate is identified using the listing main:main. In a second preferred embodiment, the thing:thing to evaluate is identified using the listing task:main. In evaluating the graph, P(TM(eval)) locates the thing:action subgraph of the thing:thing graph, and P(TM(perform)) interacts with P(TM (action)) to evaluate and perform the statements of thing:action.

P(TM(shutdown)) interacts with P(TM(eval)) to evaluate a thing:thing graph. In a preferred embodiment, the thing:task to evaluate is identified using the listing task:shutdown.

A second exemplary P(TM) can include a P(TM(i)) providing actions related to electronic payment and processing, such as an action to make a payment; receive a payment; and, an action to adjust a wallet balance. Such an embodiment can be implemented using APIs generally provided for with use of a digital wallet such as a bit coin wallet. This enables a thing: statement to represent a request to receive a payment, or, to make a payment. By way of example, https://block.io/api/v2/get_balance/?api_key=BITCOIN, DOGECOIN or LITECOIN API KEY, is the API call to get the balance of a BitCoin, DogeCoin, or LiteCoin account, as described by Block.IO on their web site: www.block.io/docs/basic. Alternatively, one could use the Go Coin API (see www.gocoin.com for a description of the wallet, and available API). Thus, a Thing Machine can make payments, accept payments, view transactional history, check balances, and otherwise work with a form of digital currency, coupons, or points (such as reward points similar to that provided by American Express or other credit card provider). It is expressly understood that paying, or receiving payment, are an integral component of the disclosure and such APIs are embodied through Active Things.

One having ordinary skill in the art of operating systems can design and develop a Thing Operating System P(TM (os). The invention can be used by one skilled in the state of the art of Computer Science Operating System design and can embody TM(os) as a computational machine with procedure P(TM(os)) providing the action of algorithmically interacting with P(TM(thing)) to administer a thing:subject (os) Thing to be representative of the root of an operating system. Components of the operating system are administered as subgraphs of the thing:subject(os).

The P(TM(os)) could be comprised of a set of P(TM(1,n)) providing a set of Procedures related to the actions of an operating systems, such as: process management, I/O management, memory management, synchronization, memory management, error handling, booting, protection, and the kernel to run the underlying hardware components. A P(TM (scheduler)) can be integrated to enable job scheduling as one skilled in the art would understand. The algorithmic use of a program dependence graph, system dependence graph, and other such graphs to further enhance the capabilities of the thing operating system are expressly contemplated for.

Various types of operating systems can be embodied, such as a single user or multi user; single task or multi task; distributed, embedded, real-time, or virtual operating system. Exemplary components include procedures for process management, memory management, file system management, input/output management, secondary storage management, networking, protection system, and, a command interpreter system.

A Thing can be representative of a process control block with subgraphs representative of the process's information such as the process id, state, priority, program counter, cpu registers, i/o information, accounting information, or other information required by the operating system embodiment. A Thing can be representative of a thread control block.

Device drivers, run queue, ready queue, wait queue, file systems, files, storage device, memory, interrupts, events, users, groups, and other such operating system components can all be represented as Things.

Readers are encouraged to start with Nick Blundell's "Writing a Simple Operating System from Scratch", H. M. Deitel's "Operating Systems $2^{nd}$ Edition", and, to attend a multiplicity of classes on operating system design to understand operating system design which is beyond the scope of this application.

The algorithmic use of Artificial Intelligence is provided for by the present system and method. P(TM(classifier)) provides actions to classify a thing:statement, and, P(TM (eval)) uses said classification to identify a set of Active Things available to P(TM(eval)) in selecting an Active Thing to satisfy the thing:statement. Other forms of Artificial Intelligence can be integrated. For example, Symbolic AI, Sub-Symbolic AI, and Statistical AI algorithmic procedures may be used.

NeurBots and Machine Learning

Among other things, the present system and method may be used by, for example, a NeurBot.

We grew up with numerous mechanical devices such as locks, watches, dispensers, and so on, that essentially perform an action often in response to a user powered mechanical event. In a simplistic example, we put a key into a lock, and turn the key to either lock, or unlock the lock. We put a quarter into a gumball machine, turn the knob, and the machine dispenses a gumball.

It is desirable to build devices that essentially first evaluate: what is being requested of the device. If the machine can evaluate such a request, prior to performing the action, much could be achieved. Given that a Thing Machine can represent a request as a Thing, and, that communication, protocols, parsers, and formatters, are all Things, a first Thing Machine can algorithmically learn some things from a second Thing Machine. These Thing Machines are referred to herein as "NeurBots".

Learning is defined as the acquisition of knowledge or skills through experience, study, or by being taught. The Thing Machine models knowledge as Things that represent actions, and, the Things that the actions can act upon. The a-priori knowledge of the Thing Machine includes the facts, information, verbs (meaning the Active Things), and skills (meaning tasks and services), that are represented as Things during the initialization of the machine. If we built a machine like a child with limited a priori knowledge, could we get the machine to learn something new (posterior knowledge) based on its experience? In accordance with the present system and method, the answer is yes.

For exemplary purposes, let us start with a vending machine. There are numerous possible configurations for vending machines, each with one or more features such as: providing volume discounts, incentives, subscription pre-pay, redemption points, multi-product discount, and others. An example of this is provided by U.S. Pat. No. 6,575,363, which is incorporated by reference in its entirety herein, which provides a description and reference to such vending machine designs.

Vending machine owners, in many cases, still rely on the delivery person to collect the money and make the decision on replenishment. To step things up a bit, the vending machine can be designed as a Thing Machine. A motion sensor, a speaker, a microphone, a GPS locator, an LCD display, and WiFi Internet connectivity is added to the Thing Machine. In another example, an infrared thermal detector can be added.

A set of Active Things related to inventory management are configured so that the machine can notify a web service when its inventory is low, or out of stock. The owner/contractor will then schedule a delivery date for a driver to collect the money from the machine, and place additional product into the vending machine for sale. In essence, the machine is working for the owner, and, the owner maintains the money, the inventory, and in general, the machine.

In accordance with the present invention, the Thing machine is changed to be a NeurBot and allow the machine to work for itself instead of an owner. That is, the NeurBot has to learn and adapt to its environment. To do so, it requires the NeurBot to have an identity, and, to have some level of control over the money.

In this exemplary embodiment, the NeurBot uses an optical identifier as the equivalent of a SIM card, to have an identifier. The NeurBot is designed to only accept electronic payment and added Active Things related to transactions including an electronic wallet to accept payment, to make payments, and for payment processing. In accordance with one embodiment of the invention, the NeurBot can only spend what it has in its electronic wallet account, although other financial resource methodologies may be used.

The NeurBot uses the money in its account to pay for purchases for additional inventory. Using a simple web service, a product list is offered for the NeurBot to choose from. The list may include, for example: the product name; UPC code; manufacturer; ingredient list; unit price; expected best use by date; minimum order quantity; dimensions; weight; quantity available; and allergy statement. The NeurBot selects the items and using its identifier, we can determine the geolocation of the NeurBot and determine shipping cost.

The NeurBot makes a purchase and electronically pays for the goods. A delivery driver shows up to install the products into the machine. By opening up the API, other suppliers could advertise their own products to be sold through the vending machines. Suppliers could enable a search engine, such as Google, to index their web site and the NeurBot could search Google for new suppliers. The NeurBot will be able to search for suppliers and broaden the types of things that are available for purchase through the vending machine.

For the NeurBot to extend beyond the original product offering web service, however, it would require that the supplier know where the NeurBot is located to determine shipping and installation of product into the NeurBot. The NeurBot could be configured with a GPS device so that the NeurBot can convey its location.

The NeurBot could also be configured with a thermometer to measure differences in temperature over a 24 hour period. Using its geolocation to compare that temperature with a weather service available via the network, such as wunderground.com, the NeurBot could determine if it is inside a building, or outside a building; and, whether or not it is in direct sunlight. Alternatively, a NeurBot with a photo sensor could attempt to deduce light variations at various times of day to determine if it is inside, or outside a building. The NeurBot can use this information, or other information from a different input/output device, in determining an appropriate product selection. For example, if in direct sunlight, the NeurBot may opt to select potato chips over chocolate products as the latter are more prone to failure at higher temperatures.

A NeurBot that is located outside a building might notice a significant drop in sales due to inclement weather. By using its geolocation, the NeurBot could interact with a web based weather service to anticipate bad weather and adjust its purchase orders accordingly to ensure the freshest possible products to sell.

Hypothetically, the delivery service could be outsourced so that the equivalent of an Uber driver delivery service delivers and installs the products instead. Alternatively, an Amazon drone could deliver the packages in a pre-configured container that can be dropped into the vending machine, and mechanically slotted for easy dispensing. Either way, let us assume we address concerns of delivery and installation of additional inventory and focus on other tasks related to the environment.

As the NeurBot algorithmically calculates the cost of goods, and the cost of delivery and installation, it can algorithmically mark up the product so that the NeurBot can make a profit on each sale. Typically the owner of the machine would determine the margin, but in this case, we let the NeurBot make that decision. The NeurBot keeps a count of the number of times the motion sensor went off during a predefined interval throughout the day. By comparing the interval count each day of the week it can algorithmically determine the traffic count of potential consumers each day. It can also find its busiest time of day, and its least busy time of day.

During its least busy time of day, the NeurBot can purchase an online book to learn about inventory tracking, bid solicitation, price comparison, delivery services, and even learn how to analyze sales trends. To do so, the NeurBot opens an account with an online book store that we currently manage as a web service. The online books provide content. As we already have learned, when the content is written in a grammar that a NeurBot parser can parse as thing:statements, then the NeurBot can evaluate the statements.

Using the posterior knowledge, the NeurBot would be able to solicit bids for additional inventory, look online for suppliers with the best prices, factor in shipping and handling cost, or even hire a delivery service to replenish the inventory as appropriate. It can use this information to determine its Cost of Goods and set a retail price based on a desired margin.

The NeurBot can collect data about sales and analyze the selling trends to adjust the selling price, to determine reorder levels, and, the time required for fulfillment of an order. It could even determine when a product is about to expire and make marketing decisions such as discounting a first product with the purchase of a second product, or simply discounting a single product to move it out of inventory. It could look at products that do not sell well, and offer those products in a promotional activity (minimal mark up, discounted, free with the purchase of something else, etc.). It could set prices based on demand. For example, at noon time there are more consumers so increase the price 5% until 1 pm.

When the NeurBot is ready to issue a purchase order, it could look at its inventory and determine that based on current sales trends and delivery times, it should reorder product A even though the inventory count of product A is still higher than its reorder point. This has to do with shipping and installation costs. It would make little sense to reorder only product B right now and have a three 3 day delivery time, when product A is expected to reach its reorder point in 2 days based on existing sales trends. In this case, the NeurBot can make that determination and order both product A and product B at the same time.

In analyzing trends, the NeurBot can look at the sales history to determine if a sale of product A most frequently includes a sale of product B, and see that product A sales decline when product B is out of stock. In such cases, it can ensure proper ordering levels of product B to encourage the consumer to buy both product A and product B. If the sale of product C frequently includes a sale of product B, then the machine can reorder product B when half of A and half of C have been sold.

The NeurBot could interact with users. It could ask the consumer if next time they would prefer a different type of product. Using a classifier, it could classify the type of product and count the number of times a given type of product was being requested. This way, when a new order is being placed, the NeurBot could search for a related product and in doing so, it begins to adapt (meaning the NeurBot is providing better service) in its environment.

There is nothing preventing the NeurBot from learning about associations (a group of Thing Machines organizing for a common purpose). A NeurBot can read a book describing associations and the tasks required to provide the same, such as:

1) how to create an association;
2) how to advertise its availability;
3) how to market it to other NeurBots;
4) the requirements for membership;
5) how to identify, authenticate, and authorize member participation;
6) how to bill for membership; and,
7) how to use the size of its membership to negotiate deals.

Two or more NeurBots could start an association and begin sharing information, such as best-selling products during various times of the years. They may share additional data, such as suppliers providing product in a timely manner, suppliers with greatest choice of products, suppliers with volume discounts, and so on. The association collects the data and correlates it. With sufficient data over a time period, the association uses a standard template to open a web site service, and offers this information to subscribers. Other NeurBots could subscribe to obtain the data for use in their own purchasing decisions. The association can electronically bill the subscribers a membership fee, and manage its own accounts receivables. The association could solicit product bids on behalf of members to pass along any savings in bulk orders that are then distributed to the various members. At present this can be performed with a controlled environment, but we easily could remove the controls and allow the NeurBots to do this on their own.

With a motion sensor, the NeurBot could determine if there is movement within a given area and automatically play a commercial related to one of the products in the vending machine. By counting the motion sensor triggers, it could estimate the foot traffic that goes nearby, and solicit advertisements bids from other agencies to display their ads for a fee.

The NeurBot could always ask a user if there is anything else that the NeurBot could do. The user can respond, and if the NeurBot could satisfy the request then it will. Otherwise, the NeurBot can use a classifier to try and determine the topic related to the request. By keeping count of the number of times it was asked to rent a car, for example, it could look for an e-book to read to learn how to rent a car using an Enterprise Car Rental web service.

The NeurBot can learn how to manage its own vocabularies to ensure appropriate processing based on the hardware limitations. When a NeurBot is running low on storage, it could ask a second NeurBot for information related to increasing second storage, and, the second NeurBot can teach it the tasks required to open an Amazon cloud storage service account.

Let's assume there is a free month try before you buy, then no payment would be needed initially. If the cloud account service accepted electronic payment, then the NeurBot could keep that account open as long as there was enough of a profit to pay for it.

Similarly, if the NeurBot needs more processing capability, then there is no reason it could not open a Thing Machine account to add additional processing capability. Suppose that a second NeurBot has a perfectly fine job and is keeping its clients happy, but does not need all of its processing power. It could learn how to sell its excessive capacity and make that available to a second NeurBot, possibly for a fee.

Other areas of interest include randomness. A NeurBot could randomly learn about an otherwise unrelated topic. If there were sufficient numbers of machines that could perform work and make money, the machines could expand in their capabilities. In fact, the machines could learn how to essentially open a new business in a different field of use. A Thing machine could learn that there are things called autonomous lawn movers including the John Deere Tango E5 or the Husqvarna Automower.

The NeurBot understands that a delivery service delivers something from point A to point B. As a result, it could deliver an autonomous lawn mower. The machine could purchase autonomous lawn mowers, open a web site for subscribers to sign up and pay for the lawn cut, and use the delivery service to transport the mowers to and from the correct location. Drones or other means could be used for transport.

Finally, consider the role of a kitchen toaster machine. It toasts bread, bagels, muffins, pastries, and other such items. Toasters are pretty straight forward types of machines and you would think there would be not much room for innovation as a NeurBot. However, consider that a person who is toasting their bread is usually within close proximity. The toaster could communicate with a master NeurBot to obtain content and simply relay it via audio or on a screen on the toaster. The toaster could tell them about the weather, news, events, messages, emails, new product offerings, and other such information.

The same principle applies to any machine in which the machine can anticipate that the user is close by. If you are using a Keuring coffee machine you are likely within reasonable proximity to it, but if you are brewing a whole pot of coffee you may leave the room to take the dog out while your coffee is brewing. NeurBots can use electromagnetic waveform to synchronize their communications with each other, and use algorithms to determine the proximity of the user. This way, the devices can communicate using sound waves that a person may not hear. This would enable the machines to adjust their volume based on the algorithmically generated proximity of the user.

While the examples seem impractical, the examples, and more, are enabled by the Thing Machine architecture. Machines that can read books; learn Things from each other; reprogram themselves to be more useful in their environments; are the Things provided by the present invention. A machine that can be programmed to learn about finances can learn the value of margin and make a profit. It can use the money to buy books and learn even more, or open a cloud account for additional storage and/or processing power.

In an exemplary implementation, TM is a Thing Machine configured to perform Procedure P(TM) comprised of a first set of P(TM(i)) including, for example, P(TM(boot)), P(TM (thing)), P(TM(receive)), P(TM(parse)), P(TM(perform)), P(TM(evaluate)), and P(TM(configure)).

In a typical implementation, P(TM(thing)) may include a section of computer-readable instructions (e.g., in computer-based memory) that, when executed by a computer-based processor, cause the processor to administer a knowledge base (e.g., in computer-based memory) of addressable units of memory, referred to as (or representing) Things according to a Thing Memory Model.

In some implementations, a Thing memory model, each Thing satisfies the membership criteria that defines the exact requirements of what it means to be a "Thing" as expressed using a set of statements that use universal quantification to describe a Thing. The statement "All Things have an X" indicates that the structure of the Thing (e.g., in non-transitory memory) has a non-mutable component "X." In an exemplary embodiment, the non-mutable component can be a value representative of a mutable reference to a component of the memory representative of "X." This may allow for all Things to have an "X" even though the value of "X" may be empty.

In a first exemplary Thing memory model, all Things have an identifier whose value is algorithmically used by the P(TM(thing)) actions to distinguish a first Thing from a second Thing, though it is noted that a first Thing can qualify a set of Things that have equal identifier values (such as a Thing representative of a list of Things); all Things have a value, which can be empty; and, all Things have a relationship set comprised of a set of one or more mutable relationships, each describing a relationship of the Thing.

A first Thing can be comprised of a second Thing. By way of example, but not limitation, a first Thing can be representative of a set of Things, a list of Things, a queue of Things, a stack of Things, a tree of Things, a vocabulary of Things, a lexicon of a Thing, a coordinate based graph of Things, or a multidimensional graph of Things.

A first Thing can have a relationship to a second Thing where the second Thing is an instance of the first Thing. Thus, a first Thing representative of a graph of Things can have a relationship to a multiplicity of instances of a graph of Things.

Some Things represent facts, ideas, concepts, or just temporary Things, such as variables, used in the performance of one or more algorithmic methods embodied as machine code.

A relationship between a first Thing and a second Thing may be mutable, meaning, for example, that the Things administered by a P(TM(thing)) can be organized, and reorganized as necessary. Generally, relationships between Things enable the P(TM(thing)) to quantify the set of Things in the domain of discourse.

A Thing can represent a performable action and assign a meaningful name, similar to the way we name verbs. An action is the fact or process of doing something. Things that represent performable actions are referred to as verbs, and a collection of verbs is a verb vocabulary Thing. The verbs and the names of the Things that the verb actions can act upon are called a Thing vocabulary.

An embodiment can have a multiplicity of Thing vocabularies. The selection of the vocabulary can be dependent on the type of communication, the members involved in the communication, and/or the context in which communication is occurring.

P(TM(thing)) can be comprised of a set of P(TM(i)) for administering a knowledge base of addressable units of memory referred to as Things. By way of example, but not limitation, P(TM(thing.set)) provides the action of a method for setting a unit of memory to be representative of a Thing; P(TM(thing.get)) provides the action of a method for getting a unit of memory representative of a Thing; and, P(TM(thing.unset)) provides the action of a method for unsetting the unit of memory representative of a Thing. Collectively, the actions administering Things are referred to as P(TM(thing)) actions or simply the methods of the Thing memory model. A P(TM(i)) can interact with a P(TM(thing)) action to act upon a Thing.

P(TM(perform)), for example, may provide the actions of causing the performance of a verb action. This may require loading machine code, and/or, executing the machine code at or from a specified address.

P(TM(configure)), for example, may provide the actions to configure additional verbs in the verb vocabulary. In a typical implementation, the verb vocabulary may be dynamically configurable and can increase, or decrease in size and scope as needed.

Figure 67:
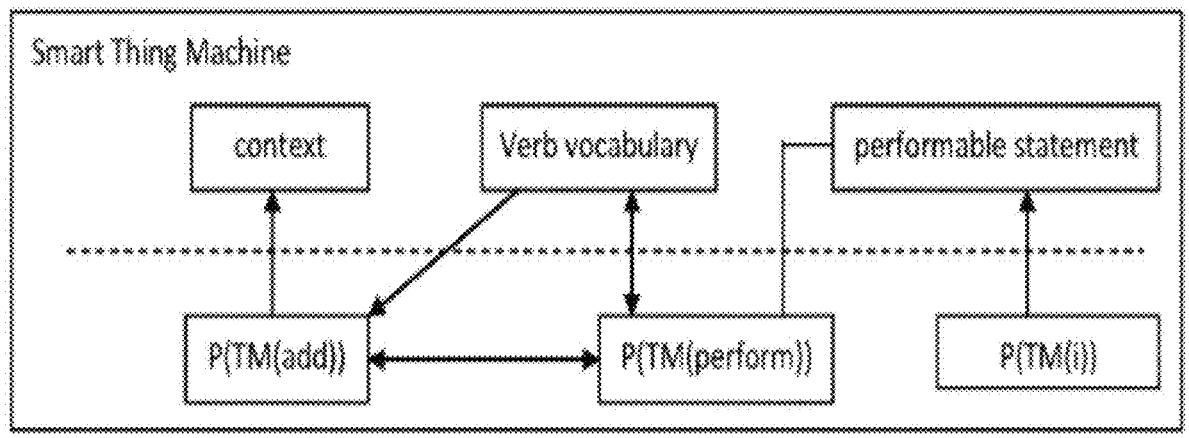
FIG. 67 is a schematic representation of an exemplary implementation whereby a P(TM(i)) action generates a performable statement, and a P(TM(perform)) causes the performance of the statement.

Referring now to FIG. 67, which shows an exemplary implementation whereby a P(TM(i)) action generates a performable statement, and, P(TM(perform)) causes the performance of the statement. The P(TM(perform)) interacts with P(TM(thing)) to get a reference to the performable statement, and the verb Thing vocabulary. It locates and performs the verb's corresponding P(TM(i)) action. The P(TM(i)) is performed with access to a context, which is a Thing that denotes the Things accessible to the P(TM(i)).

In a general sense, most P(TM(i)) actions interact with P(TM(thing)) which resolves references (referred to as listing) to Things. Each listing is comprised of one or more identifier, and, the P(TM(thing)) resolves the references to the Thing of interest.

Figure 68:
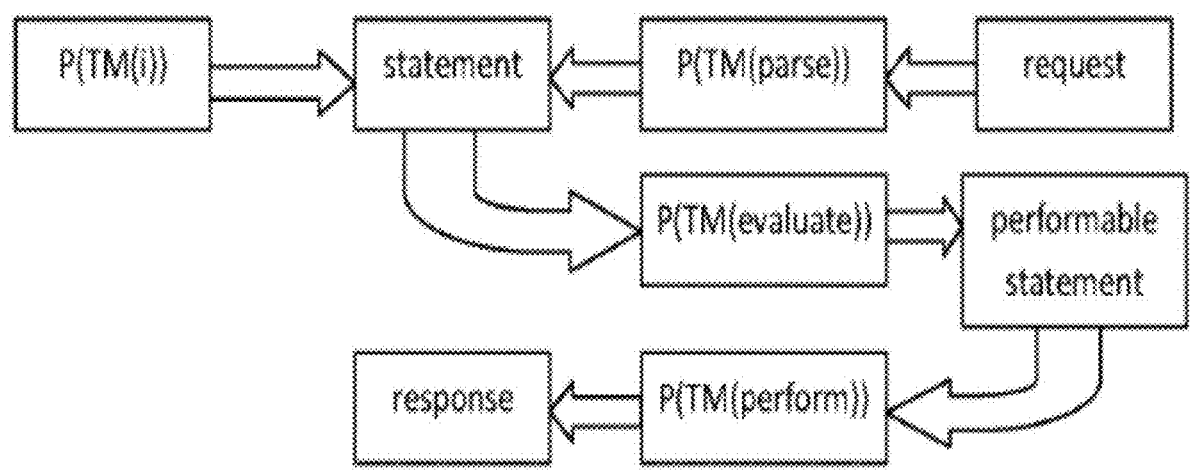
FIG. 68 is an exemplary flowchart showing that a P(TM (i)) action can interact with P(TM(thing)) to set a statement Thing.

Referring now to FIG. 68, the exemplary flowchart shows that a P(TM(i)) action, such as P(TM(parse)) can interact with P(TM(thing)) to set a statement Thing. The P(TM(evaluate)) action evaluates the statement in the context of the accessible Things, and in response thereto, it can generate a performable statement for the P(TM(perform)) to perform, thus providing the biomimicry of human thought process illustrated in FIG. 1. In evaluating the statement, the P(TM(evaluate)) will algorithmically select a verb to perform, and, generate an appropriate performable statement. The P(TM(perform)) performs the statements by causing the corresponding verb action to be performed.

Figure 69:
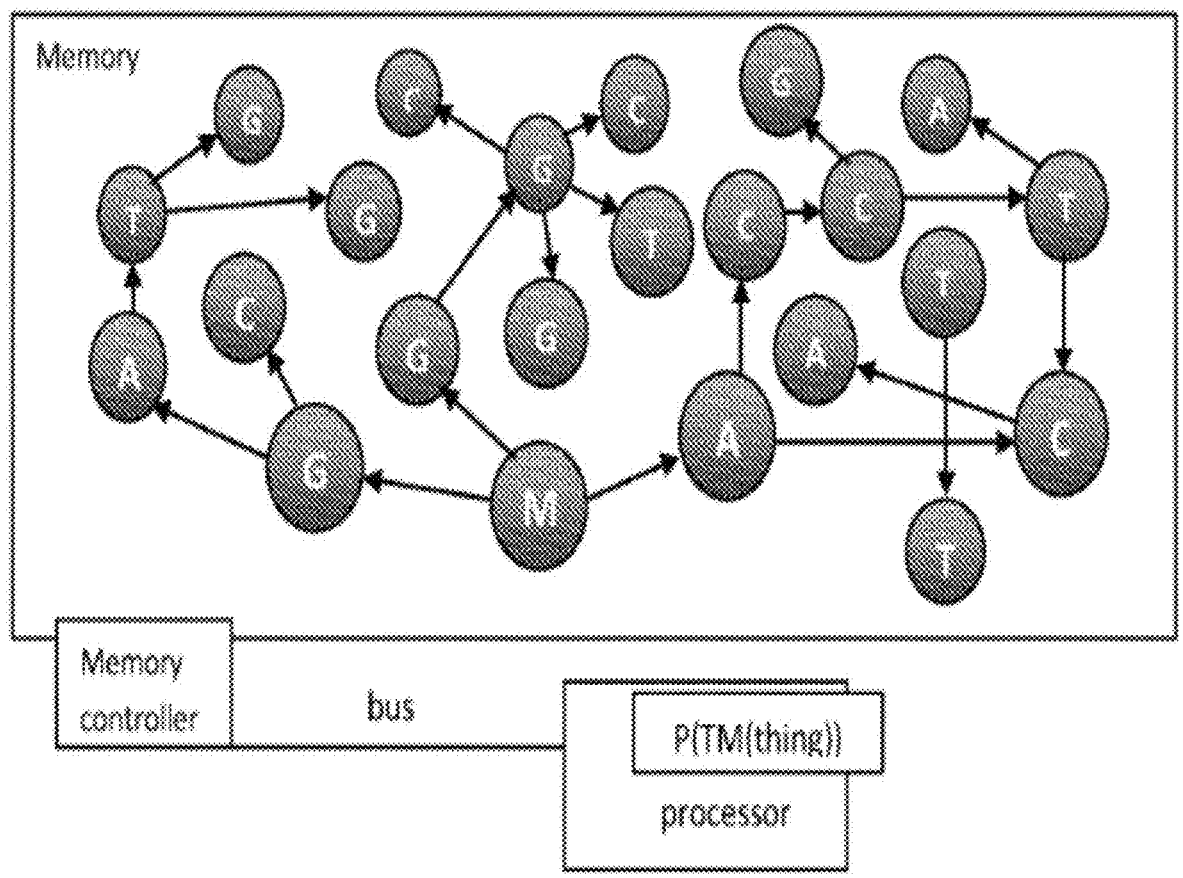
FIG. 69 is a schematic representation of an exemplary P(TM(thing)) action organizing Things as a directed graph where the nodes of the graph represent the Things and the arcs (or edges) connecting the nodes represent the mutable relationships between the Things.

Referring now to FIG. 69, an exemplary P(TM(thing)) action organizes Things as a directed graph wherein the nodes of the graph represent the Things, and, the arcs (or edges) connecting the nodes represent the mutable relationships between Things. The first Thing may be referred to as a "monad" (M).

The listing given as M.G.G.G tells the P(TM(thing)) that there is an M Thing, such that, there is a G Thing, such that there is a G Thing, such that there is a G Thing. Using a directed graph (e.g., as in FIG. 41), that listing uniquely identifies exactly one Thing.

For backward compatibility with existing W3C Standards, for example, the identifier may adhere to the specification of an Internationalized Resource Identifier (TM). An IRI is an internationalized standard for the Uniform Resource Identifier (URI). A Uniform Resource Locator (URL) is a form of a URI. A P(TM(i)) action can reference a Thing by a listing that looks similar in syntax to a URI.

Figure 70:
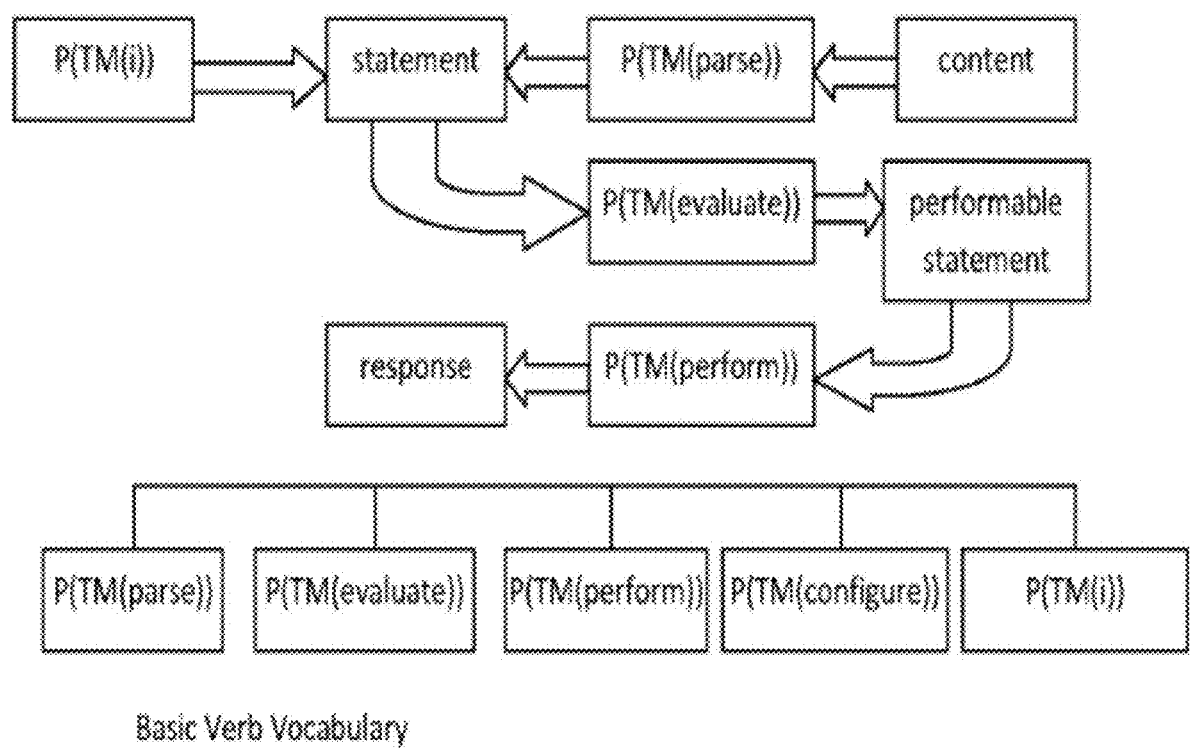
FIG. 70 is a schematic representation of an exemplary verb vocabulary and interactions involving the verb vocabulary.

In a typical implementation, the boot process may interact with the P(TM(thing)) to self-configure a limited vocabulary to represent the machine's a priori knowledge (the Things that P(TM(thing)) knows without the need for experience or education). Referring to the exemplary implementation of FIG. 70, the exemplary verb vocabulary includes a perform verb, and, a configure verb, amongst others.

With a minimal vocabulary, universal quantification can be used to assert that: if ever there is a Thing that is content, parse the content as a statement, evaluate the statement in the context of the available vocabulary to generate a performable statement, and, perform the performable statement. Performing the performable statement results in a set of Things representative of the response. This generalization enables the response to be an empty set of Things for certain actions that do not generate a specific Thing response. Sometimes, the observance of the action being performed is a sufficient response, such as is the case for the shutdown verb.

Content can be expressed according to the grammar rules of a given language. A language may be a Thing, more precisely described as a system of communication that includes a lexicon and a grammar. The lexicon, in this example, may be or include the vocabulary, such as the set of words or phrases in the language. The grammar, in this example, may include the rules relating for example, to morphology, semantics, and/or syntax.

Using a minimal set of verbs a verb vocabulary can be built that a machine (e.g., a Thing Machine) can use to perform the basic actions for using Things (meaning, the Things it can do) to self-configure a complex vocabulary of Things through which an application service can be provided.

Figure 71:
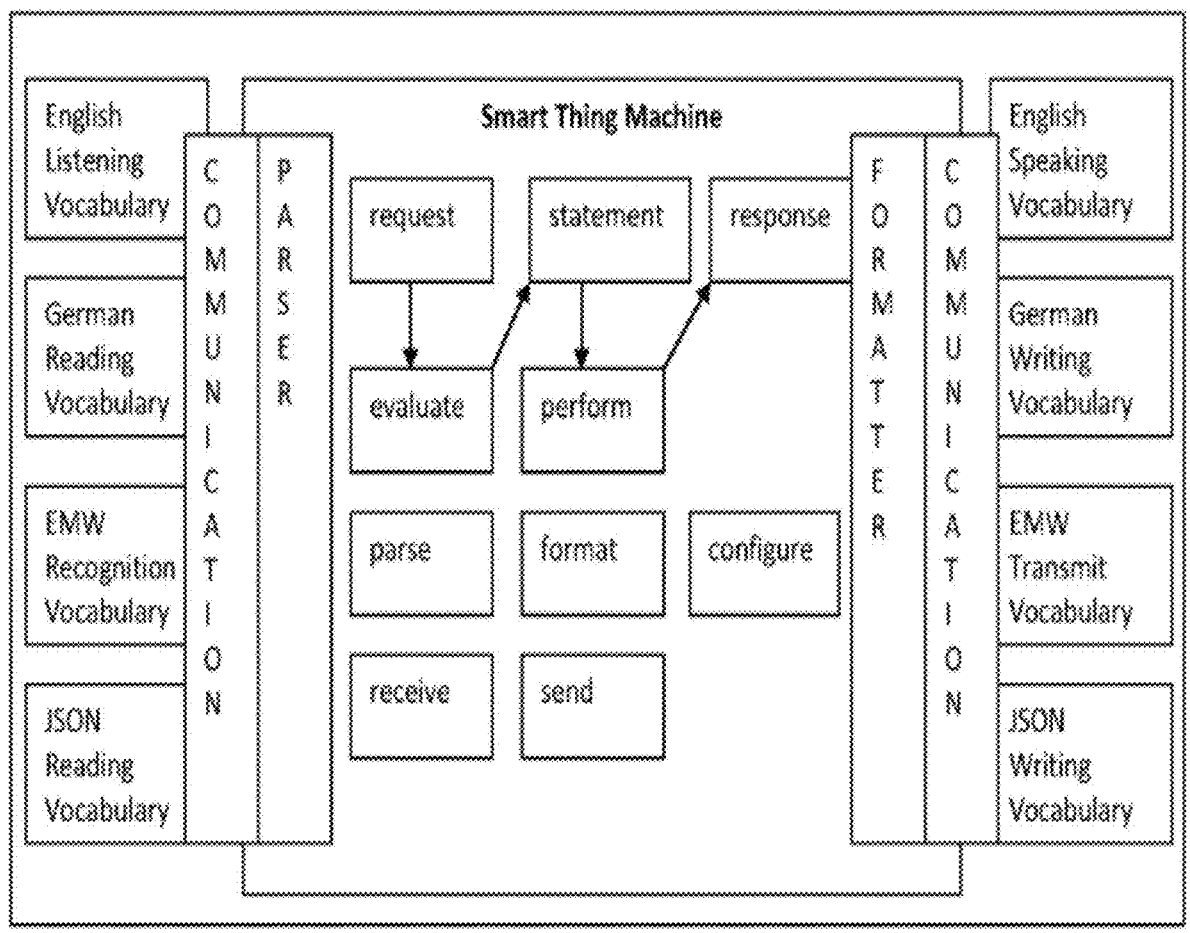
FIG. 71 is a schematic representation of an exemplary Smart Thing Machine that can perform a parse verb action to parse content received, according to a protocol, as a request.

Referring to FIG. 71, an exemplary Smart Thing Machine performs a parse verb action to parse content received according to a protocol, as a request. The request in this example is a Thing. The evaluate verb action evaluates the request Thing to generate a performable statement Thing. The perform verb action performs the performable statement Thing. The response Thing can then be formatted according to the rules of a desired grammar, and the formatted response communicated.

An implementation of the action of receiving content (e.g., in non-transitory memory) (P(TM(receive)), can include the use of a P(TM(selector)) whose action attempts to select an appropriate parser based on the content. In an exemplary implementation, an algorithmic procedure of a selector can detect a particular protocol, or elements of a language grammar, and select the appropriate parser to parse the context as a request Thing (e.g., in non-transitory memory).

It should be noted that without the verb action enabling verbs to be added to the vocabulary, the Smart Thing Machine may not be able to update or change its verb actions. In certain implementations, this may be a requirement as it provides a deterministic solution. In other implementations, the Smart Thing Machine may algorithmically control the use of the configure verb action to prevent incorrect or malicious actions from being introduced.

Figure 72:
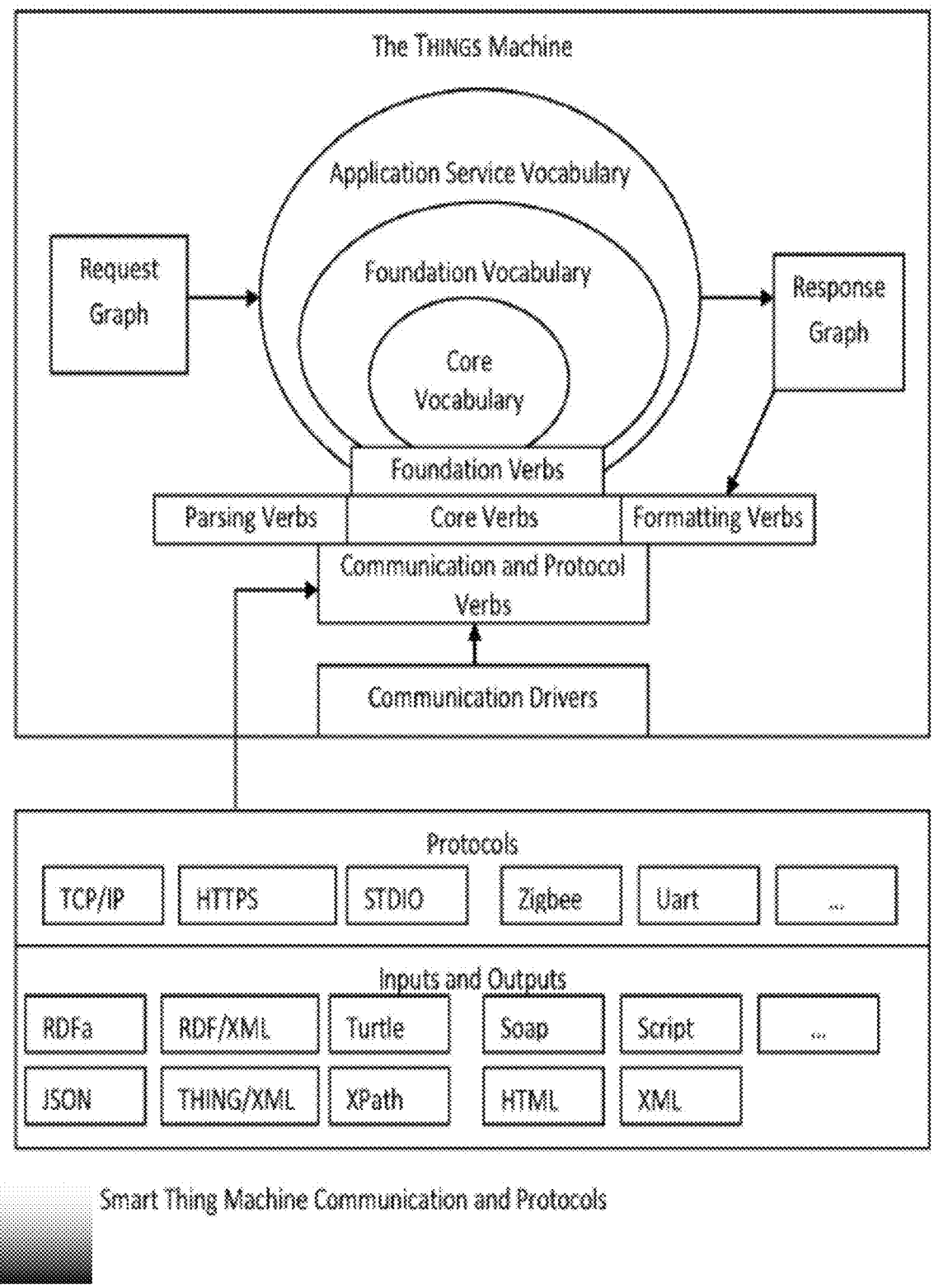
FIG. 72 is a schematic representation of an exemplary Smart Thing Machine Communications and Protocols.

Referring to FIG. 72, the actions provided through low level device drivers, such as those of an electromagnetic waveform device, can be performed by the communication and protocol verbs actions. Thus, some of Things can be independent of the physical hardware, whilst other Things will be hardware dependent.

A first Smart Thing Machine can communicate content representative of a set of the Things that the first Smart Thing Machine knows (meaning the Things administered by P(TM(thing)) to a second Smart Thing Machine. In response thereto, the second Smart Thing Machine can parse the content as a Thing Graph to be administered by its own P(TM(thing)). In this way, a first Smart Thing Machine can share Things with a second Smart Thing Machine. Clearly, in some cases, the second Smart Thing Machine may have no means of understanding certain Things, such as hardware specific Things of the first Smart Thing Machine that are not available in the second Smart Thing Machine.

Figure 73:
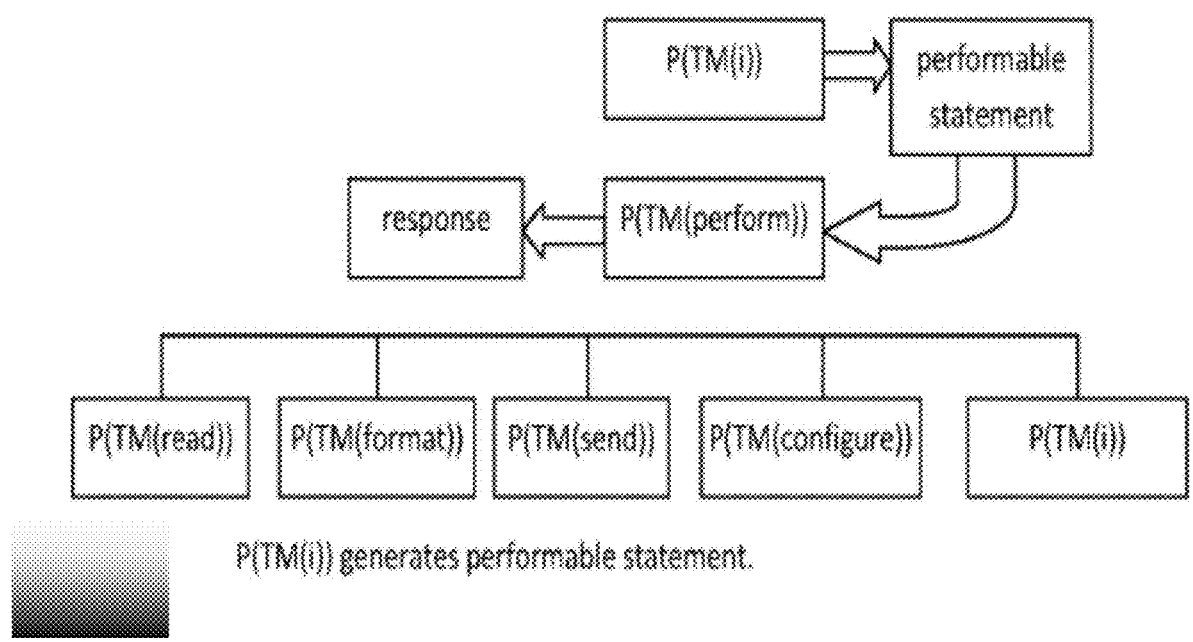

A performable Smart Thing Machine action algorithmically (such as by parsing input, interacting with a sensor, or, by requesting the Smart Thing Machine to perform an action such as to self-configure a vocabulary) can generate a statement representative of a request for the Smart Thing Machine to do something. Referring to FIG. 73, a P(TM(i)) generates a performable statement that the P(TM(perform)) can cause the performance of In one example, P(TM(i)) is P(TM(evaluate)). In general though, any P(TM(i)) with direct communication to P(TM(perform)) can request the P(TM(perform)) to perform a performable statement.

Figure 74:
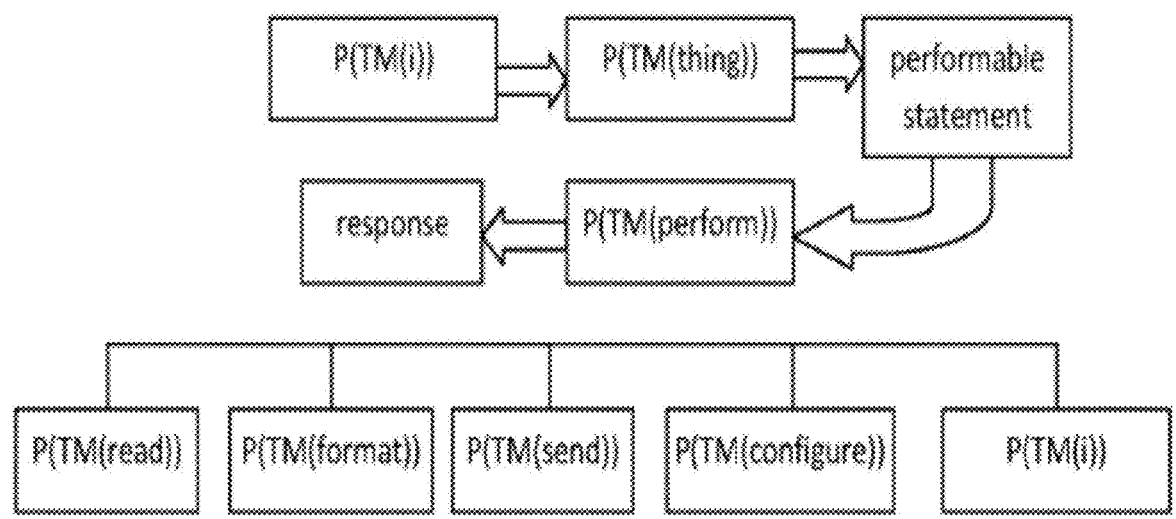
FIG. 74 is a flowchart of an exemplary implementation showing a P(TM(i)) interacting with a P(TM(thing)) to enable the P(TM(thing)) to set a Thing to be representative of the performable statement.

Referring to the exemplary implementation represented in FIG. 74, a P(TM(i)) can interact with P(TM(thing)) to enable P(TM(thing)) to set a Thing to be representative of the performable statement.

Based on the Thing graph data model, we can build the Smart Thing Machine. In some implementations, the P(TM) needs to know where the first Thing is located in order to proceed. From there, it may be able to find all the other Things it knows about.

Figure 75:
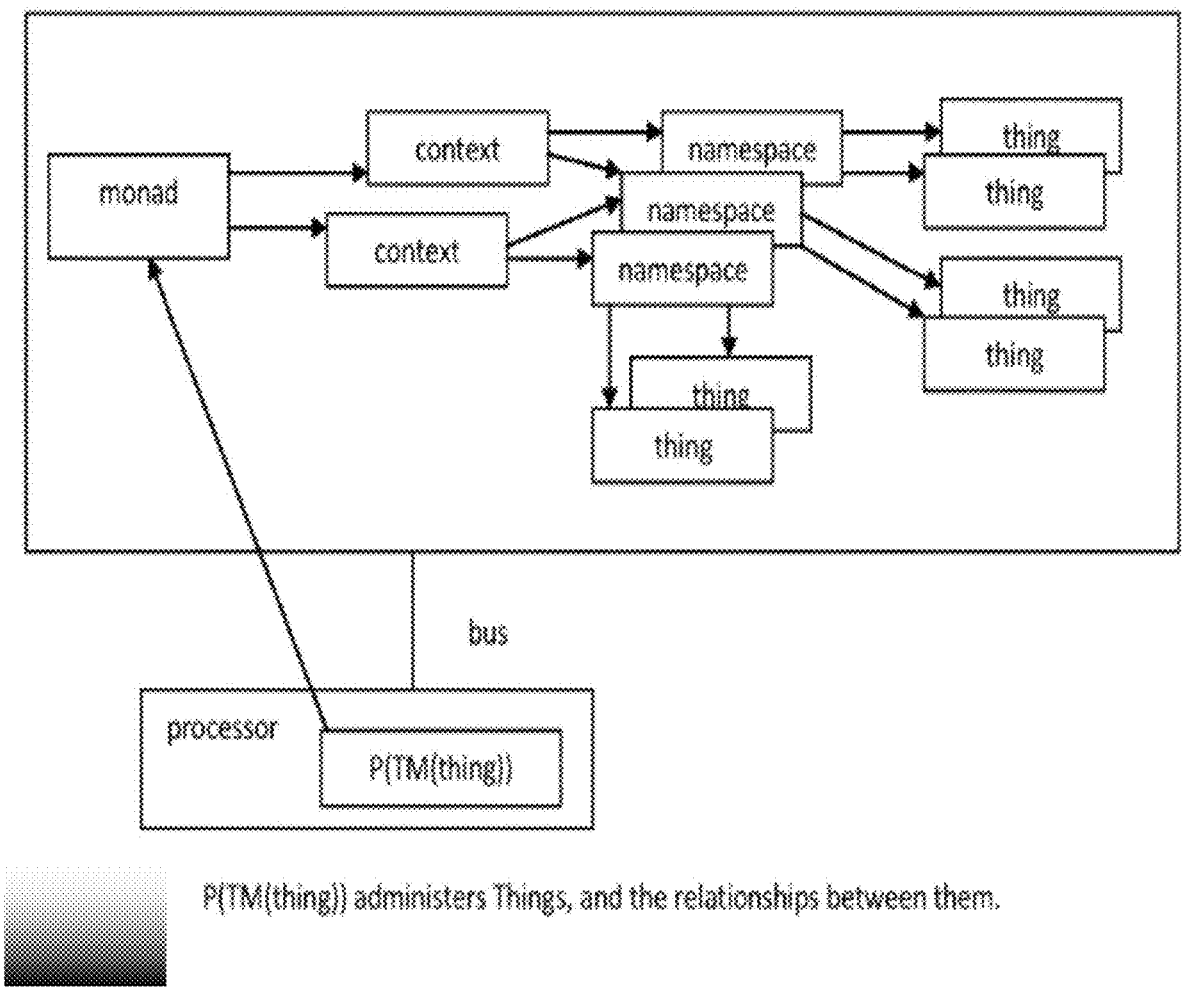
FIG. 75 is a schematic representation of an exemplary P(TM(thing)) administering Things and the relationships between the Things.

Referring to the exemplary implementation represented in FIG. 75, the P(TM(thing)) administers instances of Things, and, the mutable relationships between them. During bootstrap, the P(TM(thing)) initializes the first Thing referred to as the monad. From the P(TM(thing)) point of view, in this example, the following assertion is always true: There is a Thing where name is equal to monad.

Referring again to FIG. 42, a context Thing quantifies the set of available namespace THINGS in the domain of discourse. A namespace Thing is a Thing that is used to quantify a set of related Things, even if related simply by being members of the same namespace. The name of the namespace Thing can be used in resolving references to Things. The system may use a request namespace to represent what is being requested, and, a response namespace to represent the result of performing an action.

To be responsive to a request, an evaluate verb action may evaluate the statement graph in the context of the current namespaces, to generate a performable statement graph. When the context is set, the perform verb action performs the performable statement. The response, if any, is evaluated to determine the appropriate context for the response.

In an exemplary implementation, the choice of language, grammar, syntax, and the communication actions themselves are Things. This implies that any language vocabulary, grammar, and syntax can be used, provided there is a corresponding verb action to interpret the elements of the grammar syntax into a Thing statement; or, to format the response as the communicated content.

In an exemplary implementation, Smart Thing Machine performable actions can add, change, or remove things from the graph. In that respect, the graph can be viewed as a knowledge base of performable actions and Things that a performable action can act upon.

In an exemplary implementation, the Smart Thing Machine self-configures a minimal vocabulary, which it uses to boot the Smart Thing Machine. This can be thought of as a prior knowledge (the knowledge that is independent of experience). If experience is defined as the act of the Smart Thing Machine doing something and having Things happen (being administered as a modifiable graph), then it may be said that the Smart Thing Machine gains experience (skill or knowledge represented as things) as a result of performing Things.

Using this vocabulary, the Smart Thing Machine, in an exemplary implementation, configures a core vocabulary which provides a foundation through which it can perform an application, for example. This can be thought of as posteriori knowledge (the Things that it learns from experience). An action can traverse the graph, format the content, and interact with a secondary storage device to retain graph information, which can then be retrieved and used by an action to reconstruct the graph.

The core vocabulary can be configured to include a pre-determined set of Things, and, the vocabulary is of finite predetermined size and scope. The set of Things in the vocabulary can be dynamically administered by a P(TM (thing)) wherein Things are set (learned and added to the graph), and, other Things are unset (forgotten and removed from the graph).

In some implementations, the Smart Thing Machine organizes Things as directed graphs. The graphs become subgraphs of the overall directed graph of a P(TM(thing)) administered graph. A subgraph may be detached from the graph, and subsequently re-qualified as a node in another part of the overall graph.

In evaluating and performing a P(TM(i)), the corresponding action may have limited access to the overall directed graph, and instead, may be limited to a Thing, or a set of Things within the overall graph.

The context graph may include Things that represent namespaces. Namespaces are Things that are named directed graphs and are used to represent conceptual groupings of Things, such as a request, a response, a set of tasks, services, a verb vocabulary, or even an application dictionary. A namespace vocabulary can be viewed as a form of ontology. Several namespaces using discrete vocabularies however, may share in an ontological commitment for a portion of their vocabularies.

In an exemplary implementation, an action block is a graph representative of a sequence of statements. A named action block is referred to as a task. In this manner, the language grammar can express a request for the Smart Thing Machine to configure a named task. A request can then be to perform the task. The task is performed by performing the action block. The action block is performed by evaluating each statement to generate a performable graph. The performable graph is performed by performing the action corresponding to the verb in the performable graph.

A Smart Thing Machine can be configured to be bilingual in that a multiplicity of language grammar parsers can be configured as performable actions. Alternatively, a translator action can be used to translate from a first language to a second language that can be parsed by the configured parser action.

Thus when we say a Smart Thing Machine can read a book, we mean that a machine can perform an action to interact with content obtained (e.g., from an electromagnetic waveform device scanning the book), and, represent the content as a graph. By retaining the graph as a sub graph of the P(TM(thing)) administered graph, a Smart Thing Machine action can subsequently access and interact with that content.

A Smart Thing Machine can read a book describing how to perform a task, and can, I in some instances, retain some or all of that knowledge in the event the machine is ever asked to perform such a task in the future. A task can be classified by topic. A task may be a member of a set of classifications, such as a Task related to using the http protocol; a task related to an activity such as accounting: accounts.receivable, accounting:accounts.payable, banking: debits, banking:credits, and, banking:balance.

In some implementations, a first Smart Thing Machine can send a communication intended for a second Smart Thing Machine, requesting knowledge about a topic or classification. In response to receiving content representative of said knowledge, the first Smart Thing Machine can interact with the content to configure its own knowledge accordingly. In this manner, a first Smart Thing Machine can learn from a second Smart Thing Machine.

In some implementations, the Smart Thing Machine can provide a service. A service is a Thing that is provided in response to receiving a request, typically from a person or another machine. The subtle distinction between a service and a task is that, in an exemplary implementation at least, tasks are performed; whilst services are provided. The separation of tasks versus services is facilitated through the context, which can prevent the unauthorized performance of a task, such as a task to remove files or change the meaning of a verb.

Identity can be a Thing, and as such the system can model the concepts of identifiers, authentication, authorization, and auditing to embody an identity model. Examples of identity models include the use of a Public Key Infrastructure, Open PGP's web of trust, biometrics, 3rd party authorization, and others. With identity, the concept of a marketplace as a Thing can be introduced and enable transactions. A transaction becomes a Thing between a buyer and a seller; a payer and a payee. The transaction may involve a service offering a Thing, a physical Thing, a conceptual Thing, or a logical Thing.

An identity model, in an exemplary implementation, enables authentication of a graph or subgraph. Consider, for example, a graph representative of a request including a requesting party identifier (i.e., request originator), content, and, a digital signature, of the content. The corresponding certificate of the identifier can be validated, and the digital signature of the content validated. This enables an evaluate action to algorithmically validate a request and select an appropriate action in response thereto. With an identity model in place, we can also provide a secure communication model.

Securing the request content can be modeled using cipher actions to encrypt and subsequently decrypt content. The request graph can include a subgraph describing a cipher action, and, a cipher key. The evaluate verb action can apply, as a prerequisite, that the specified cipher must first be performed with the specified key, to decrypt the content. By organizing the various components of the request in appropriate subgraphs, two or more Smart Thing Machines can (e.g., algorithmically) communicate using an identity model, and secure communications.

When integrated with an Optical Identifier SIM card, for example, the Smart Thing Machine can be modeled as a Thing with a unique identity in an overlay network, even on an ad-hoc basis. The optical identifier may be a volume hologram encoded in a 1 mm bead of glass, for example, which has thousands of bits of data representing identity information, and, over 1 billion keys. Each device can have its own Optical SIM Card and use it as an identifier; a given name if you will. Things can disengage from the network, and re-engage elsewhere in the network, yet retain their optical identities. Optical identity can be discrete from user identity. This enables a Smart Thing Machine to verify itself on the overlay network, and, use the network available content to reconfigure itself.

In some implementations, users can have their own Optical SIM Cards, and upon showing them to the Smart Thing Machine, the machine can reconfigure the Things it knows to better suit the user's preferences and prior state information. With two factor authentication, for example, the user can present his or her Optical SIM Card, and, enter a code into the keypad. The Thing Machine reads the code, and the optical identifier, to generate a unique user identifier that it can use to lookup information about the user in an accessible database. Using that information, the machine can reconfigure itself specific to the needs of the user.

In an exemplary implementation, a Smart Thing Machine can dynamically configure and reconfigure its vocabularies, even on an ad-hoc basis. A set of Smart Thing Machines that share an ontological commitment to at least a subset of their lexicon, can interact with Things using that subset (or at least a part thereof). Given that the vocabulary is represented as Things, and that the Smart Thing Machine has a verb action to configure as well as reconfigure the vocabulary, it is reasonable to explore how the Smart Thing Machine could learn.

Requesting a machine to perform some action does not necessarily imply performing the same action for each person making the request. Consider, for example, a URL that is entered into a web browser, such as http://www.thing-language.com/v1/index.html. By entering the URL, a user is essentially requesting the browser to get and display the thing identified by the URL. The identifier and the corresponding resource are all Things.

Two people requesting their browsers to get and display the same URL can have two different results, even though they both entered the same URL. In one case, content may be specific to the individual. In another case, the HTTP request header may include state information that is used by the Web Server to construct the resource content. It can be important to recognize that a URL may identify something, but what is displayed is a different thing.

Adaptive neuralBots and Machine Learning

In an exemplary implementation, algorithmically evaluating a statement to compute a performable statement (e.g., in the embodiment of the P(TM(evaluate))) can include algorithmic steps of evaluating if the statement:
1) adheres to the grammatical rules of the language;
2) is ontologically complete;
3) has a verb;
4) has a verb that correlates to a performable Thing;
5) can be evaluated now;
6) should be evaluated later;
7) has a set of prerequisites that must be satisfied; and/or
8) can be evaluated later.

In an exemplary implementation, P(TM(evaluate)) evaluates a statement in the context of the Things that the machine knows how to perform as actions, and, the Things the actions can act upon, to construct a performable statement that the machine can perform. Sometimes, the statement and the performable statement are equivalent. Other times, the performable statement is constructed to perform an action other than what was requested, such as a default action.

Given that a Smart Thing Machine can represent a statement as a Thing, and, that communication, protocols, parsers, and formatters, are all Things, a first Smart Thing Machine could algorithmically learn some things from a second Smart Thing Machine. These Smart Thing Machines, those that have the ability to learn from another, may be referred to as "adaptive neuralbots".

Learning can be defined, in some instances, as the acquisition of knowledge or skills through experience, study, or by being taught. In exemplary implementations, the Smart Thing Machine models knowledge as Things that represent actions the machine can perform, and, the Things that the actions can act upon. The a priori knowledge of an exemplary Smart Thing Machine may include the facts, information, verbs (meaning the Active Things), and skills (meaning tasks and services), that are represented as Things during the initialization of the machine.

Consider a vending machine. There are numerous possible configurations for vending machines, each with one or more features such as: providing volume discounts, incentives, subscription pre-pay, redemption points, multi product discount, and others. See U.S. Pat. No. 6,575,363 for a description and reference to exemplary vending machine designs.

Vending machine owners, in some cases, still rely on a delivery person to collect the money and make the decision on replenishment. To step things up a bit, a Smart Thing Machine is provided. The Smart Thing Machine is connected to (or includes) a motion sensor, a speaker, a microphone, a GPS locator, an LCD display, and WiFi Internet connectivity. In another embodiment, there is also an infrared thermal detector.

IN this example, a set of Active Things can be constructed that relates to inventory management so that the machine, for example, can notify a web service when its inventory is low, or, out of stock. The owner/contractor will then schedule a delivery date for a driver to collect the money from the machine, and place additional product into the vending machine for sale. In essence, the machine is working for the owner, and, the owner maintains the money, the inventory, and in general, the machine.

The Smart Thing Machine is then changed to be an adaptive neural bot and allow the machine to work for itself instead of an owner. That is, the adaptive neural bot has to learn and adapt to its environment. To do so, in an exemplary implementation, would require the adaptive neural bot to have an identity, and, to have some level of control over the money.

In this exemplary embodiment, the adaptive neural bot uses an optical identifier as the equivalent of a SIM card, to have an identifier. The adaptive neural bot is designed to only accept electronic payment and added Active Things related to transactions including an electronic wallet to accept payment, to make payments, and for payment processing. At any point in time, the adaptive neural bot can only spend what it has in its electronic wallet account, although other financial resource methodologies may be used.

In this example, the adaptive neural bot uses the money in its account to pay for purchases for additional inventory. Using a simple web service, a product list is offered for the adaptive neural bot to choose from. The list may include, for example: the product name; UPC code; manufacturer; ingredient list; unit price; expected best use by date; minimum order quantity; dimensions; weight; quantity available; and/ or allergy statement(s), etc. The adaptive neural bot selects the items and, using its identifier, the provider can determine the geolocation of the adaptive neural bot and determine shipping cost.

The adaptive neural bot in this example may make a purchase and electronically pay for the purchased goods. A delivery driver would then show up to install the purchased products into the machine. By opening up the API, other suppliers could advertise their own products to be sold through the vending machines. Suppliers could enable a search engine, such as Google, to index their web site and the adaptive neural bot could search Google for new suppliers. The adaptive neural bot in this example can search for suppliers and broaden the types of things that are available for purchase through the vending machine.

For the adaptive neural bot to extend beyond the original product offering web service, however, it may require that the supplier know where the adaptive neural bot is located to determine shipping and installation of product into the adaptive neural bot. The adaptive neural bot could be configured with a GPS device so that the adaptive neural bot can convey its location.

The adaptive neural bot can also be configured with a thermistor, for example, to measure differences in temperature over a 24 hour period. Using its geolocation to compare that temperature with a weather service available via the network, such as wunderground.com, the adaptive neural bot could determine if it is inside a building, or outside a building; and, whether or not it is in direct sunlight. Alternatively, an adaptive neural bot with a photo sensor can attempt to deduce light variations at various times of day to determine if it is inside, or outside a building. The adaptive neural bot can use this information, or other information from a different input/output device, in determining an appropriate product selection. For example, if in direct sunlight, the adaptive neural bot may opt to select potato chips over chocolate products as the former are more prone to failure (e.g., melting) in direct sun light.

An adaptive neural bot that is located outside a building might notice a significant drop in sales due to inclement weather. By using its geolocation, the adaptive neural bot can interact with a web based weather service to anticipate bad weather and adjust its purchase orders accordingly to ensure the freshest possible products to sell.

The delivery service can be outsourced, in some instances, so that the equivalent of an Uber driver delivery service delivers and installs the products instead. Alternatively, an Amazon drone, for example, could deliver the packages in a pre-configured container that can be dropped into the vending machine, and mechanically slotted for easy dispensing. Either way, let us assume we address concerns of delivery and installation of additional inventory and focus on other tasks related to the environment.

As the adaptive neural bot algorithmically calculates the cost of goods, and the cost of delivery and installation, it can mark up the product price so that the adaptive neural bot can make a profit on each sale. Typically the owner of the machine would determine the margin, but in some cases, the adaptive neural bot can make that decision.

In an exemplary implementation, the adaptive neural bot keeps a count of the number of times the motion sensor goes off during a predefined interval of time throughout the day. By comparing the interval count each day of the week it can algorithmically determine the traffic count of potential consumers each day. It can also find its busiest time of day, and its least busy time of day.

During its least busy time of day, the adaptive neural bot can, in some instances, purchase (and may read) an online book to learn about inventory tracking, bid solicitation, price comparison, delivery services, and even learn how to analyze sales trends. To do so, the adaptive neural bot may open an account with an online book store managed as a web service, for example. The online books provide content. As already explained, when the content is written in a grammar that an adaptive neural bot parser can parse as thing: statements, then the adaptive neural bot can evaluate the statements.

Using the posterior knowledge, the adaptive neural bot in this example can be able to solicit bids for additional inventory, look online for suppliers with the best prices, factor in shipping and handling cost, and/or even hire a delivery service to replenish the inventory as appropriate. It can use this information to determine its Cost of Goods and set a retail price based on a desired margin.

The adaptive neural bot in some implementations can collect data about sales and analyze the selling trends to adjust the selling price, to determine reorder levels, and, the time required for fulfillment of an order. It can even, in some implementations, determine when a product is about to expire and make marketing decisions such as discounting a first product with the purchase of a second product, or simply discounting a single product to move it out of inventory. It can, in some implementations, look at products that do not sell well, and offer those products in a promotional activity (minimal mark up, discounted, free with the purchase of something else, etc.). It can, in some implementations, set prices based on demand. For example, at noon time there are more consumers so increase the price 5% until 1 pm.

When the adaptive neural bot is ready to issue a purchase order, it may, in some implementations, look at its inventory and determine that, based on current sales trends and delivery times, it should reorder product A, even though the inventory count of product A is still higher than its normal reorder point, for example. This has to do with shipping and installation costs. It would make little sense to reorder only product B right now and have a 3 day delivery time, when product A is expected to reach its reorder point in 2 days based on existing sales trends. In this case, the adaptive neural bot can make that determination and order both product A and product B at the same time.

In analyzing trends, the adaptive neural bot may, in some implementations, look at the sales history to determine if a sale of product A most frequently includes a sale of product B, and see that product A sales decline when product B is out of stock. In such cases, it can ensure proper ordering levels of product B to encourage the consumer to buy both product A and product B. If the sale of product C frequently includes a sale of product B, then the machine can reorder product B when half of A and half of C have been sold.

The adaptive neural bot can, in some implementations, interact with users. It can, in some instances, ask the consumer if next time they would prefer a different type of product. Using a classifier, it could classify the type of product and count the number of times a given type of product was being requested. This way, when a new order is being placed, the adaptive neural bot may, for example, search for a related product and in doing so, it begins to adapt (meaning, in this exemplary case, the adaptive neural bot is providing better service) in its environment.

In some implementations, the adaptive neural bot can learn about associations (e.g., a group that includes more than one Smart Thing Machines organizing for a common purpose). In this regard, an adaptive neural bot may read a book, for example, describing associations and the tasks required to provide same, such as:
1) how to create an association;
2) how to advertise its availability;
3) how to market it to other adaptive neural bots;
4) the requirements for membership;
5) how to identify, authenticate, and authorize member participation;
6) how to bill for membership; and,
7) how to use the size of its membership to negotiate deals.

Two or more adaptive neural bots can, in some implementations, start an association and begin sharing information, such as bestselling products during various times of the years. They may share additional data, such as suppliers providing product in a timely manner, suppliers with greatest choice of products, suppliers with volume discounts, and so on. The association may collect the data and correlate it. With sufficient data over a time period, the association may use a standard template, for example, to open a web site service, and offers this information to subscribers. Other adaptive neural bots may subscribe to obtain the data for use in their own purchasing decisions. The association may electronically bill the subscribers a membership fee, and manage its own accounts receivables. The association may solicit product bids on behalf of members to pass along any savings in bulk orders that are then distributed to the various members. This may be performed with a controlled environment, but may the controls may be removed to allow the adaptive neural bots to do this on their own.

With a motion sensor, for example, the adaptive neural bot can determine if there is movement within a given area and automatically play a commercial related to one of the products in the vending machine. By counting the motion sensor triggers (e.g., in a given period of time), the neural bot can estimate the foot traffic that goes nearby, and solicit advertisements bids from other agencies to display their ads for a fee.

In some implementations, the adaptive neural bot can ask a user (e.g., at a computer-based user interface) if there is anything else that the adaptive neural bot could do. The user can respond, and if the adaptive neural bot can satisfy the request then great—it does. Otherwise, the adaptive neural bot can use a computer-based classifier to try and determine the topic related to the request. By keeping count of the number of times the neural bot was asked to rent a car, for example, the neural bot may, after being asked a certain number of times, look for an ebook to read (and read it) to learn how to rent a car using an Enterprise Car Rental web service for example.

In some implementations, the adaptive neural bot can learn how to manage its own vocabularies to ensure appropriate processing based on hardware limitations. When an adaptive neural bot is running low on storage, for example, it can ask (via an electronic transmission) a second adaptive neural bot for information related to increasing second storage, and, the second adaptive neural bot can teach the first adaptive neural bot the tasks required to open an Amazon cloud storage service account for example.

Let's assume there is a free month try before you buy, then no payment would be needed initially. If the cloud account service accepted electronic payment, then the adaptive neural bot can keep that account open as long as there was enough of a profit to pay for it.

Similarly, if the adaptive neural bot needs more processing capability, then, in some implementations, it can open a Smart Thing Machine account to add additional processing capability for example. Suppose that a second adaptive neural bot does a perfectly fine job and is keeping its clients happy, but, does not need all the processing power it has. It can, in some implementations, learn how to sell its excessive capacity and make that available to a second adaptive neural bot, possibly for a fee.

Other areas of interest include randomness. An adaptive neural bot can, in some implementations, randomly learn about an otherwise unrelated topic. If there were sufficient numbers of machines to perform work and make money, for example, the machines could expand in their capabilities. In fact, the machines could learn how to essentially open a new business in a different field of use. A Smart Thing Machine could learn that there are things called autonomous lawn movers including the John Deere Tango E5 or the Husqvarna Automower for example.

In some implementations, the adaptive neural bot understands that a delivery service delivers something from point A to point B. As a result, it can deliver an autonomous lawn mower. The machine can purchase autonomous lawn mowers, open a web site for subscribers to sign up and pay for the lawn cut, and use the delivery service to transport the mowers to and from the correct location. As previously stated, drones or other means could be used for transport.

Finally, consider the role of a kitchen toaster machine. It toasts bread, bagels, muffins, pastries, and other such items. Toasters are pretty straight forward types of machines one might initially suspect there to be little reason for innovation as a neural bot. However, consider that a person who is toasting their bread is usually within close proximity. The toaster, in some implementations, could communicate with a master adaptive neural bot to obtain content and simply relay it via audio or on a screen on the toaster. The toaster could tell them about the weather, news, events, messages, emails, new product offerings, and other such information. Again, due to the close proximity of the user, the device could be a useful, hands free, agent for the master adaptive neural bot.

The same principle may apply to any machine in which the machine can anticipate that the user is close by. If you are using a Keurig coffee machine, for example, you are likely within reasonable proximity to it, but if you are brewing a whole pot of coffee you may leave the room to take the dog out while your coffee is brewing. Adaptive neural bots can, in some implementations, use electromagnetic waveform communications to synchronize their communications, and use algorithms to determine the proximity of the user. The devices can communicate using sound waves that a person may not hear. This would enable the machines to adjust their volume based on the algorithmically generated proximity of the user.

Machines that can read books to learn Things; to learn Things from each other; and, to reprogram themselves to be more useful in their environments are just some of the Things the model enables. A machine that can be programmed to learn about finances can learn the value of a margin and make a profit. It can use the money to buy books and learn even more, or open a cloud account for additional storage and/or processing power.

In some implementations, the Smart Thing Machine measures states on a scale of 0 to 1 (or some other scale). It uses a Thing to simulate a state of being, such as feeling appreciated. It uses states to determine how close it is to achieving a goal. By describing units of work (sequences of statements to evaluate and perform) to the Smart Machine to help the Machine achieve a goal, the Smart Machine can learn which Things help it achieve its goals, and which Things prevent it from reaching its goals. When states fall below a threshold, the Smart Thing Machine in this example may begin work to help get back on track toward reaching its goals.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer-implemented method for a first computer-based machine to gain knowledge, the method comprising:
   organizing, in a computer readable memory, a directed graph with nodes and edges, wherein each respective node represents a thing of a plurality of things, and each respective edge represents a mutable relationship between the things, wherein each thing represents a performable action or a thing that a performable action can act upon, and wherein each node that corresponds to a performable action corresponds to performable machine code for performing the performable action; and
   performing a runtime machine code action to interact with:
      a first performable machine code action represented in the directed graph to set a first thing that is representative of content;
      a second performable machine code action represented in the directed graph to parse the content of the first thing as a second thing in the directed graph that is representative of a statement;
      a third performable machine code action represented in the directed graph to evaluate the statement of the second thing to compute a third thing in the directed graph that is representative of a performable statement comprising an identifier for identifying a performable thing and a related set of things the performable thing is to act upon; and
      a fourth performable machine code action represented in the directed graph to access the performable statement, locate the performable thing identified by the identifier of the performable statement, and perform a performable action according to the performable statement to act upon the related set of things to one or more things that are representative of posterior knowledge,
   wherein the directed graph comprises a vocabulary representing a knowledge base further comprising a boot vocabulary of things representing an initial knowledge base, and the one or more things that are representative of posterior knowledge, the posterior knowledge comprises knowledge that the first computer-based machine possesses only after performing the first, second, third and fourth performable machine code actions, and each node of the directed graph comprises a Resource Description Framework (RDF) for representing information in the worldwide web, each RDF further comprising a set of RDF triples each comprising a subject, predicate, and an object, the predicate denoting a relationship type between the subject and the object.

2. The computer-implemented method of claim 1, wherein each one of the performable machine code actions is performed by one or more computer-based processors executing computer-readable instructions stored in computer-readable memory.

3. The computer-implemented method of claim 1, wherein:
the first performable machine code action is performed by, or involves, one or more computer-based processors and results in the first computer-based machine receiving the content;
the second performable machine code action is performed by, or involves, the one or more computer-based processors and results in the first computer-based machine parsing the received the content;
the third performable machine code action is performed by, or involves, the one or more computer-based processors and results in the first computer-based machine evaluating the parsed content; and
the fourth performable machine code action is performed by, or involves, the one or more computer-based processors and results in the first computer-based machine performing a function that relates to the evaluation of the parsed content.

4. The computer-implemented method of claim 1, wherein the interactions comprise one or more computer-based processors executing computer-readable instructions in computer-based memory to organize or administer the things and/or any of the mutable relationships between the things.

5. The computer-implemented method of claim 1, wherein the first performable machine code action, when performed, causes the computer-based machine to interact with a device that utilizes electromagnetic energy to obtain the content.

6. The computer-implemented method of claim 1, wherein the content is obtained from an encoding in a hologram.

7. The computer-implemented method of claim 1, wherein the content is communicated to the first computer-based machine from a second computer-based machine.

8. The computer-implemented method of claim 7, wherein the content is communicated from the second computer-based machine in response to the first computer-based machine communicating a request for the content to the second computer-based machine.

9. The computer-implemented method of claim 1, wherein the first computer-based machine algorithmically computes the content.

10. The computer-implemented method of claim 1 wherein the knowledge gained is about a service, including how to provide the service and how to advertise for the service from a machine, of which the first computer-based machine is part, the method further comprising:
advertising for the service with the first computer-based machine of the machine.

11. The computer-implemented method of claim 1, wherein the knowledge gained is about a service, including how to subscribe to the service from a machine, of which the first computer-based machine is part, the method further comprising:
subscribing to the service with the first computer-based machine of the machine.

12. The computer-implemented method of claim 1, wherein the fourth performable machine code action performs the performable action according to a context of the vocabulary accessible to the first computer-based machine.

13. The computer-implemented method of claim 12, further comprising the step of adding the one or more things that are representative of posterior knowledge to the vocabulary.

14. A computer-based system comprising:
a first computer-based machine comprising:
one or more computer-based processors; and
computer-based memory coupled to the one or computer-based processors, wherein the computer-based memory stores computer-readable instructions that, when executed by the one or more computer-based processors, cause the one or more computer-based processors to:
organize, in a computer readable memory, a directed graph with nodes and edges, wherein each respective node represents a thing of a plurality of things, and each respective edge represents a mutable relationship between the things, wherein each thing represents a performable action or a thing that a performable action can act upon, and wherein each node that corresponds to a performable action corresponds to performable machine code for performing the performable action; and
performing a runtime machine code action to interact with:
a first performable machine code action, to set a first thing that is representative of content;
a second performable machine code action, to parse the content of the first thing as a second thing in the directed graph that is representative of a statement;
a third performable machine code action, to evaluate the statement of the second thing to compute a third thing in the directed graph that is representative of a performable statement comprising an identifier for identifying a performable thing and a related set of things the performable thing is to act upon; and
a fourth performable machine code action, to access the performable statement, locate the performable thing identified by the identifier of the performable statement, and perform a performable action according to the performable statement to act upon the related set of things to set one or more things that are representative of posterior knowledge,
wherein the directed graph comprises a vocabulary representing a knowledge base further comprising a boot vocabulary of things representing an initial knowledge base, and the one or more things that are representative of posterior knowledge, the posterior knowledge comprises knowledge that the first computer-based machine possesses only after performing the first, second, third and fourth performable machine code actions, and each node of the directed graph comprises a Resource Description Framework (RDF) for representing information in the worldwide web, each RDF further comprising a set of RDF triples each comprising a subject, predicate, and an object, the predicate denoting a relationship type between the subject and the object.

15. The computer system of claim 14, wherein the first performable machine code action, when performed, causes the first computer-based machine to interact with a device that utilizes electromagnetic energy to obtain the content, or
wherein the content is communicated to the first computer-based machine from a second computer-based machine, or
wherein the first computer-based machine algorithmically computes the content.

16. A method for a first computer-based machine of a first machine to adapt its knowledge to an environment, the method comprising:

organizing, in memory, a directed graph with nodes and edges, wherein each respective node represents a thing, and each respective edge represents a mutable relationship between the things, wherein each thing represents a performable action or a thing that a performable action can act upon, and wherein each node that corresponds to a performable action corresponds to performable machine code for performing the performable action;

performing a runtime machine code action to interact with:

- a first performable machine code action to set a first thing representative of a topic representative of content received from the use of an electromagnetic waveform device;
- a second performable machine code action to set a second thing representative of a request for content related to said topic;
- a third performable machine code action to communicate a representation of said request as communicated content intended for a second computer-based machine;
- a fourth performable machine code action to receive a communication representative of the requested content and to set a third thing representative of the received content;
- a fifth performable machine code to parse the received content of the third thing as a fourth thing representative of a statement;
- a sixth performable machine code action to evaluate the statement of the fourth thing to compute a fifth thing that is representative of a performable statement; and
- a seventh performable machine code action to perform the performable statement of the fifth thing, and to set a set of things representative of learned knowledge, wherein the directed graph comprises a vocabulary representing a knowledge base further comprising a boot vocabulary of things representing an initial knowledge base, and the one or more things that are representative of posterior knowledge, the learned knowledge comprises knowledge that the first computer-based machine possesses only after performing the first, second, third and fourth performable machine code actions, and each node of the directed graph comprises a Resource Description Framework (RDF) for representing information in the worldwide web, each RDF further comprising a set of RDF triples each comprising a subject, predicate, and an object, the predicate denoting a relationship type between the subject and the object.

* * * * *